(12) United States Patent
Hori

(10) Patent No.: US 8,903,144 B2
(45) Date of Patent: Dec. 2, 2014

(54) ENDOSCOPE APPARATUS AND METHOD OF MEASURING OBJECT

(75) Inventor: Fumio Hori, Tokyo (JP)

(73) Assignee: Olympus Corporation, Tokyo (JP)

(*) Notice: Subject to any disclaimer, the term of this patent is extended or adjusted under 35 U.S.C. 154(b) by 942 days.

(21) Appl. No.: 12/957,731

(22) Filed: Dec. 1, 2010

(65) Prior Publication Data

US 2012/0140989 A1 Jun. 7, 2012

(51) Int. Cl.
*G06K 9/00* (2006.01)
*G06T 7/60* (2006.01)

(52) U.S. Cl.
CPC ....... *G06T 7/602* (2013.01); *G06T 2207/10068* (2013.01); *G06T 2207/20148* (2013.01)
USPC .......................................... 382/128; 382/100

(58) Field of Classification Search
None
See application file for complete search history.

(56) References Cited

U.S. PATENT DOCUMENTS

| | | | |
|---|---|---|---|
| 5,072,384 A * | 12/1991 | Doi et al. ...................... | 382/132 |
| 5,760,920 A * | 6/1998 | Lin et al. ....................... | 358/3.2 |
| 5,930,391 A * | 7/1999 | Kinjo ............................. | 382/173 |
| 6,063,023 A | 5/2000 | Sakiyama et al. | |
| 6,480,807 B1 | 11/2002 | Miyano | |
| 6,778,690 B1 * | 8/2004 | Ladak et al. .................. | 382/131 |
| 6,945,931 B2 | 9/2005 | Ogawa | |
| 7,048,685 B2 | 5/2006 | Sakiyama | |
| 7,155,042 B1 * | 12/2006 | Cowan et al. .................. | 382/128 |
| 7,474,776 B2 * | 1/2009 | Kaufman et al. .............. | 382/128 |
| 7,564,626 B2 | 7/2009 | Bendall et al. | |
| 7,689,021 B2 * | 3/2010 | Shekhar et al. ................ | 382/131 |
| 7,693,563 B2 * | 4/2010 | Suresh et al. .................. | 600/407 |
| 7,782,453 B2 | 8/2010 | Bendall et al. | |
| 8,077,936 B2 * | 12/2011 | Wang et al. ................... | 382/128 |
| 2003/0099397 A1 * | 5/2003 | Matsugu et al. .............. | 382/173 |
| 2006/0269129 A1 * | 11/2006 | Tanigawa ...................... | 382/169 |
| 2007/0116335 A1 * | 5/2007 | Capolunghi et al. .......... | 382/128 |
| 2008/0118115 A1 * | 5/2008 | Williamson ................... | 382/128 |

(Continued)

FOREIGN PATENT DOCUMENTS

| | | |
|---|---|---|
| JP | 63-217481 A | 9/1988 |
| JP | 09-250909 A | 9/1997 |

(Continued)

OTHER PUBLICATIONS

Japanese Office Action dated Nov. 27, 2012 (and English translation thereof) in counterpart Japanese Application No. 2008-135475.

(Continued)

*Primary Examiner* — Avinash J Yentrapati
(74) *Attorney, Agent, or Firm* — Holtz, Holtz, Goodman & Chick PC

(57) ABSTRACT

An endoscope apparatus including: an image pickup portion that picks up an image of an object; and a measurement portion that measures the object based on the image of the object obtained by the image pickup portion, in which the measurement portion includes: a specification portion that specifies three base points on the image; a composing point calculation portion that calculates composing points forming an object region of the object, based on an image region that is based on a plurality of points, the points set on a line determined by the three base points that are specified by the specification portion; and a size calculation portion that calculates a size of the object based on the composing points.

14 Claims, 61 Drawing Sheets

(56) References Cited

U.S. PATENT DOCUMENTS

| | | | |
|---|---|---|---|
| 2008/0123922 A1* | 5/2008 | Gielen et al. | 382/131 |
| 2008/0240491 A1* | 10/2008 | Hori | 382/100 |
| 2008/0262345 A1* | 10/2008 | Fichtinger et al. | 600/426 |
| 2009/0043161 A1 | 2/2009 | Doi | |
| 2009/0092278 A1* | 4/2009 | Doi et al. | 382/100 |
| 2010/0010347 A1* | 1/2010 | Friedman et al. | 600/443 |
| 2011/0044524 A1* | 2/2011 | Wang et al. | 382/131 |
| 2011/0081057 A1* | 4/2011 | Zeng | 382/128 |
| 2011/0187824 A1* | 8/2011 | Hori | 348/45 |
| 2013/0094725 A1* | 4/2013 | Gulsun et al. | 382/128 |

FOREIGN PATENT DOCUMENTS

| | | |
|---|---|---|
| JP | 10-038543 A | 2/1998 |
| JP | 11-132740 A | 5/1999 |
| JP | 2001-091231 A | 4/2001 |
| JP | 2001-111996 A | 4/2001 |
| JP | 2001-275934 A | 10/2001 |
| JP | 2002-156212 A | 5/2002 |
| JP | 2002-159021 A | 5/2002 |
| JP | 2004-49638 A | 2/2004 |
| JP | 2005-204724 A | 8/2005 |
| JP | 2007-267979 A | 10/2007 |
| JP | 2010-102113 A | 5/2010 |

OTHER PUBLICATIONS

Japanese Notice of Allowance dated Jan. 8, 2013 (and English translation thereof) in counterpart Japanese Application No. 2008-226169.

* cited by examiner

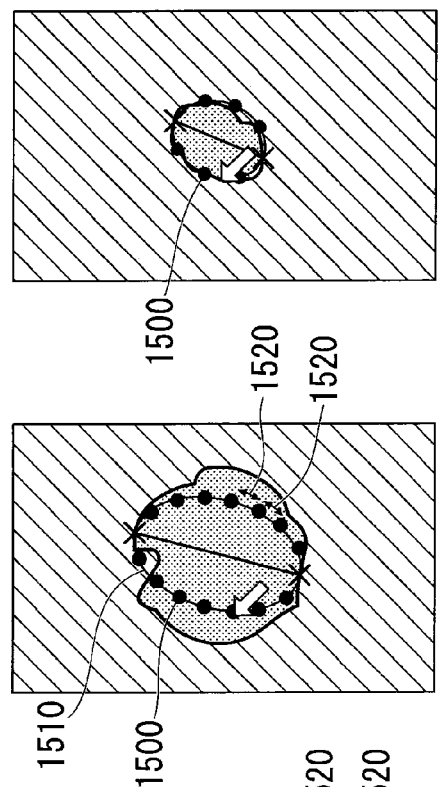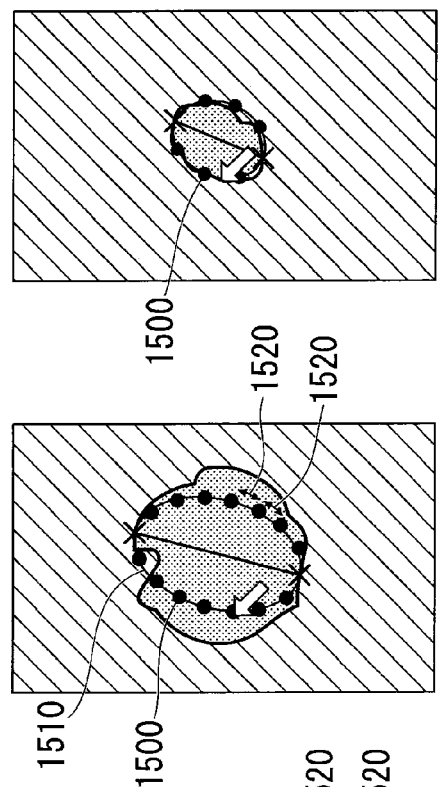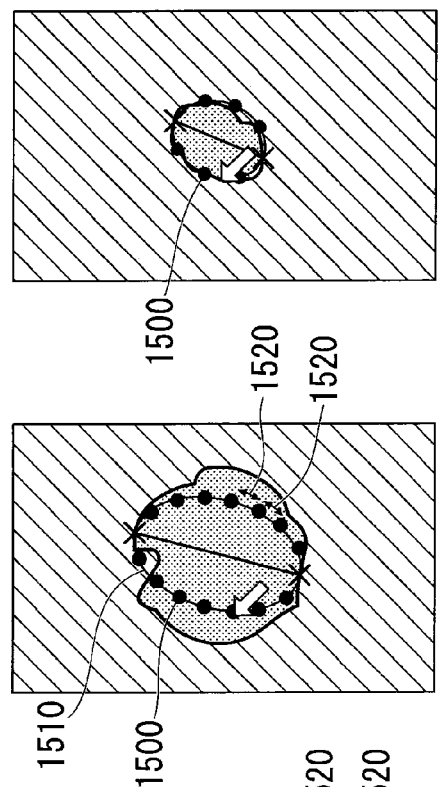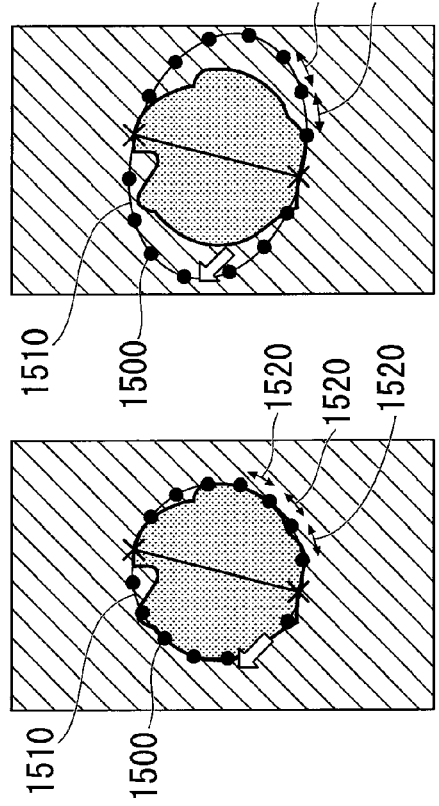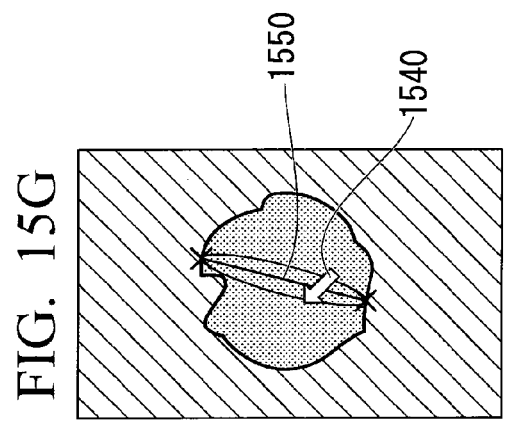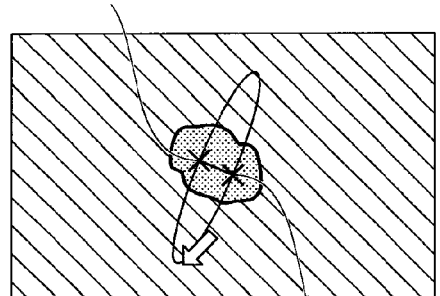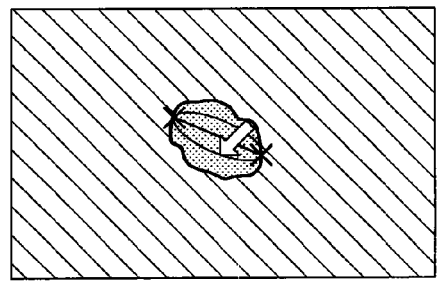

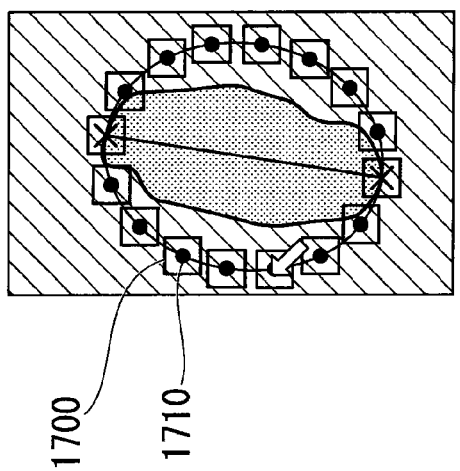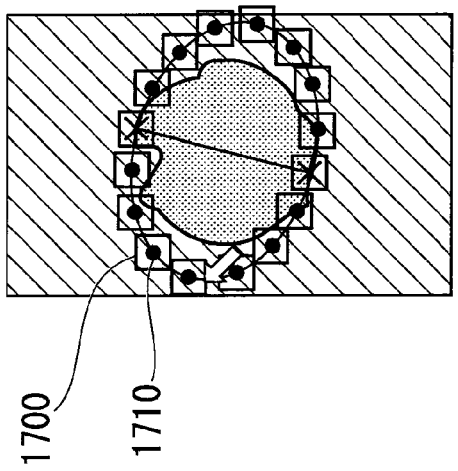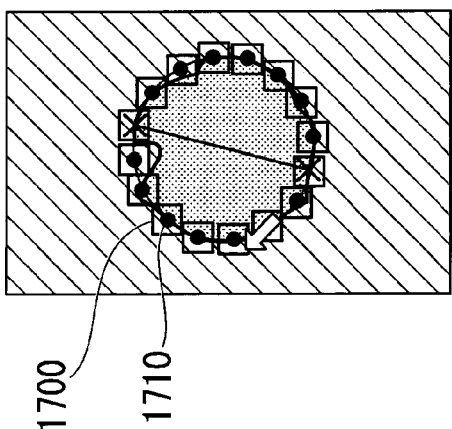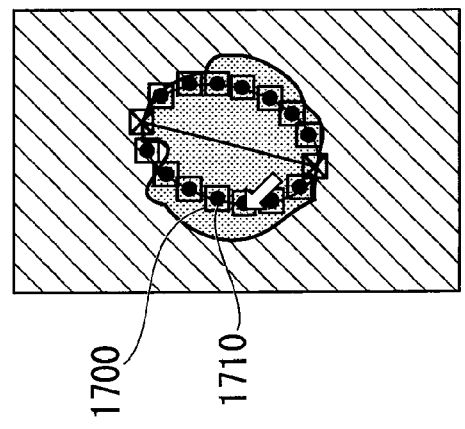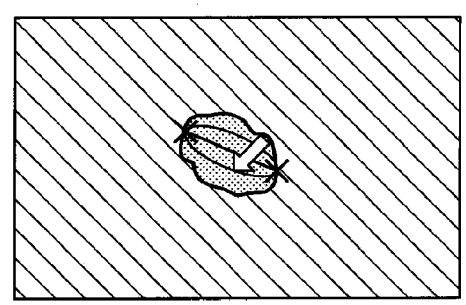

FIG. 37A  FIG. 37B  FIG. 37C
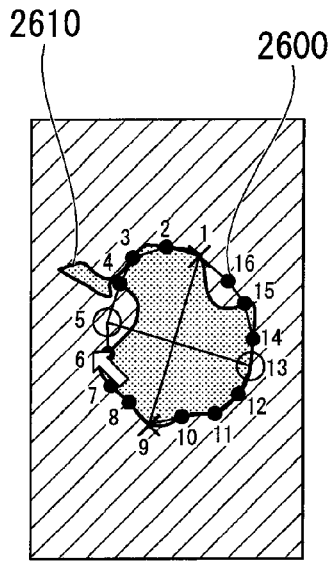
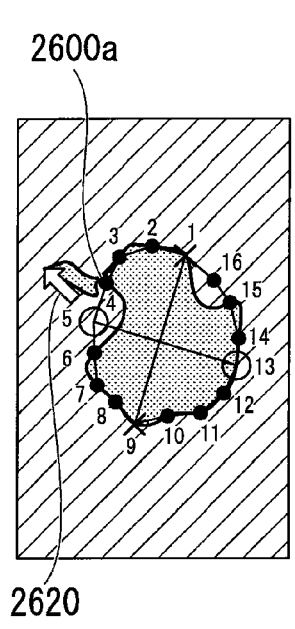
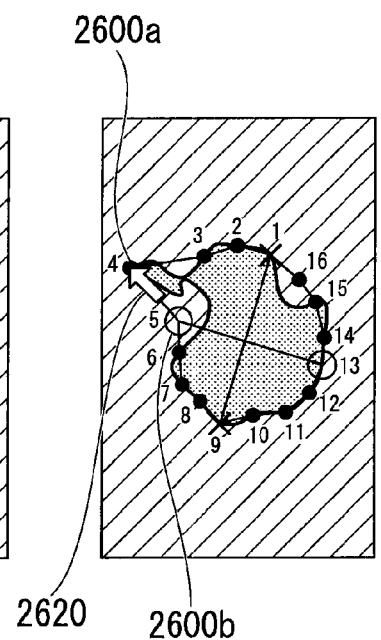
FIG. 37D  FIG. 37E
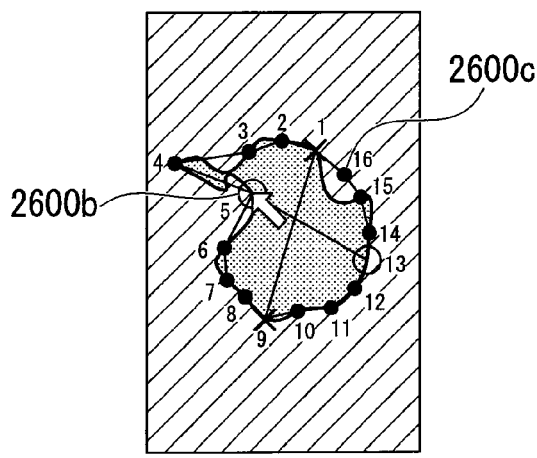
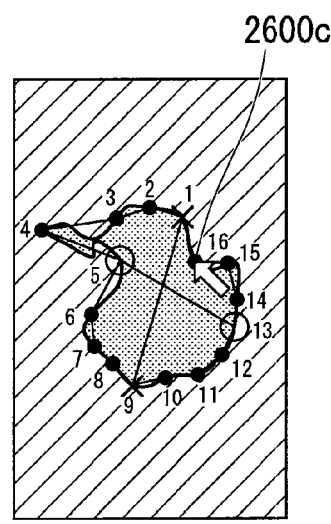

FIG. 39A

LABEL TABLE (DEFAULT STATE)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 39B

LABEL TABLE (CORRECTED 1)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4', Y4') | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 40A

LABEL TABLE (CORRECTED 2)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4', Y4') | 3 | 5 |
| 5 | (X5', Y5') | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 40B

LABEL TABLE (CORRECTED 3)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4', Y4') | 3 | 5 |
| 5 | (X5', Y5') | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16', Y16') | 15 | 1 |

FIG. 45A
FIG. 45B
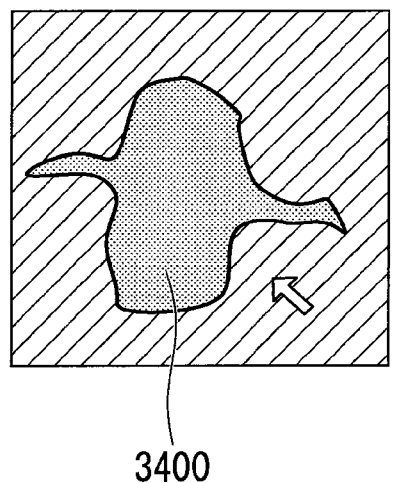
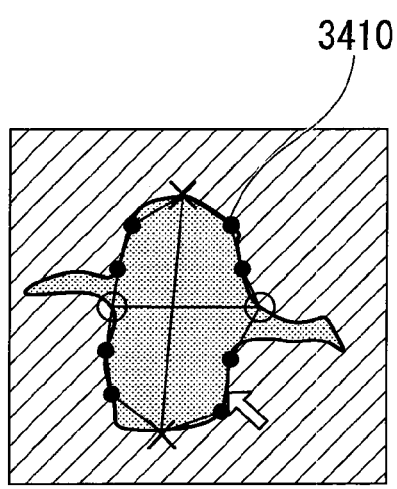
FIG. 45C
FIG. 45D
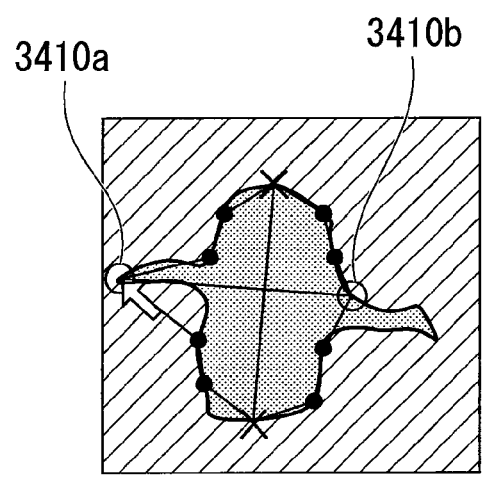
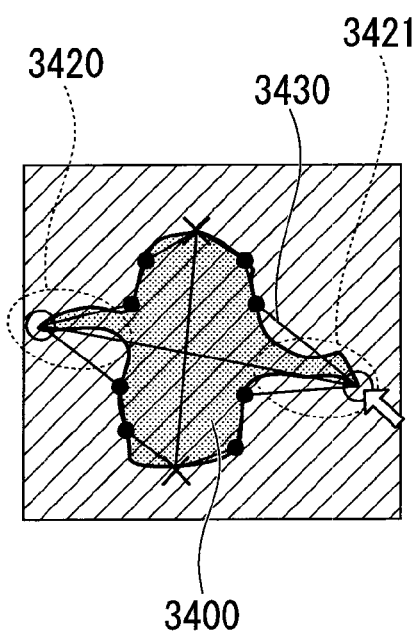

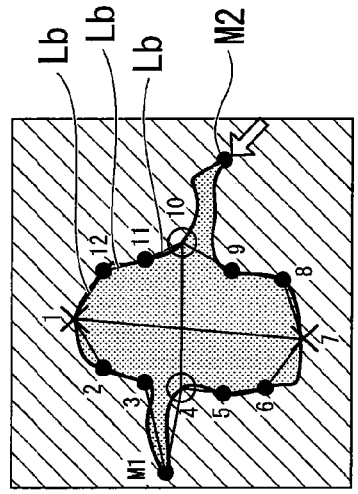
FIG. 47A
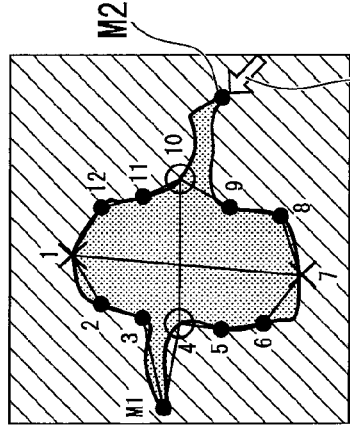
FIG. 47B
FIG. 47C
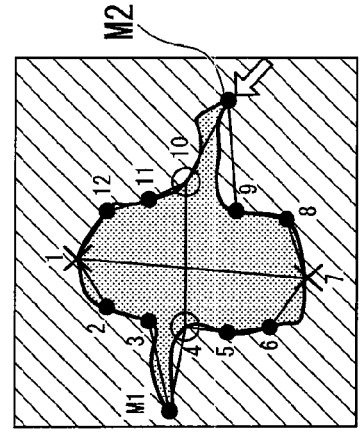
FIG. 47E
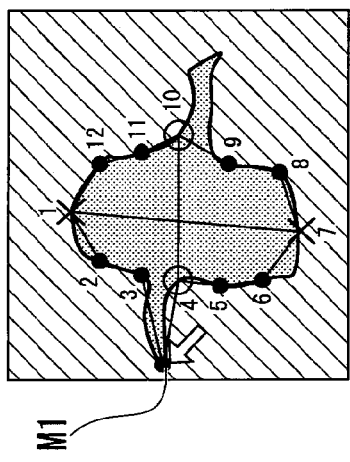
FIG. 47D

FIG. 49A

LABEL TABLE (DEFAULT STATE)

| LABEL NUMBER | COORDINATES | ADJACENT LABEL NUMBER 1 | ADJACENT LABEL NUMBER 2 |
|---|---|---|---|
| 1 | (X1, Y1) | 12 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 1 |

FIG. 49B

LABEL TABLE (CORRECTION POINT M1 ADDED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | M1 |
| M1 | (Xm1, Ym1) | 3 | 4 |
| 4 | (X4, Y4) | M1 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 1 |

FIG. 50A

LABEL TABLE (CORRECTION POINT M2 ADDED)

| LABEL NUMBER | COORDINATES | ADJACENT LABEL NUMBER 1 | ADJACENT LABEL NUMBER 2 |
|---|---|---|---|
| 1 | (X1, Y1) | 12 | 2 |
| 2 | (X2, Y2) | 1 | 3 |
| 3 | (X3, Y3) | 2 | M1 |
| M1 | (Xm1, Ym1) | 3 | 4 |
| 4 | (X4, Y4) | M1 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | M2 |
| M2 | (Xm2, Ym2) | 9 | 10 |
| 10 | (X10, Y10) | M2 | 11 |
| 11 | (X11, Y11) | 10 | 12 |
| 12 | (X12, Y12) | 11 | 1 |

FIG. 50B

LABEL TABLE (CORRECTION POINT M3 ADDED)

| LABEL NUMBER | COORDINATES | ADJACENT LABEL NUMBER 1 | ADJACENT LABEL NUMBER 2 |
|---|---|---|---|
| 1 | (X1, Y1) | 12 | 2 |
| 2 | (X2, Y2) | 1 | 3 |
| 3 | (X3, Y3) | 2 | M1 |
| M1 | (Xm1, Ym1) | 3 | 4 |
| 4 | (X4, Y4) | M1 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | M3 |
| M3 | (Xm3, Ym3) | 9 | M2 |
| M2 | (Xm2, Ym2) | M3 | 10 |
| 10 | (X10, Y10) | M2 | 11 |
| 11 | (X11, Y11) | 10 | 12 |
| 12 | (X12, Y12) | 11 | 1 |

4000

4010

M1

4020
L1

4030

M1

P2  P1  4000

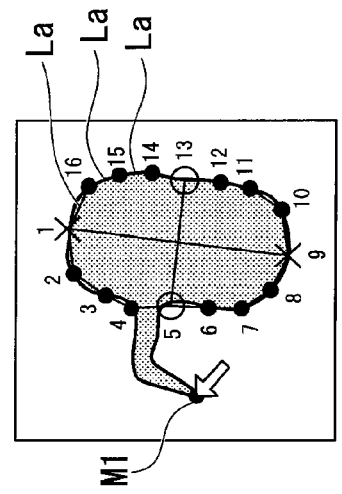
FIG. 52A
FIG. 52B
FIG. 52C
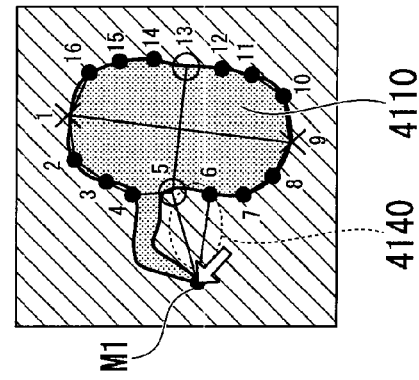
FIG. 52D
FIG. 52E
FIG. 52F

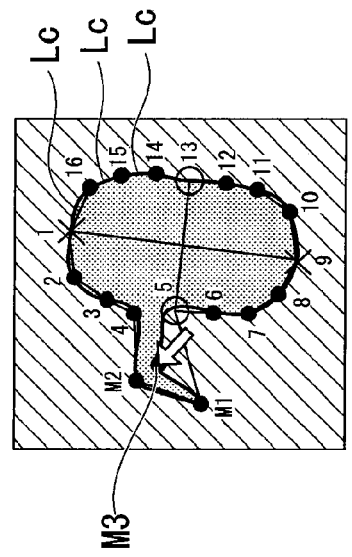
FIG. 54A
FIG. 54B
FIG. 54C
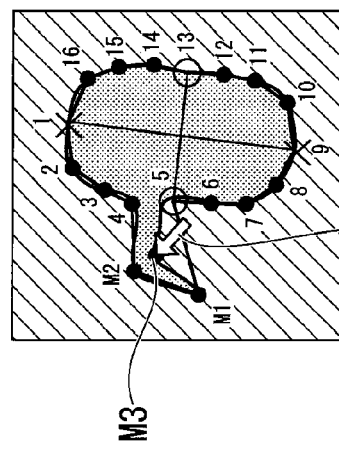
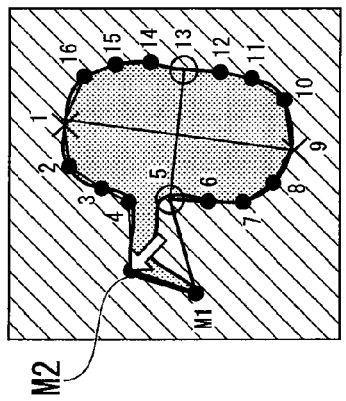
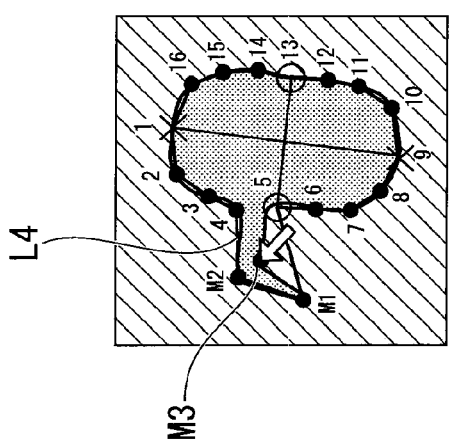
FIG. 54D
FIG. 54E

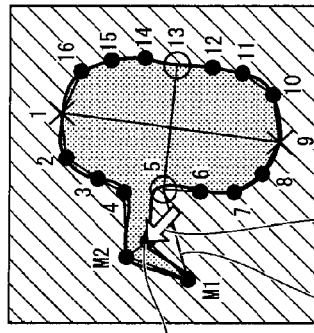
FIG. 55A
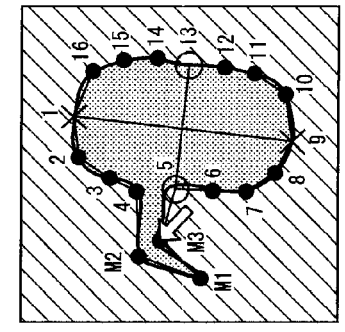
FIG. 55B
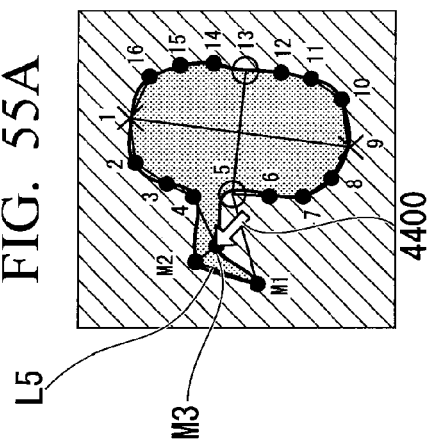
FIG. 55C
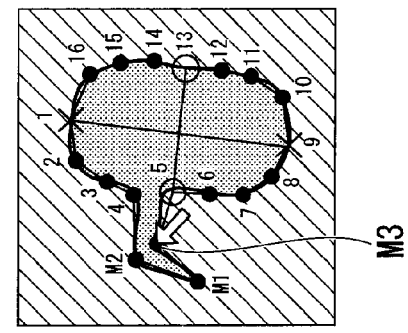
FIG. 55D
FIG. 55E

FIG. 56A
LABEL TABLE (DEFAULT STATE)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 56B
LABEL TABLE (CORRECTION POINT M1 ADDED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | M1 |
| M1 | (Xm1, Ym1) | 5 | 6 |
| 6 | (X6, Y6) | M1 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 57A
LABEL TABLE (CORRECTION POINT M1 DELETED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 57B
LABEL TABLE (CORRECTION POINT M1 ADDED AGAIN)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M1 |
| M1 | (Xm1, Ym1) | 4 | 5 |
| 5 | (X5, Y5) | M1 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 58A
LABEL TABLE
(CORRECTION POINT M2 ADDED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M2 |
| M2 | (Xm2, Ym2) | 4 | M1 |
| M1 | (Xm1, Ym1) | M2 | 5 |
| 5 | (X5, Y5) | M1 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 58B
LABEL TABLE
(CORRECTION POINT M3 ADDED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M3 |
| M3 | (Xm3, Ym3) | 4 | M2 |
| M2 | (Xm2, Ym2) | M3 | M1 |
| M1 | (Xm1, Ym1) | M2 | 5 |
| 5 | (X5, Y5) | M1 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 59A
LABEL TABLE (CORRECTION POINT M3 DELETED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M2 |
| M2 | (Xm2, Ym2) | 4 | M1 |
| M1 | (Xm1, Ym1) | M2 | 5 |
| 5 | (X5, Y5) | M1 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 59B
LABEL TABLE (CORRECTION POINT M3 ADDED AGAIN)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M2 |
| M2 | (Xm2, Ym2) | 4 | M3 |
| M3 | (Xm3, Ym3) | M2 | M1 |
| M1 | (Xm1, Ym1) | M3 | 5 |
| 5 | (X5, Y5) | M1 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 60A

LABEL TABLE (CORRECTION POINT M3 DELETED AGAIN)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M2 |
| M2 | (Xm2, Ym2) | 4 | M1 |
| M1 | (Xm1, Ym1) | M2 | 5 |
| 5 | (X5, Y5) | M1 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 60B

LABEL TABLE (CORRECTION POINT M3 ADDED AGAIN (SECOND TIME))

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | M2 |
| M2 | (Xm2, Ym2) | 4 | M1 |
| M1 | (Xm1, Ym1) | M2 | M3 |
| M3 | (Xm3, Ym3) | M1 | 5 |
| 5 | (X5, Y5) | M3 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

5000

5010

P1  P2

5020

P2  P1

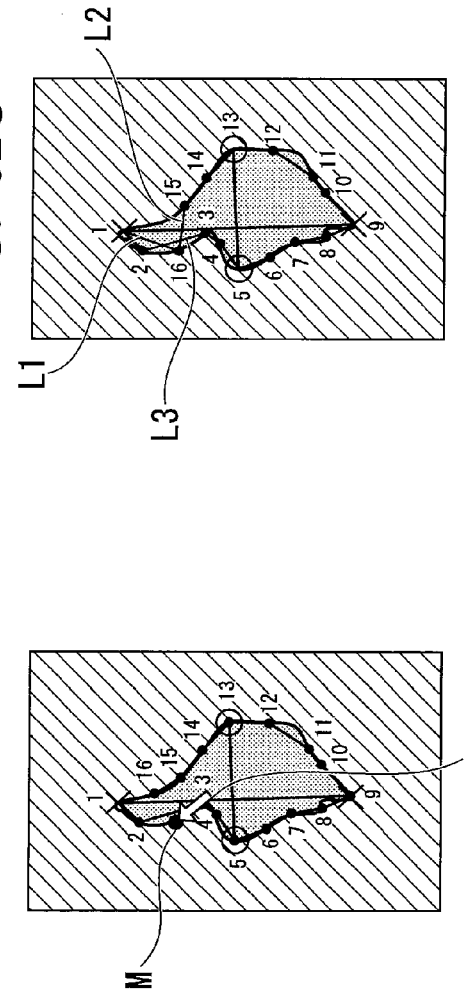
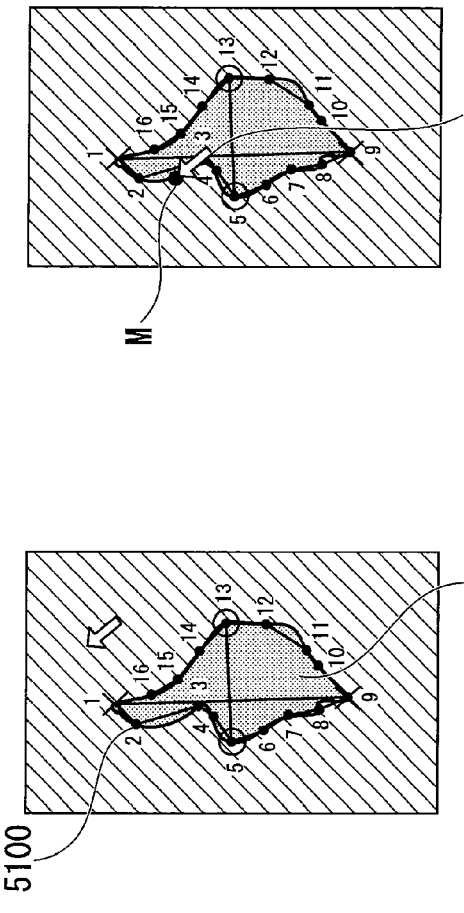
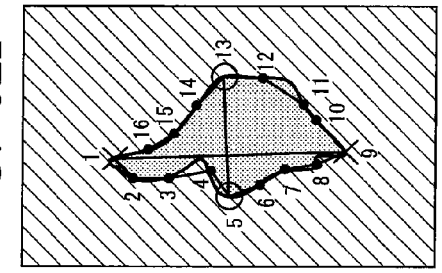
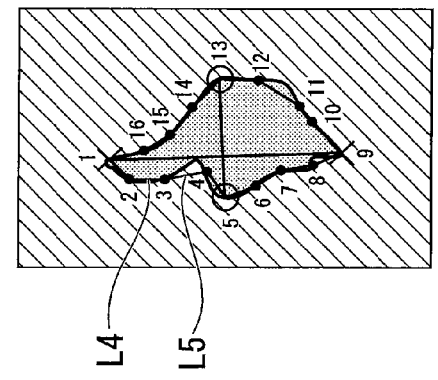
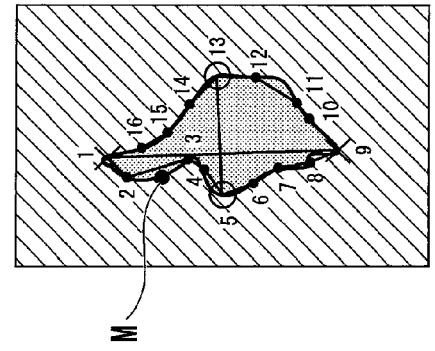

FIG. 63A

LABEL TABLE (DEFAULT STATE)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 63B

LABEL TABLE (FORMATION POINT 16 CORRECTED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (Xm, Ym) | 15 | 1 |

FIG. 64A
LABEL TABLE (LINE SEGMENTS L1, L2 COMPUTED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (Xm, Ym) | 15 | 1 |

FIG. 64B
LABEL TABLE (RETURNED TO DEFAULT)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (X3, Y3) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 65A

LABEL TABLE (FORMATION POINT 3 CORRECTED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (Xm, Ym) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

FIG. 65B

LABEL TABLE (LINE SEGMENTS L4, L5 COMPUTED)

| LABEL NUMBER | COORDINATES | ADJACENT LABEL NUMBER 1 | ADJACENT LABEL NUMBER 2 |
|---|---|---|---|
| 1 | (X1, Y1) | 16 | 2 |
| 2 | (X2, Y2) | 1 | 3 |
| 3 | (Xm, Ym) | 2 | 4 |
| 4 | (X4, Y4) | 3 | 5 |
| 5 | (X5, Y5) | 4 | 6 |
| 6 | (X6, Y6) | 5 | 7 |
| 7 | (X7, Y7) | 6 | 8 |
| 8 | (X8, Y8) | 7 | 9 |
| 9 | (X9, Y9) | 8 | 10 |
| 10 | (X10, Y10) | 9 | 11 |
| 11 | (X11, Y11) | 10 | 12 |
| 12 | (X12, Y12) | 11 | 13 |
| 13 | (X13, Y13) | 12 | 14 |
| 14 | (X14, Y14) | 13 | 15 |
| 15 | (X15, Y15) | 14 | 16 |
| 16 | (X16, Y16) | 15 | 1 |

ENDOSCOPE APPARATUS AND METHOD OF MEASURING OBJECT

BACKGROUND OF THE INVENTION

1. Field of the Invention

The present invention relates to an endoscope apparatus that performs measurement processing of an object based on an image picked up by an endoscope, and to a method of measuring an object.

2. Description of Related Art

In gas turbines mainly used in aircraft, their internal portions come to reach a high temperature. This sometimes results in production of a defect portion such as a burn or tarnish (hereinafter, referred to as burning) on a surface of a turbine blade. The size (dimension) of this burning is one of the indices for determining whether to replace the blade or not. This inspection is extremely important. To address such circumstances, in conventional endoscope apparatuses for measurement, the size of an object such as a burning in an image where an image of the object is picked up (hereinafter, referred to as a measurement image) is measured by a user sequentially specifying base points so as to surround the object along the edge of the object (for example, see Patent Document 1).

Patent Document 1: Japanese Unexamined Patent Application, First Publication No. 2001-275934

SUMMARY OF THE INVENTION

The present invention is an endoscope apparatus that includes: an image pickup portion that picks up an image of an object; and a measurement portion that measures the object based on the image of the object obtained by the image pickup portion, in which the measurement portion includes: a specification portion that specifies three base points on the image; a composing point calculation portion that calculates composing points forming an object region of the object, based on an image region that is based on a plurality of points, the points set on a line determined by the three base points that are specified by the specification portion; and a size calculation portion that calculates a size of the object based on the composing points.

BRIEF DESCRIPTION OF THE DRAWINGS

FIG. 15A is a reference diagram showing a property between the number of search points and their distances in the first embodiment of the present invention.

FIG. 15B is a references diagram showing a property between the number of search points and their distances in the first embodiment of the present invention.

FIG. 15C is a reference diagram showing a property between the number of search points and their distances in the first embodiment of the present invention.

FIG. 15D is a reference diagram showing a property between the number of search points and their distances in the first embodiment of the present invention.

FIG. 15E is a reference diagram showing a property between the number of search points and their distances in the first embodiment of the present invention.

FIG. 15F is a reference diagram showing a property between the number of search points and their distances in the first embodiment of the present invention.

FIG. 15G is a reference diagram showing a property between the number of search points and their distances in the first embodiment of the present invention.

FIG. 17A is a reference diagram showing a property of a size of a search area in the first embodiment of the present invention.

FIG. 17B is a reference diagram showing a property of a size of a search area in the first embodiment of the present invention.

FIG. 17C is a reference diagram showing a property of a size of a search area in the first embodiment of the present invention.

FIG. 17D is a reference diagram showing a property of a size of a search area in the first embodiment of the present invention.

FIG. 17E is a reference diagram showing a property of a size of a search area in the first embodiment of the present invention.

FIG. 37A is a reference diagram showing a correction procedure of a burning composing point in the second embodiment of the present invention.

FIG. 37B is a reference diagram showing the correction procedure of a burning composing point in the second embodiment of the present invention.

FIG. 37C is a reference diagram showing the correction procedure of a burning composing point in the second embodiment of the present invention.

FIG. 37D is a reference diagram showing the correction procedure of a burning composing point in the second embodiment of the present invention.

FIG. 37E is a reference diagram showing the correction procedure of a burning composing point in the second embodiment of the present invention.

FIG. 39A is a reference diagram showing a label table in the second embodiment of the present invention.

FIG. 39B is a reference diagram showing a label table in the second embodiment of the present invention.

FIG. 40A is a reference diagram showing a label table in the second embodiment of the present invention.

FIG. 40B is a reference diagram showing a label table in the second embodiment of the present invention.

FIG. 45A is a reference diagram showing how burning composing points are corrected in the second embodiment of the present invention.

FIG. 45B is a reference diagram showing how burning composing points are corrected in the second embodiment of the present invention.

FIG. 45C is a reference diagram showing how burning composing points are corrected in the second embodiment of the present invention.

FIG. 45D is a reference diagram showing how burning composing points are corrected in the second embodiment of the present invention.

FIG. 47A is a reference diagram showing a correction procedure of burning composing points in the third embodiment of the present invention.

FIG. 47B is a reference diagram showing the correction procedure of burning composing points in the third embodiment of the present invention.

FIG. 47C is a reference diagram showing the correction procedure of burning composing points in the third embodiment of the present invention.

FIG. 47D is a reference diagram showing the correction procedure of burning composing points in the third embodiment of the present invention.

FIG. 47E is a reference diagram showing the correction procedure of burning composing points in the third embodiment of the present invention.

FIG. 49A is a reference diagram showing a label table in the third embodiment of the present invention.

FIG. 49B is a reference diagram showing a label table in the third embodiment of the present invention.

FIG. 50A is a reference diagram showing a label table in the third embodiment of the present invention.

FIG. 50B is a reference diagram showing a label table in the third embodiment of the present invention.

FIG. 52A is a reference diagram showing a correction procedure of burning composing points in a fourth embodiment of the present invention.

FIG. 52B is a reference diagram showing the correction procedure of burning composing points in the fourth embodiment of the present invention.

FIG. 52C is a reference diagram showing the correction procedure of burning composing points in the fourth embodiment of the present invention.

FIG. 52D is a reference diagram showing the correction procedure of burning composing points in the fourth embodiment of the present invention.

FIG. 52E is a reference diagram showing the correction procedure of burning composing points in the fourth embodiment of the present invention.

FIG. 52F is a reference diagram showing the correction procedure of burning composing points in the fourth embodiment of the present invention.

FIG. 53A is a reference diagram showing the correction procedure of burning composing points in the fourth embodiment of the present invention.

FIG. 53B is a reference diagram showing the correction procedure of burning composing points in the fourth embodiment of the present invention.

FIG. 53C is a reference diagram showing the correction procedure of burning composing points in the fourth embodiment of the present invention.

FIG. 53D is a reference diagram showing the correction procedure of burning composing points in the fourth embodiment of the present invention.

FIG. 53E is a reference diagram showing the correction procedure of burning composing points in the fourth embodiment of the present invention.

FIG. 54A is a reference diagram showing the correction procedure of burning composing points in the fourth embodiment of the present invention.

FIG. 54B is a reference diagram showing the correction procedure of burning composing points in the fourth embodiment of the present invention.

FIG. 54C is a reference diagram showing the correction procedure of burning composing points in the fourth embodiment of the present invention.

FIG. 54D is a reference diagram showing the correction procedure of burning composing points in the fourth embodiment of the present invention.

FIG. 54E is a reference diagram showing the correction procedure of burning composing points in the fourth embodiment of the present invention.

FIG. 55A is a reference diagram showing the correction procedure of burning composing points in the fourth embodiment of the present invention.

FIG. 55B is a reference diagram showing the correction procedure of burning composing points in the fourth embodiment of the present invention.

FIG. 55C is a reference diagram showing the correction procedure of burning composing points in the fourth embodiment of the present invention.

FIG. 55D is a reference diagram showing the correction procedure of burning composing points in the fourth embodiment of the present invention.

FIG. 55E is a reference diagram showing the correction procedure of burning composing points in the fourth embodiment of the present invention.

FIG. 56A is a reference diagram showing a label table in the fourth embodiment of the present invention.

FIG. 56B is a reference diagram showing a label table in the fourth embodiment of the present invention.

FIG. 57A is a reference diagram showing a label table in the fourth embodiment of the present invention.

FIG. 57B is a reference diagram showing a label table in the fourth embodiment of the present invention.

FIG. 58A is a reference diagram showing a label table in the fourth embodiment of the present invention.

FIG. 58B is a reference diagram showing a label table in the fourth embodiment of the present invention.

FIG. 59A is a reference diagram showing a label table in the fourth embodiment of the present invention.

FIG. 59B is a reference diagram showing a label table in the fourth embodiment of the present invention.

FIG. 60A is a reference diagram showing a label table in the fourth embodiment of the present invention.

FIG. 60B is a reference diagram showing a label table in the fourth embodiment of the present invention.

Figure 61A:
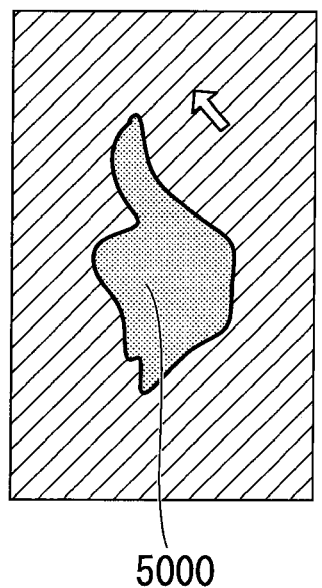

FIG. 61A is a reference diagram showing how a burning composing point is corrected in the second embodiment of the present invention.

Figure 61B:
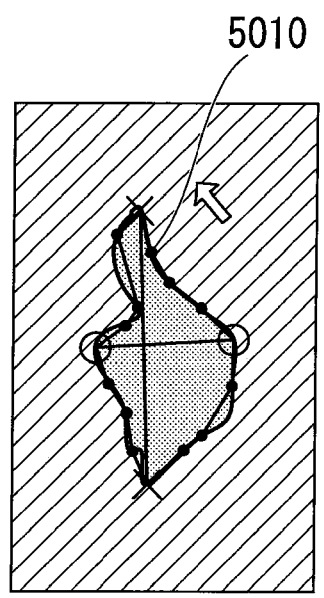

FIG. 61B is a reference diagram showing how a burning composing point is corrected in the second embodiment of the present invention.

Figure 61C:
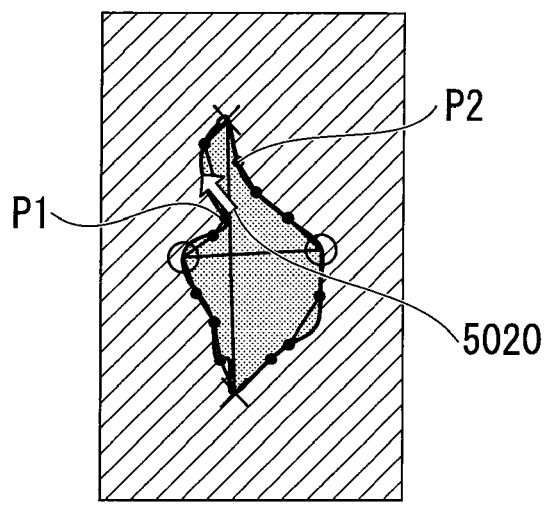

FIG. 61C is a reference diagram showing how a burning composing point is corrected in the second embodiment of the present invention.

Figure 61D:
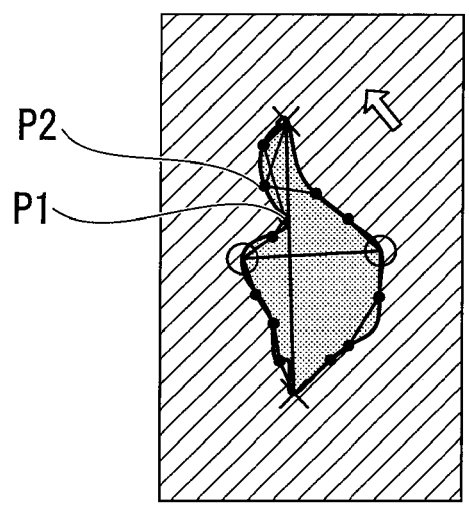

FIG. 61D is a reference diagram showing how a burning composing point is corrected in the second embodiment of the present invention.

FIG. 62A is a reference diagram showing a correction procedure of burning composing points in a fifth embodiment of the present invention.

FIG. 62B is a reference diagram showing a correction procedure of burning composing points in the fifth embodiment of the present invention.

FIG. 62C is a reference diagram showing a correction procedure of burning composing points in the fifth embodiment of the present invention.

FIG. 62D is a reference diagram showing a correction procedure of burning composing points in the fifth embodiment of the present invention.

FIG. 62E is a reference diagram showing a correction procedure of burning composing points in the fifth embodiment of the present invention.

FIG. 62F is a reference diagram showing a correction procedure of burning composing points in the fifth embodiment of the present invention.

FIG. 63A is a reference diagram showing a label table in the fifth embodiment of the present invention.

FIG. 63B is a reference diagram showing a label table in the fifth embodiment of the present invention.

FIG. 64A is a reference diagram showing a label table in the fifth embodiment of the present invention.

FIG. 64B is a reference diagram showing a label table in the fifth embodiment of the present invention.

FIG. 65A is a reference diagram showing a label table in the fifth embodiment of the present invention.

FIG. 65B is a reference diagram showing a label table in the fifth embodiment of the present invention.

Figure 66A:
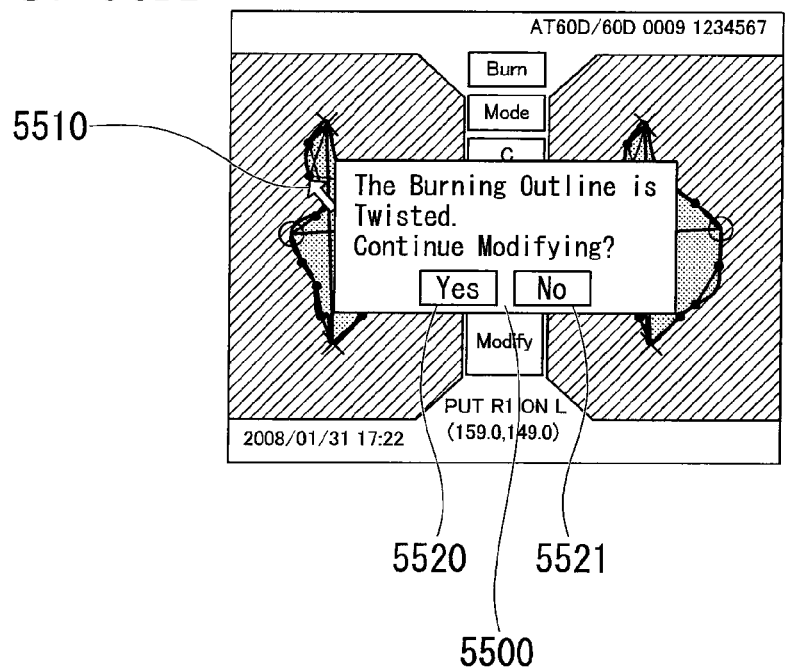

FIG. 66A is a reference diagram showing a measurement screen in the fifth embodiment of the present invention.

Figure 66B:
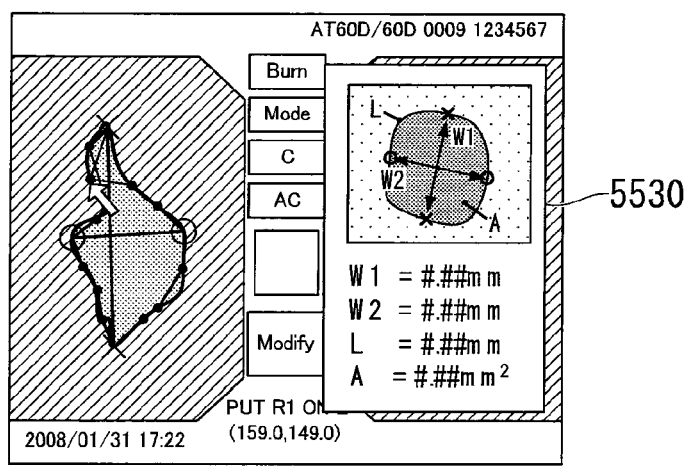

FIG. 66B is a reference diagram showing a measurement screen in the fifth embodiment of the present invention.

DETAILED DESCRIPTION OF THE INVENTION

Hereunder is a description of embodiments of the present invention with reference to the drawings.

First Embodiment

Figure 1:
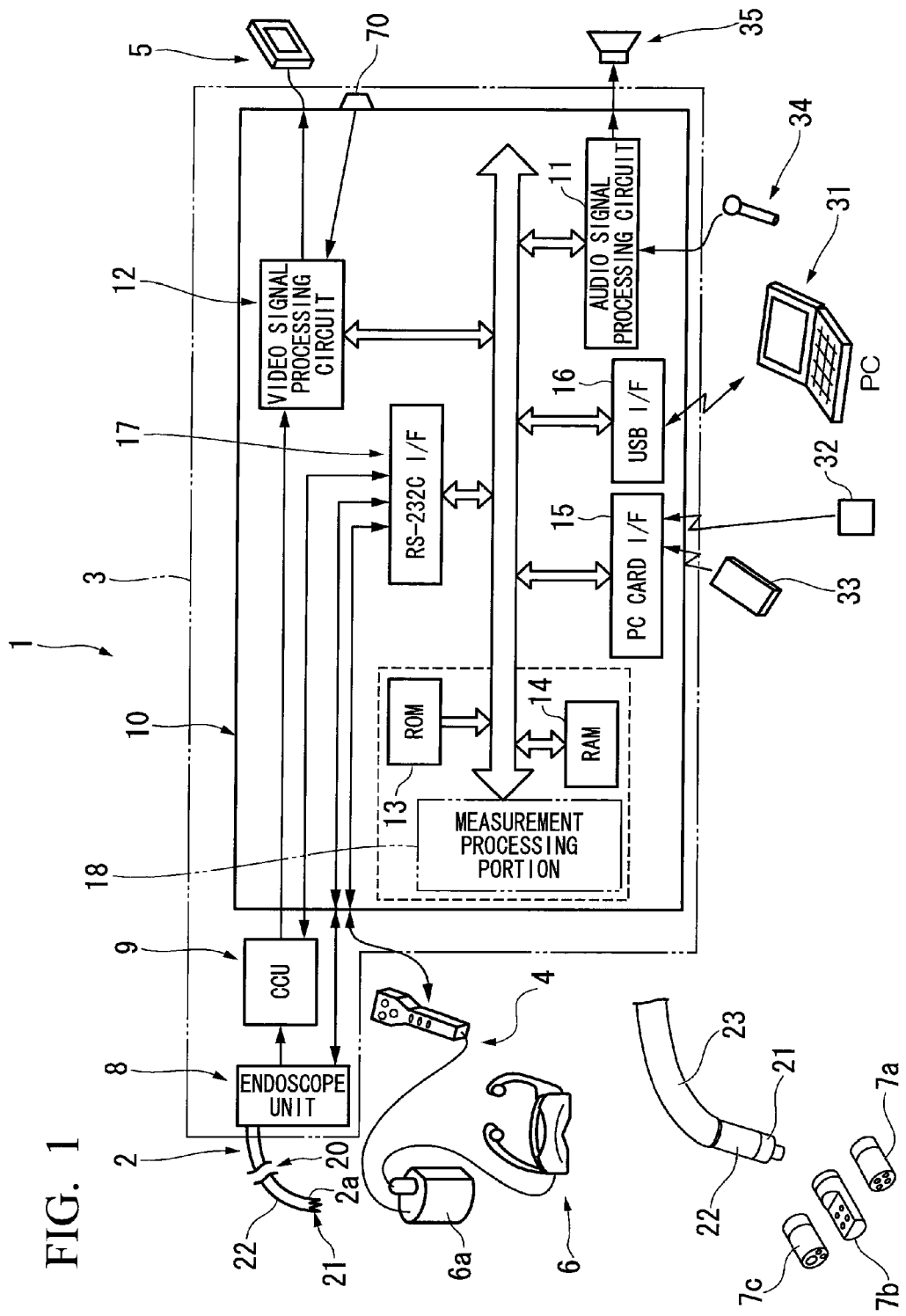
FIG. 1 is a block diagram showing a configuration of an endoscope apparatus for measurement according to a first embodiment of the present invention.

FIG. 1 shows a configuration of an endoscope apparatus for measurement according to a first embodiment of the present invention. As shown in FIG. 1, an endoscope apparatus for measurement 1 includes: an endoscope 2; a main unit 3; a remote controller 4 (input portion); a liquid crystal monitor 5; a face mount display (FMD) 6; an FMD adapter 6a; optical adapters 7a, 7b, and 7c; an endoscope unit 8; a camera control unit 9; and a control unit 10.

The endoscope 2 (electron endoscope) for picking up an image of an object to generate its image signal includes an elongated insertion portion 20. The insertion portion 20 is made of: a hard tip portion 21; a bend portion 22 capable of being bent in, for example, upward, downward, leftward, and rightward; and a flexible tube portion 23 with pliancy, which are coupled in this order from the tip side. The proximal portion of the insertion portion 20 is connected to the endoscope unit 8. Various optical adapters such as the optical adapter 7a or 7b for stereo (hereinafter, referred to as stereo optical adapter) with two observation fields or the normal observation optical adapter 7c with only one observation field are configured to be attachable/detachable to the tip portion 21 by, for example, screw jointing.

The main unit 3; includes: the endoscope unit 8; the camera control unit (hereinafter, referred to as CCU) 9 (video signal generation portion) as an image processing device; and the control unit 10. The endoscope unit 8 includes: a light source apparatus for supplying necessary illumination light at the time of observation; and a bending apparatus for bending the bend portion 22 that constitutes the insertion portion 20. The CCU 9 receives an image signal that has been output from a solid-state imaging device 2a internally provided in the tip portion 21 of the insertion portion 20, converts the image signal to a video signal such as an NTSC signal, and supplies it to the control unit 10.

The control unit 10 includes: an audio signal processing circuit 11; a video signal processing circuit 12 (display signal generation portion); a ROM 13; a RAM 14; a PC card interface (hereinafter, referred to as PC card I/F) 15; a USB interface (hereinafter, referred to as USB I/F) 16; an RS-232C interface (hereinafter, referred to as RS-232C I/F) 17; and a measurement processing portion 18.

An audio signal collected by the microphone 34 or an audio signal obtained by playing back a recording medium such as a memory card is supplied to the audio signal processing circuit 11. To display a synthesized image in which an endoscope image supplied from the CCU 9 and a graphical operation menu are synthesized, the video signal processing circuit 12 synthesizes a video signal from the CCU 9 with a graphic image signal such as for an operation menu generated through the control by the measurement processing portion 18. In addition, to display a video on the screen of the liquid crystal monitor 5, the video signal processing circuit 12 subjects the video signal after the synthesis to predetermined processing, and supplies it to the liquid crystal monitor 5.

To the PC card I/F 15, a memory card (recording medium) such as a PCMCIA memory card 32 or a flash memory card 33 can be attached/detached. With the attachment of the memory card, the control processing information, image information, optical data, or the like that is stored in the memory card can be taken into the main unit 3; in accordance with the control by the measurement processing portion 18. Furthermore, control processing information, image information, optical data, or the like can be stored in the memory card.

The USB I/F 16 is an interface for electrically connecting the main unit 3; with a personal computer 31. With the electrical connection between the main unit 3; and the personal computer 31 via the USB I/F 16, the personal computer 31 can provide an instruction for displaying an endoscope image and an instruction for image processing at the time of measurement, or the like. In addition, input/output of various pieces of processing information and data is allowed between the main unit 3; and the personal computer 31.

To the RS-232C I/F 17, the CCU 9 and the endoscope unit 8 are connected. In addition, the remote controller 4 that performs the control and instruction operation of the CCU 9, the endoscope unit 8, and the like is connected to the RS-232C I/F 17. When a user operates the remote controller 4, communications necessary for controlling the CCU 9 and the endoscope unit 8 are carried out based on the operation.

Figure 2:
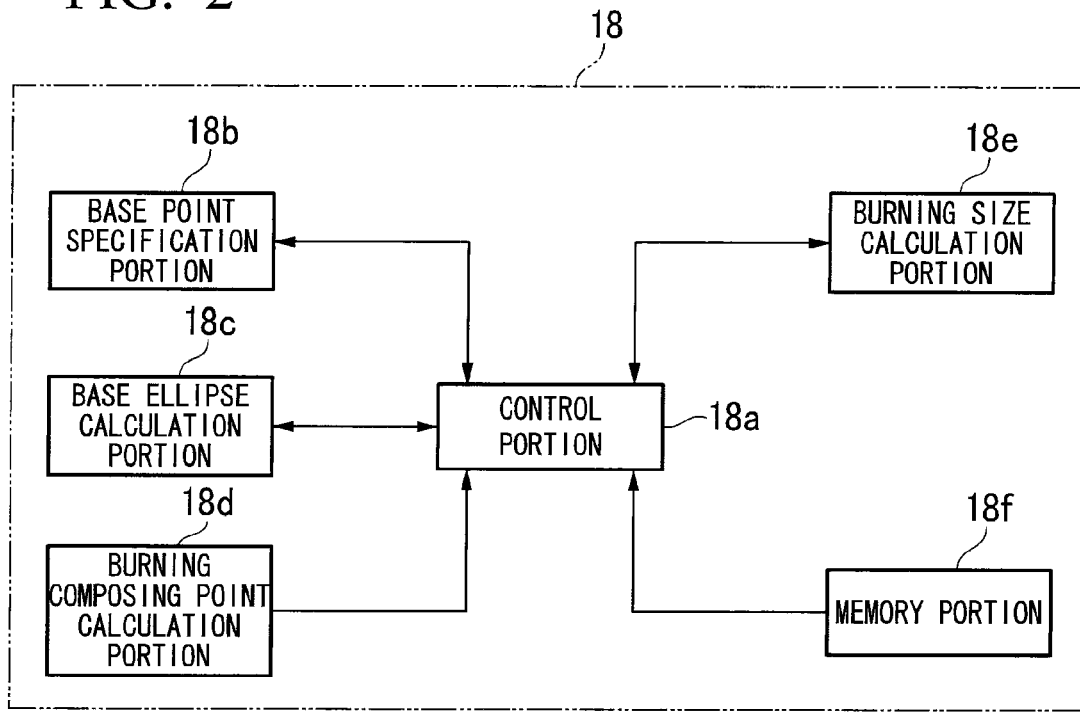
FIG. 2 is a block diagram showing a configuration of a measurement processing portion provided in the endoscope apparatus for measurement according to the first embodiment of the present invention.

The measurement processing portion 18 executes a program stored in the ROM 13, to thereby take in the video signal from the video signal processing circuit 12 and perform measurement processing based on the video signal. The RAM 14 is used by the measurement processing portion 18 as a work area for temporarily storing data. FIG. 2 shows a configuration of the measurement processing portion 18. As shown in FIG. 2, the measurement processing portion 18 includes: a control portion 18a; a base point specification portion 18b; a base ellipse calculation portion 18c; a burning composing point calculation portion 18d; a burning size calculation portion 18e; and a memory portion 18f.

The control portion 18a controls the respective portions in the measurement processing portion 18. Furthermore, the control portion 18a is capable of generating a graphic image signal for displaying the measurement result, the operation menu, and the like on the liquid crystal monitor 5 or the face mount display 6 and of outputting the graphic image signal to the video signal processing circuit 12.

The base point specification portion 18b specifies base points (the details of which will be described later) on an object based on the signal that is input from the remote controller 4 or the PC 31 (input portion).

When a user inputs a desired base point while looking at the image of the object displayed on the liquid crystal monitor 5 or the face mount display 6, its coordinates are calculated by the base point specification portion 18b.

Based on the base points specified by the base point specification portion 18b, the base ellipse calculation portion 18c calculates a base ellipse (the detail of which will be described later) corresponding to an outline approximation line that approximates to an outline of the object. Based on the base points and the base ellipse, the burning composing point calculation portion 18d calculates burning composing points (the detail of which will be described later) that form an edge (an outline) of the burning formed in the object.

The burning size calculation portion 18e measures a size of the burning based on the burning composing points. The memory portion 18f stores various pieces of information that are processed in the measurement processing portion 18. The various pieces of information stored in the memory portion 18f are appropriately read by the control portion 18a and are then output to the respective portions.

Figure 3:
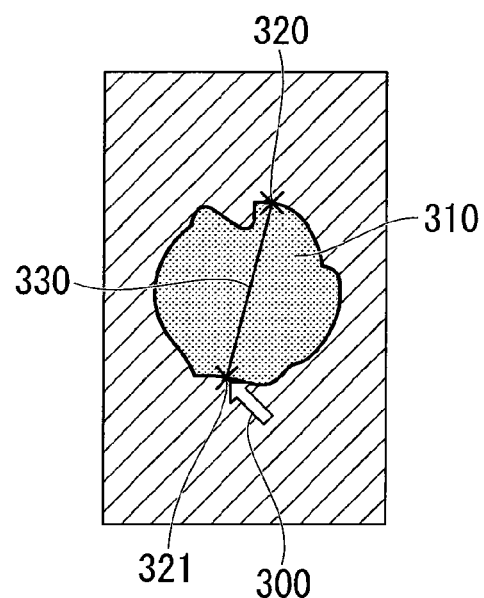
FIG. 3 is a reference diagram showing base points and a base line in the first embodiment of the present invention.

Next is a description of the terms used in the present embodiment. First, the terms "base point", "base line", and "base ellipse" will be described with reference to FIG. 3 and FIG. 4. A base point is a point on the measurement screen actually specified by the user. While looking at the measurement screen, the user operates the remote controller 4 or the PC 31 to specify a base point. As shown in FIG. 3, a cursor 300 showing a specified position is displayed on the measurement screen. In accordance with the operation on the remote controller 4 or the PC 31 by the user, the cursor 300 is moved. When the user inputs an instruction for specifying a base point in a state with the cursor 300 having been moved to a desired position, the base point is set to the position of the cursor 300. Subsequently, while the cursor 300 is moved, a specification for a next base point is made similarly. In the present embodiment, three base points are sequentially specified. At first, the user specifies two base points 320, 321 located on both ends of a burning 310, as shown in FIG. 3.

Figure 4A:
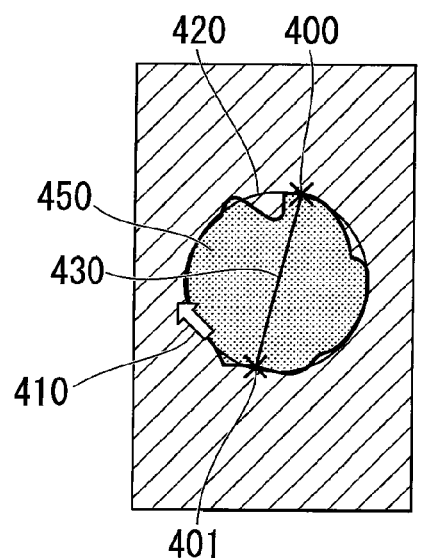
FIG. 4A is a reference diagram showing a base ellipse according to the first embodiment of the present invention.
Figure 4B:
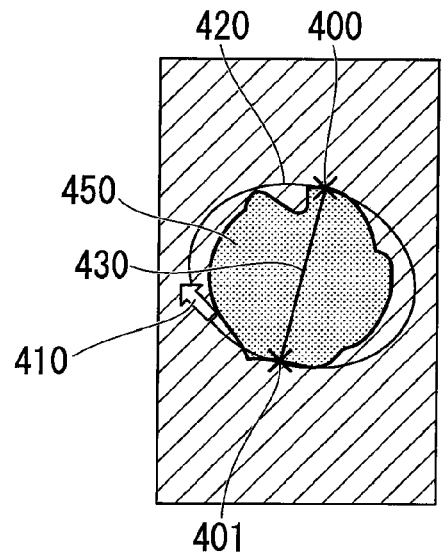
FIG. 4B is a reference diagram showing a base ellipse according to the first embodiment of the present invention.
Figure 4C:
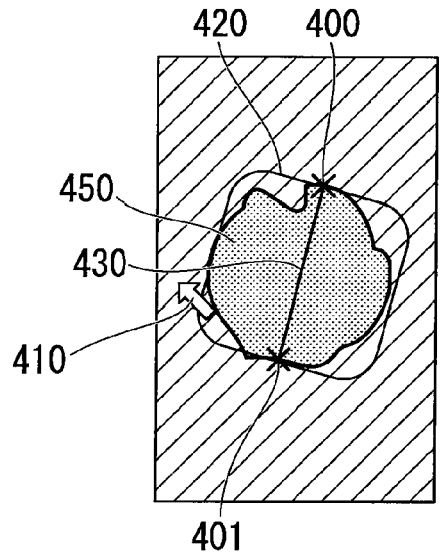
FIG. 4C is a reference diagram showing a base ellipse according to the first embodiment of the present invention.

A base line is a line formed by connecting the first base point and the second base point that have been specified on the measurement screen by the user. As shown in FIG. 3, a line 330 that connects the base points 320, 321 is a base line. A base ellipse is an ellipse that is set and displayed on the measurement screen when the user specifies a third base point, and is also a line that is determined by the three base points specified by the base point specification portion. The base ellipse corresponds to a curve that approximates to the edge of the burning. As shown in FIG. 4A, when base points 400, 401 are specified, a base ellipse 420 that passes through the positions of the base points 400, 401 is displayed. The base ellipse 420 has a base line 430 as a first diameter, and has a second diameter and its curvature changed in accordance with the position of a cursor 410 (FIG. 4A to FIG. 4C). The user adjusts the position of the cursor 410 so that the shape of the base ellipse 420 matches that of a burning 450 as closely as possible, and then inputs an instruction for specifying a third base point.

Figure 5A:
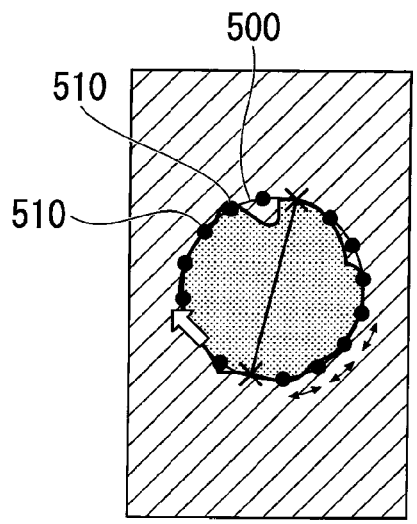
FIG. 5A is a reference diagram showing search points, search areas, and burning composing points in the first embodiment of the present invention.
Figure 5B:
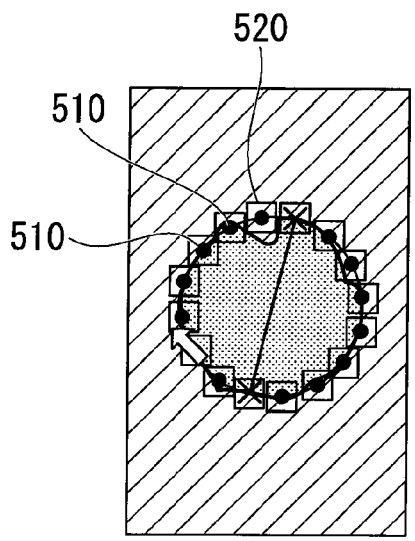
FIG. 5B is a reference diagram showing search points, search areas, and burning composing points in the first embodiment of the present invention.

Next, the terms "search point," "search area," and "burning composing point" will be described with reference to FIG. 5A to 5C. A search point is one of the points that are set on a base ellipse in an evenly spaced manner. Around each of the search points, which are points set on a line that is determined by the three base points specified by the base point specification portion, there is set a search area (described later). As shown in FIG. 5A, search points 510 are set on a base ellipse 500 in an evenly spaced manner. The first and second base points specified by the user are included in the search points. As will be described later, the number of and the space between the search points vary according to the size of the base ellipse.

A search area is a rectangular range which is located around a search point. The search area is used to perform an image processing for calculating burning composing points (described later). The search area is an image region based on the points set on the line that is determined by the three base points specified by the base point specification portion. As shown in FIG. 5B, a square search area 520 is set around each search point 510. As will be described later, the size of the search areas varies according to the size of the base ellipse. The shape of the search area is not limited to a square.

A burning composing point is one of the points that form an edge of a burning and is an object region.

Figure 5C:
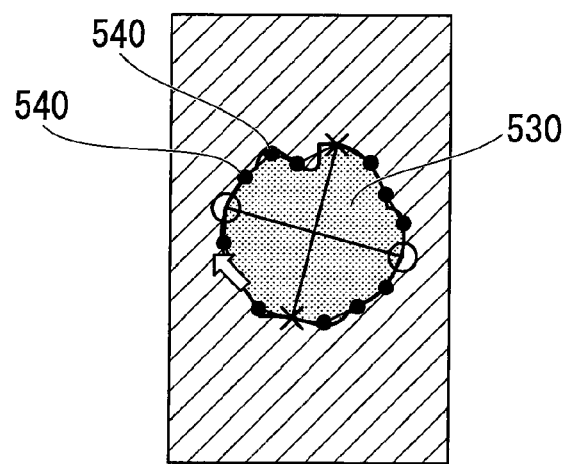
FIG. 5C is a reference diagram showing search points, search areas, and burning composing points in the first embodiment of the present invention.

As shown in FIG. 5C, burning composing points 540 are set on the edge of a burning 530. As will be described later, the burning composing points are found by subjecting the measurement images in the search areas to image processing.

Next, the term "burning size" will be described with reference to FIG. 6A to 6B. A burning size is a parameter that denotes a size of detected burning. The burning size calculated in the present embodiment includes two types of widths of burning, its perimeter length, and its area. To be more specific, a first width of a burning is a spatial distance (three-dimensional distance) between the two burning composing points that correspond to the first and second base points specified by the user. A second width of the burning is a spatial distance between the two burning composing points that correspond to two search points on a line orthogonal to the base line. A perimeter length is a sum total of the spatial spaces between all the adjacent burning composing points. An area is a spatial area of a region surrounded by all the burning composing points.

Figure 6A:
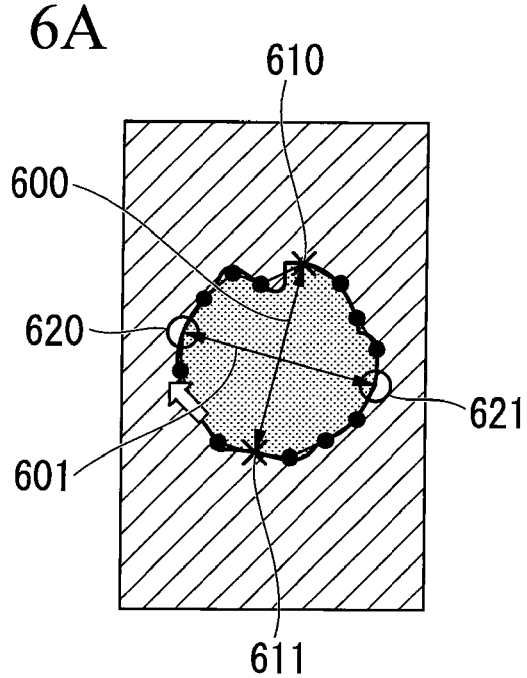
FIG. 6A is a reference diagram showing a burning size in the first embodiment of the present invention.
Figure 6B:
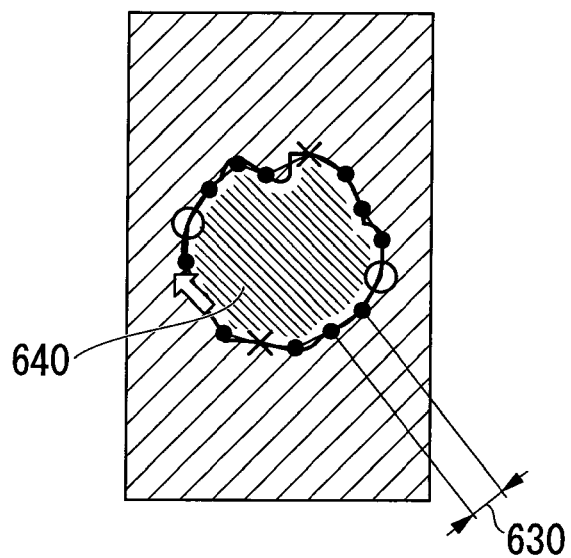
FIG. 6B is a reference diagram showing a burning size in the first embodiment of the present invention.

As shown in FIG. 6A to 6B, the first width 600 of a burning is calculated as a spatial distance between the two burning composing points that correspond to base points 610, 611 (FIG. 6A). The second width 601 of the burning is calculated as a spatial distance between the two burning composing points that correspond to search points 620, 621 on a line orthogonal to the base line (FIG. 6A). In the present embodiment, search points are calculated so as to include the search points 620, 621 on the line orthogonal to the base line. The perimeter length is calculated as a sum total of spatial distances 630 between all the adjacent burning composing points (FIG. 6B). The area is calculated as a spatial area of a region 640 surrounded by all the burning composing points (FIG. 6B).

Next is a description of a measurement screen in the present embodiment. In the present embodiment, a measurement of a burning by the stereo measurement is performed. In the stereo measurement, an image of an object is picked up in a state with a stereo optical adapter attached to the tip portion 21 of the endoscope 2. Therefore, on the measurement screen, an image of the object is displayed pairwise on the left and the right.

Figure 7:
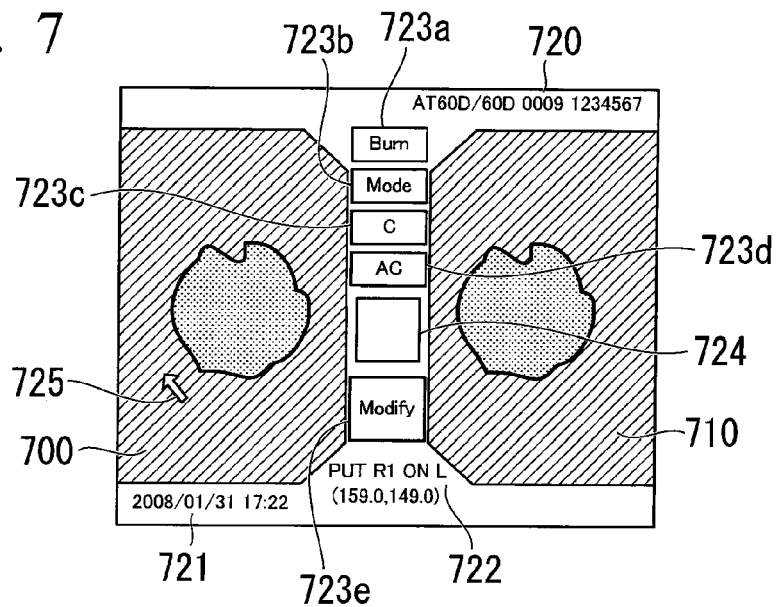
FIG. 7 is a reference diagram showing a measurement screen (before the start of measurement) in the first embodiment of the present invention.

FIG. 7 shows a measurement screen before the start of measurement. As measurement information, a left image of the object is shown on a left screen 700, and a right image of the object is shown on a right screen 710. In a region on the measurement screen outside the left screen 700 and the right screen 710, there are shown optical adapter name information 720, time information 721, message information 722, icons 723a, 723b, 723c, 723d, and 723e, and a zoom window 724, as other pieces of measurement information.

The optical adapter name information 720 and the time information 721 are pieces of information showing measurement conditions. The optical adapter name information 720 is textual information showing the name of the optical adapter in current use. The time information 721 is textual information showing the current date and time. The message information 722 includes: textual information showing an operational instruction for the user; and textual information showing the coordinates of the base point, which are one of the measurement conditions.

The icons 723a to 723e constitute an operation menu for the user to input operational instructions such as switching measurement modes and clearing a measurement result. When the user operates the remote controller 4 or the PC 31 to move a cursor 725 onto any of the icons 723a to 723e and performs an operation such as a click, a signal corresponding to the operation is input to the measurement processing portion 18. Based on the signal, the control portion 18a recognizes the operational instruction from the user, and controls the measurement processing. In addition, on the zoom window 724, there is displayed an enlarged image of the object located around the cursor 725.

Figure 8:
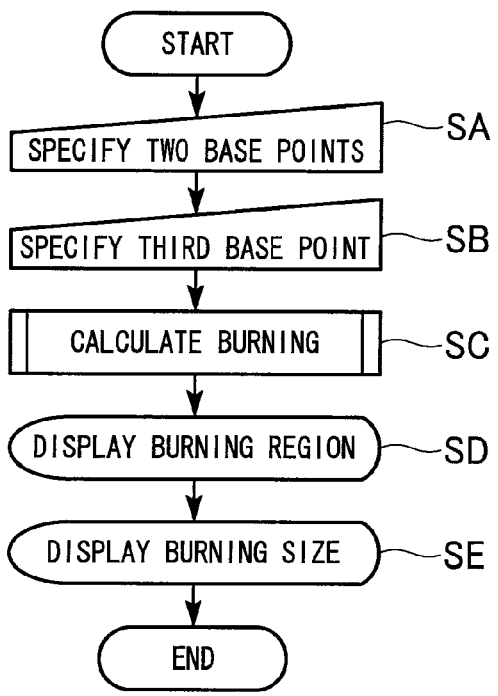
FIG. 8 is a flow chart showing a procedure of measurement in the first embodiment of the present invention.
Figure 9A:
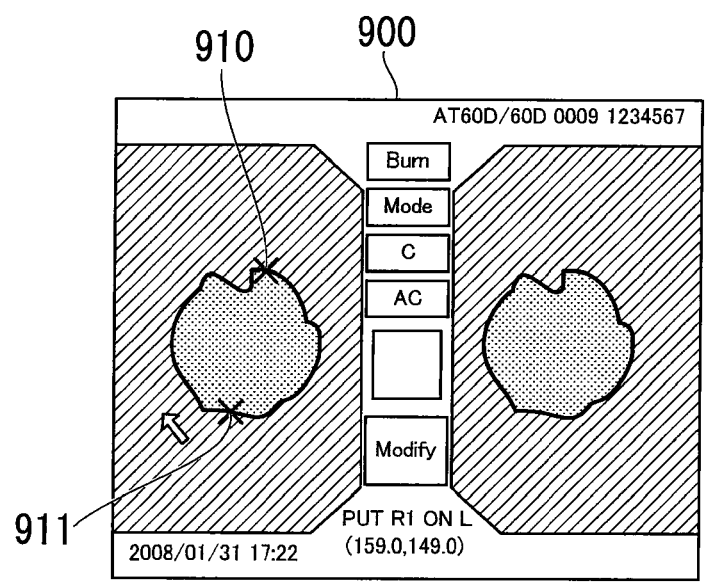
FIG. 9A is a reference diagram showing a measurement screen (at the time of measurement) in the first embodiment of the present invention.
Figure 9B:
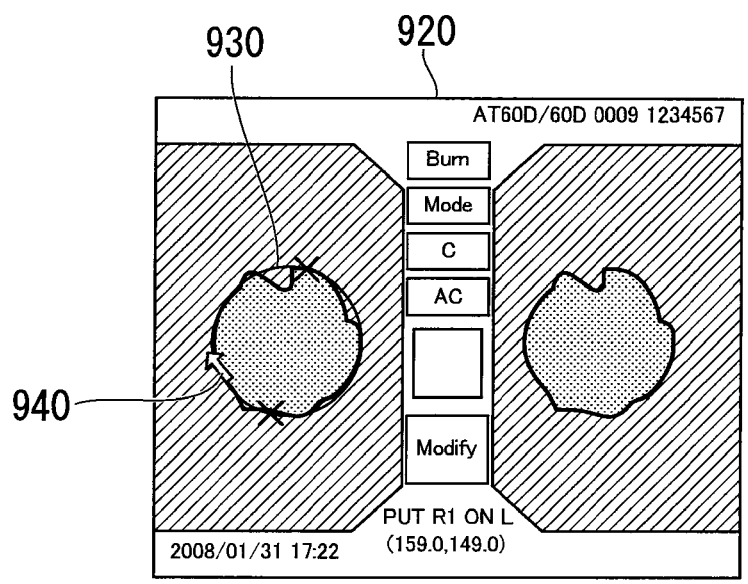
FIG. 9B is a reference diagram showing a measurement screen (at the time of measurement) in the first embodiment of the present invention.
Figure 10A:
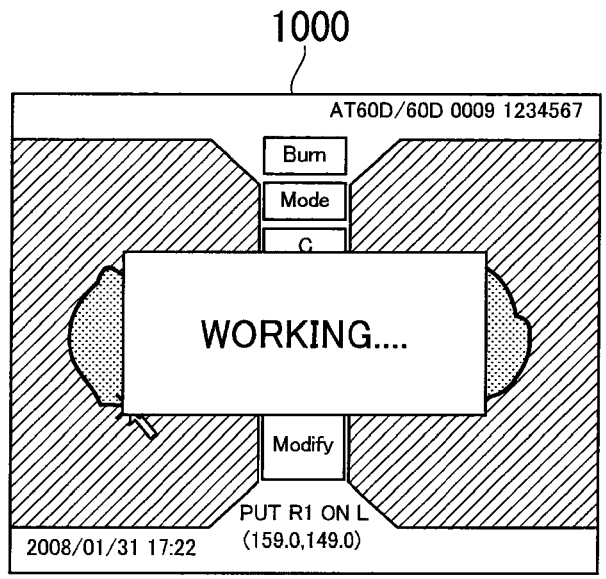
FIG. 10A is a reference diagram showing a measurement screen (at the time of measurement and on completion of measurement) in the first embodiment of the present invention.
Figure 10B:
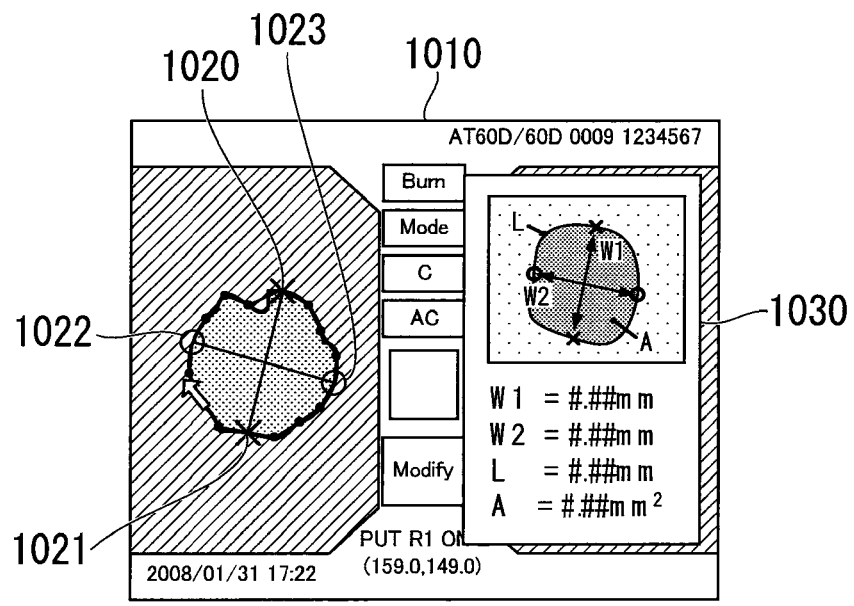
FIG. 10B is a reference diagram showing a measurement screen (at the time of measurement and on completion of measurement) in the first embodiment of the present invention.
Figure 11A:
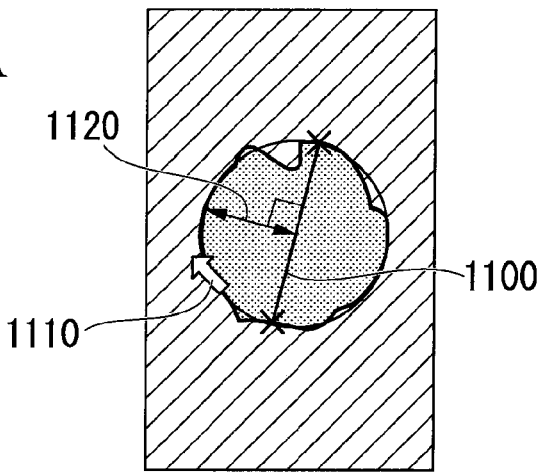
FIG. 11A is a reference diagram showing a relationship between a position of a cursor and a size of a base ellipse in the first embodiment of the present invention.
Figure 11B:
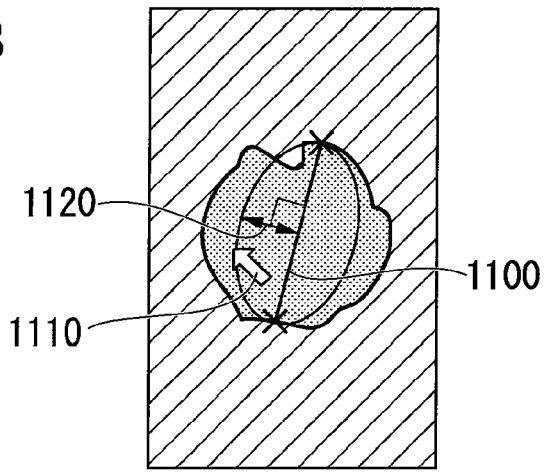
FIG. 11B is a reference diagram showing a relationship between a position of a cursor and a size of a base ellipse in the first embodiment of the present invention.
Figure 11C:
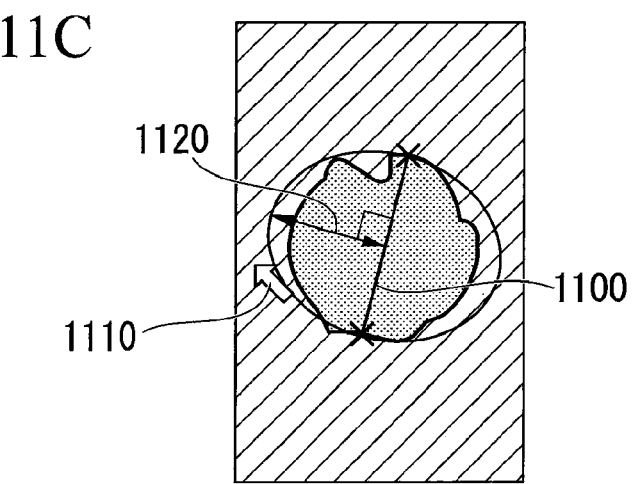
FIG. 11C is a reference diagram showing a relationship between a position of a cursor and a size of a base ellipse in the first embodiment of the present invention.
Figure 12A:
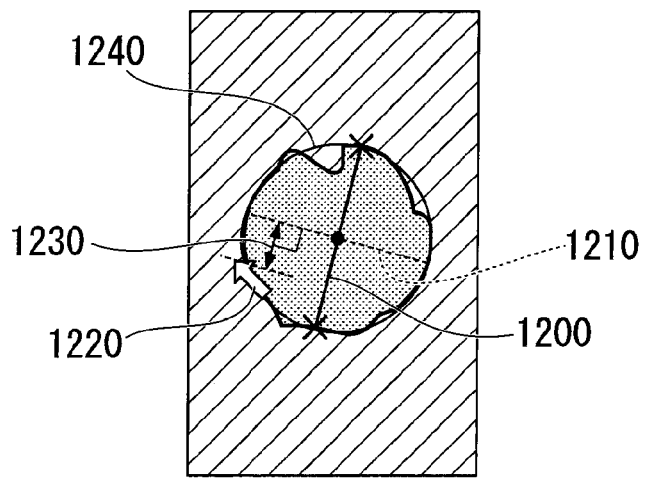
FIG. 12A is a reference diagram showing a relationship between a position of a cursor and a size of a base ellipse in the first embodiment of the present invention.
Figure 12B:
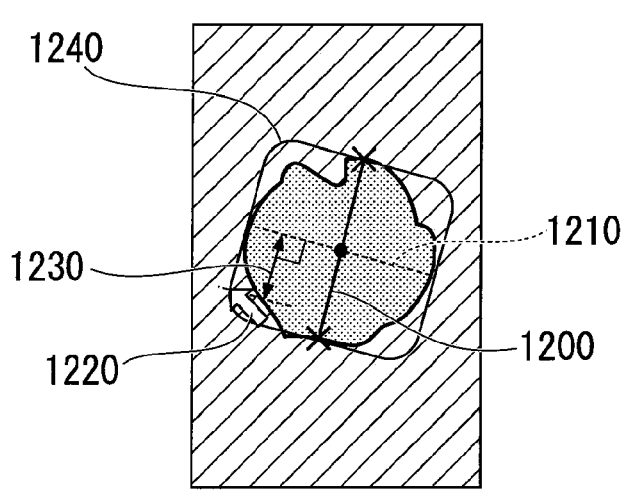
FIG. 12B is a reference diagram showing a relationship between a position of a cursor and a size of a base ellipse in the first embodiment of the present invention.
Figure 12C:
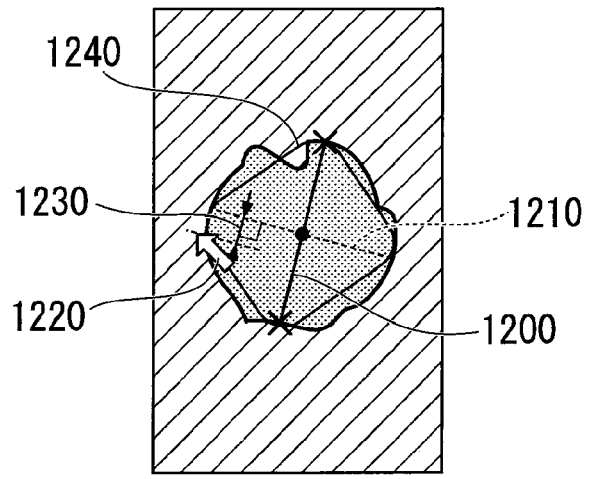
FIG. 12C is a reference diagram showing a relationship between a position of a cursor and a size of a base ellipse in the first embodiment of the present invention.

Next, a procedure of measurement in the present embodiment will be described with reference to FIG. 8 to FIG. 12. FIG. 8 shows a procedure of measurement. FIG. 9A to FIG. 10B show a measurement screen. FIG. 11A to 11C shows a relationship between the position of a cursor and the size of a base ellipse. FIG. 12A to 12C shows a relationship between the position of a cursor and the shape of a base ellipse.

First, when the user operates the remote controller 4 or the PC 31 to specify two base points on the measurement screen displayed on the liquid crystal monitor 5 or the face mount display 6, the information on the specified base points is input to the measurement processing portion 18 (Step SA).

At this time, it is desirable that the user selects points located on an edge of and at both ends of a burning as base points. In FIG. 9A, base points 910, 911 in a left image of a measurement screen 900 are specified, and "x" marks are displayed.

When the position information on the two base points in the left screen specified by the user is input to the measurement processing portion 18, the base point specification portion 18b calculates image coordinates (two-dimensional coordinates on the image displayed on the liquid crystal monitor 5 or the face mount display 6) of the two base points. The calculated image coordinates of the two base points are output to the base ellipse calculation portion 18c. Furthermore, similarly to the above, image coordinates at the cursor position are calculated and output to the base ellipse calculation portion 18c. Based on the image coordinates of the two base points and the cursor position, the base ellipse calculation portion 18c calculates a base ellipse, and outputs information on the base ellipse (the image coordinates of the points forming the base ellipse or the formula representing the base ellipse) to the control portion 18a. The control portion 18a performs processing of drawing the base ellipse. As a result, the base ellipse is displayed on the measurement screen.

The size and shape of the base ellipse vary according to the position of the cursor. When the user inputs an instruction for specifying a third base point in a state with the shape of the base ellipse in as close agreement as possible with that of the burning, the information on the specified base point is input to the measurement processing portion 18 (Step SC). In FIG. 9B, a base ellipse 930 is displayed on a measurement screen 920, and a third base point is specified at the position of a cursor 940. At this time, similarly to the above, the image coordinates of the third base point are calculated by the base point specification portion 18b.

Details of the relationship between the position of the cursor and the size/shape of the base ellipse are as follows. The first diameter of the base ellipse is the same as the base line, and is fixed no matter where the cursor is located.

The second diameter of the base ellipse is twice as long as the distance between the base line and the cursor, and varies according to the position of the cursor. FIG. 11A to 11C shows how the other diameter of the base ellipse varies according to the position of the cursor. As shown in FIG. 11B, when a distance 1120 between a base line 1100 and a cursor 1110 is shorter than that in FIG. 11A, the other diameter is shorter. On the other hand, as shown in FIG. 11C, when the distance 1120 between the base line 1100 and the cursor 1110 is longer than that in FIG. 11A, the other diameter is longer.

The shape of the base ellipse varies according to the distance between the cursor and the line that passes through the midpoint of the base line and is vertical to the base line. To be more specific, according to the distance, the base ellipse varies in curvature, leading to variation in shape. FIG. 12A to 12C shows how the shape of the base ellipse varies according to the position of the cursor. As shown in FIG. 12B and FIG. 12C, when a distance 1230 between a perpendicular line 1210 to a base line 1200 passing through a midpoint of the two base points and a cursor 1220 is much longer or shorter than that in FIG. 12A, the shape of a base ellipse 1240 is closer to a rectangle. As described above, it is possible to flexibly set the size and shape of the base ellipse according to the position of the cursor.

After the third base point is specified, the measurement processing portion 18 performs a burning calculation based on the coordinates of the specified base points (Step SC). In the burning calculation, coordinates of burning composing points and a burning size are calculated. In FIG. 10A, a measurement screen 1000 is a measurement screen during a burning calculation. Details of the burning calculation will be described later. As will be described later, there are cases where search points are not calculated for the specified base points depending on their coordinates. In this case, even if base points are specified, the burning calculation will not be started.

On completion of the burning calculation, a detected burning region is displayed on the measurement screen through an instruction from the measurement processing portion 18 (Step SD). As shown in FIG. 10B, the burning region is displayed on a left screen of a measurement screen 1010. To be more specific, the calculated burning composing points are displayed with small "•" marks, "x" marks, or "○" marks, which are connected by a line. Two burning composing points 1020, 1021 indicated with "x" mark are the burning composing points that correspond to the first and second base points specified by the user. Two burning composing points 1022, 1023 denoted with "○" mark are the burning composing points that correspond to two points on a line in a direction vertical to the base line.

Furthermore, a calculated burning size is displayed on the measurement screen through an instruction from the measurement processing portion 18 (Step SE). As shown in FIG. 10B, a burning size is displayed on a result window 1030 of a right screen of the measurement screen 1010. On the upper portion of the result window 1030, there is displayed an image of the burning. On its lower portion, there is displayed a burning size in text.

W1, W2, L, and A denote the first width, the second width, a perimeter length, and a size of the burning, respectively.

Figure 13:
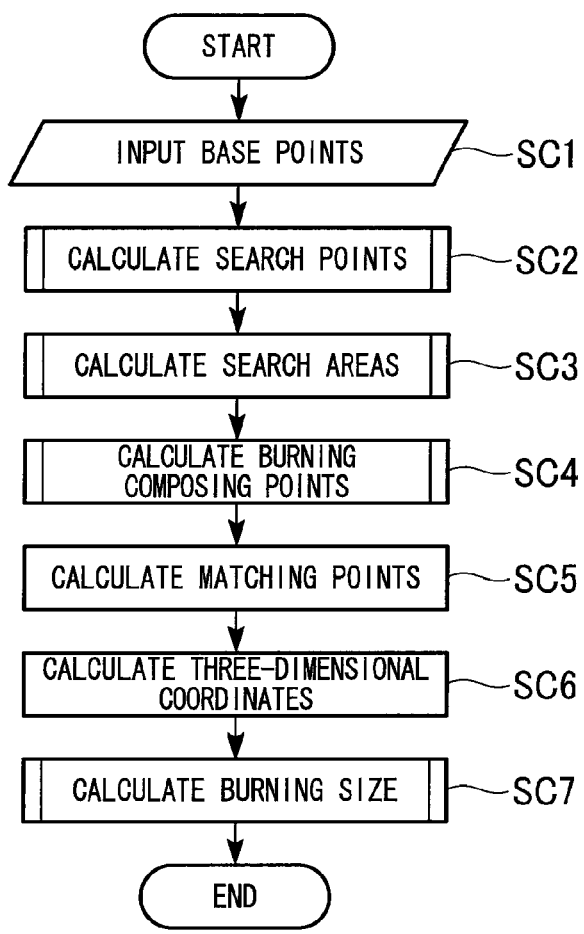
FIG. 13 is a flow chart showing a procedure of a burning calculation in the first embodiment of the present invention.

Next, a procedure of a burning calculation in Step SC of FIG. 8 will be described with reference to FIG. 13. When image coordinates of three base points calculated by the base point specification portion 18b are input to the base ellipse calculation portion 18c (Step SC1), the base ellipse calculation portion 18c calculates search points based on the image coordinates of the three base points (Step SC2). Details of the calculation of the search points will be described later.

Subsequently, the base ellipse calculation portion 18c calculates search areas based on the information on the search points (Step SC3). Details of the calculation of the search areas will be described later. Subsequently, the burning composing point calculation portion 18d calculates image coordinates of burning composing points based on the information on the search points and the search areas (Step SC4). Details of the calculation of the burning composing points will be described later.

Subsequently, the burning composing point calculation portion 18d calculates image coordinates of matching points in the right screen that correspond to the calculated burning composing points in the left screen (Step SC5). To be more specific, the burning composing point calculation portion 18d executes pattern matching processing based on the image coordinates of the burning composing points to calculate matching points as corresponding points of the left and right images. The method of this pattern matching processing is similar to that described in Japanese Unexamined Patent Application, First Publication No. 2004-49638.

Subsequently, the burning composing point calculation portion 18d calculates spatial coordinates (three-dimensional coordinates in the actual space) of the burning composing points based on the image coordinates of the calculated burning composing points and their matching points (Step SC6). A calculation method of the spatial coordinates is similar to that described in Japanese Unexamined Patent Application, First Publication No. 2004-49638.

Lastly the burning size calculation portion 18e calculates a burning size based on the spatial coordinates of the calculated burning composing points (Step SC7). Details of the calculation of the burning size will be described later.

Figure 14:
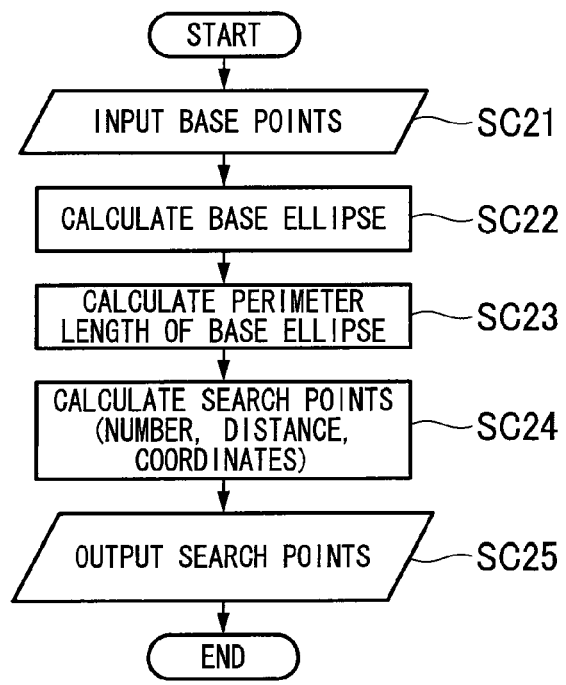
FIG. 14 is a flow chart showing search point calculation processing in the first embodiment of the present invention.

Next, a procedure of search point calculation processing (Step SC2) will be described with reference to FIG. 14. When image coordinates of three base points are input from the control portion 18a (Step SC21), the base ellipse calculation portion 18c calculates a base ellipse based on the image coordinates of the base points that have been input (Step SC22). The base ellipse that is calculated at this time is the same as that displayed when the third base point is specified in Step SC of FIG. 8.

Subsequently, the base ellipse calculation portion 18c calculates a perimeter length of the base ellipse. To be more specific, the base ellipse calculation portion 18c uses image coordinates of pixels forming the base ellipse to find the total value of two-dimensional distances between the adjacent pixels, to thereby calculates the perimeter length of the base ellipse (Step SC23). Subsequently, the base ellipse calculation portion 18c calculates the number of, the distances between, and the image coordinates of the search points (Step SC24). Lastly, the base ellipse calculation portion 18c outputs the information on the search points (the number of, the distances between, and the image coordinates of the search points) to the control portion 18*a* (Step SC25). However, if the calculation of the search points fails, the number of the search points is 0.

The calculation of the search points is carried out based on the following conditions (A) to (H).

(A): The first and second base points specified by the user are included in the search points.

(B): The search points are evenly spaced on the base ellipse.

(C): The number of and the distance between the search points are proportional to the perimeter length of the base ellipse.

(D): The number of the search points has an upper limit.

(E): The distance between the search points has a lower limit.

(F): If the perimeter length of the base ellipse is very short, the search points are not calculated.

(G): If the distance between the first and second base points specified by the user is very short, the search points are not calculated.

(H): If the distance between the third base point specified by the user and the base line is very short, the search points are not calculated.

The reason for setting the above conditions (C) to (H) is shown as (C') to (H') below.

(C'): In order to prevent the search areas from mutually overlapping.

(D'): If the number of the search points is too large, it takes too much time to calculate the burning composing points.

(E'): If the distance between the search points is too short, the size of the search areas is too small, which is unfavorable for the calculation of the burning composing points.

(F') to (H'): similar to (C').

The number of and the distance between the search points calculated based on the above conditions show the following properties.

FIG. 15A shows that search points 1500 are evenly spaced on a base ellipse 1510. As shown in FIG. 15B, if a perimeter length is longer than that of FIG. 15A, distances 1520 between the search points 1500 are proportionally longer. On the other hand, as shown in FIG. 15C, if the perimeter length is shorter than that of FIG. 15A, the distances 1520 between the search points 1500 are proportionally shorter.

As shown in FIG. 15D, if the perimeter length is still shorter to be less than a predetermined first perimeter length, the number of the search points 1500 is smaller. As shown in FIG. 15E, if the perimeter length is still shorter to be less than a predetermined second perimeter length (the first perimeter length>the second perimeter length), the search points are not calculated. Furthermore, as shown in FIG. 15F, if the distance between base points 1530, 1531 is very short, the search points are not calculated. As shown in FIG. 15G, if the distance between a third base point specified by the user (a position of a cursor 1540) and a base line 1550 is very short, the search points are not calculated. In the present embodiment, the search points are evenly spaced. However, they may not be evenly spaced.

Figure 16:
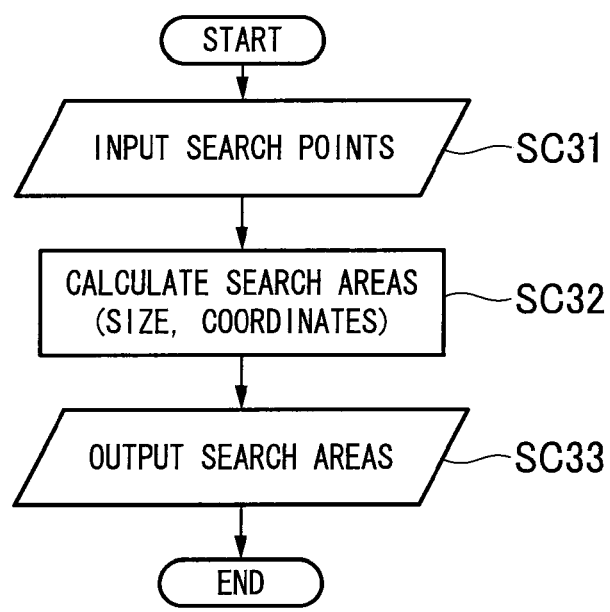
FIG. 16 is a flow chart showing search area calculation processing in the first embodiment of the present invention.

Next, a procedure of search area calculation processing (Step SC3) will be described with reference to FIG. 16.

When the information on the search points is input from the control portion 18*a* (Step SC31), the base ellipse calculation portion 18*c* calculates the number and the image coordinates of the search areas based on the information on the search points that have been input (Step SC32). Lastly, the base ellipse calculation portion 18*c* outputs the information on the search areas (the number and the image coordinates of the search areas) to the control portion 18*a* (Step SC33).

Calculation of the search areas is performed based on the following conditions (a) to (e).

(a): A search area is located around each search point.

(b): The search area has a shape of a square.

(c): The size of the search areas does not allow the search areas to mutually overlap, and is proportional to the distance between the search points.

(d): The size of the search area has an upper limit.

(e): The size of the search area has a lower limit.

The reason for setting the above conditions (c) to (e) is shown as (c') to (e') below.

(c'): If the search areas mutually overlap, the burning composing points are calculated in the same region, leading to a possible twisted edge of a burning to be detected.

(d'): Too large a size of the search areas requires too much time for image processing, and is also unfavorable for calculation of the burning composing points.

(e') Too small a size of the search areas is unfavorable for calculation of the burning composing points.

The size of the search areas calculated based on the above conditions shows the following properties. FIG. 17A shows that search areas 1700 are arranged around search points 1710. As shown in FIG. 17B, if a distance between the search points 1710 is longer than that of FIG. 17A, the size of the search areas 1700 is proportionally larger. The search areas 1700 at this time have a size that does not allow their mutual overlapping. As shown in FIG. 17C, if the distance between the search points 1710 is still longer than that of FIG. 17B, the size of the search areas 1700 reaches its upper limit.

On the other hand, as shown in FIG. 17D, if the distance between the search points 1710 is shorter than that of FIG. 17A, the size of the search areas 1700 is proportionally smaller. The search areas 1700 at this time have a size that does not allow their mutual overlapping. If the distance between the search points 1710 is still shorter, the size of the search areas 1700 reaches its lower limit. If the distance between the search points 1710 is less than this, the search points themselves cease to exist as shown in FIG. 17E. In the present embodiment, the search areas have a shape of a square. However, their shape may not be a square.

Next, a procedure of burning composing point calculation processing (Step SC4) will be described with reference to FIG. 18. In addition, FIG. 19 schematically shows the procedure. Therefore, appropriate reference is made also to FIG. 19. When the image coordinates of the search points and the size of the search areas are input from the control portion 18*a* (Step SC41), the burning composing point calculation portion 18*d* extracts area images in the search areas based on the image coordinates of the search points and the size of the search areas that have been input (Step SC42). As a result, an area image 1910 in each search area 1901 including a search point 1900 is extracted.

Subsequently, the burning composing point calculation portion 18*d* gray-scales the extracted area images (Step SC43), and performs an edge extraction on the gray-scaled images (Step SC44). As a result, an edge 1921 is extracted from each image 1920 that is a gray-scaled version of each area image 1910. Subsequently, the burning composing point calculation portion 18*d* calculates an approximation line of each extracted edge (Step SC45), and then calculates two intersection points between the calculated edge approximation line and a boundary line of the search area (Step SC46). As a result, an edge approximation line 1930 is calculated, and also intersection points 1940, 1941 between the edge approximation line 1930 and the boundary line of the search area are calculated.

Subsequently, the burning composing point calculation portion 18d calculates a midpoint of the two calculated intersection points (Step SC47), and then calculates a most proximal point to the edge from the calculated midpoint (Step SC48).

As a result, a midpoint 1950 of intersection points 1940, 1941 is calculated, and a most proximal point 1960 on the edge that is closest to a midpoint 1950 is calculated. Lastly, the burning composing point calculation portion 18d regards the calculated most proximal point as a burning composing point, and outputs its image coordinates to the control portion 18a (Step SC49).

In the gray-scaling in Step SC43, a brightness value Y of each pixel in each image represented by the components of RGB is calculated by use of, for example, the following formula (1).

$$Y=0.299 \times R+0.587 \times G+0.114 \times B \qquad (1)$$

There are cases where a burning as an object has a characteristic color. Therefore, a brightness value of the characteristic color, for example, an R (red) as it is may be treated as a brightness value Y of the pixel. Based on video signals made of the calculated brightness values Y, an edge extraction is performed in Step SC44.

To calculate edge approximation lines after the edge extraction in Step SC44, processing that produces as little noise as possible in an image after the edge extraction may be used for the edge extraction. For example, a primary differential filter such as a Sobel, Prewitt, or Gradient filter, or a secondary differential filter such as a Laplacian filter may be used. In addition, processing in which expansion/contraction/difference processing, a noise reduction filter, and the like are combined may be used to perform the edge extraction. At this time, the gray scale images are required to be binarized. For the binarization threshold value, a fixed value may be used. Alternatively, a method of modifying a threshold value based on the brightness of the gray scale image such as the percentile method, the mode method, or the discriminant analysis method may be used.

In the calculation of edge approximation lines in Step SC45, approximation lines are calculated based on the information on the edges extracted in Step SC44 by use of, for example, the method of least squares. In the above, a line approximation is performed on the shape of the edge. However, a curve approximation may be performed by use of a function of second degree or higher. In the case where the shape of the edge is closer to a curve than a line, a curve approximation enables a more accurate calculation of a burning composing point.

In the output of the burning composing points in Step SC49, if the calculation of the burning composing points that have not been calculated properly in the previous processing in Steps SC42 to SC48 (for example, if the edge extraction or the approximation lines have not been calculated properly, or other cases), the image coordinates of the search points may be output as those of the burning composing points.

Figure 20:
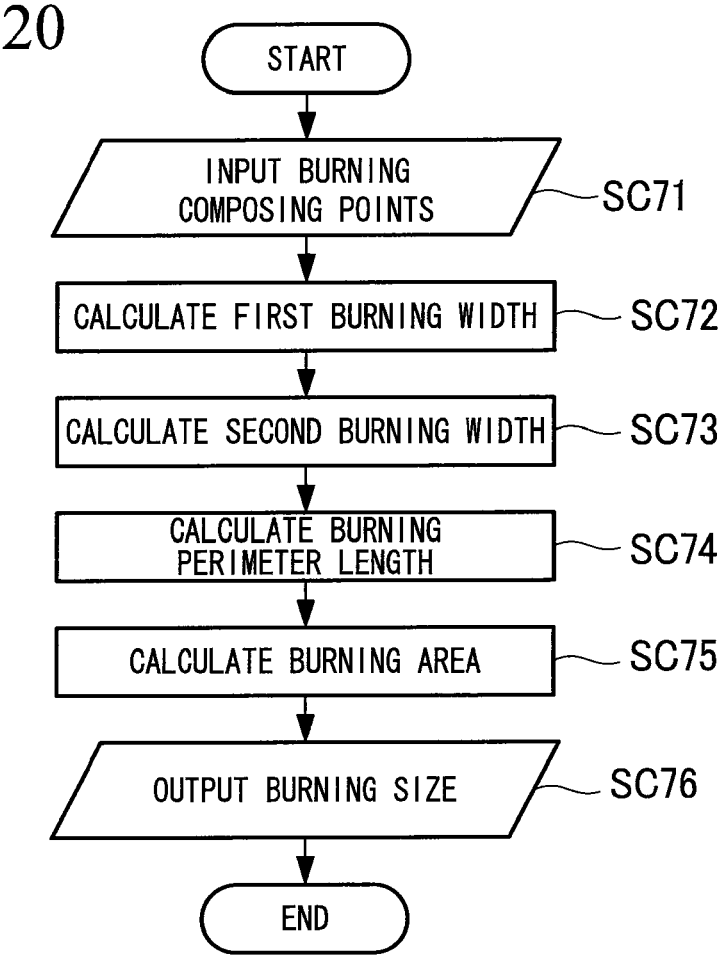
FIG. 20 is a flow chart showing a procedure of burning size calculation processing in the first embodiment of the present invention.

Next, a procedure of burning size calculation processing (Step SC7) will be described with reference to FIG. 20. When the spatial coordinates of the burning composing points are input from the control portion 18a (Step SC71), the burning size calculation portion 18e calculates a first width of the burning (Step SC72). The first width is a spatial distance between the two burning composing points that correspond to the first and second base points specified by the user. Subsequently, the burning size calculation portion 18e calculates a second width of the burning (Step SC73). The second width is a spatial distance between the two burning composing points that correspond to the two search points on the line orthogonal to the base line.

Subsequently, the burning size calculation portion 18e calculates a perimeter length of the burning (Step SC74). The perimeter length is a sum total of the spatial distances between all the adjacent burning composing points. Subsequently, the burning size calculation portion 18e calculates an area of the burning (Step SC75). The area is a spatial area of a region surrounded by all the burning composing points. Subsequently, the burning size calculation portion 18e outputs the calculated burning size to the control portion 18a (Step SC76).

Figure 21:
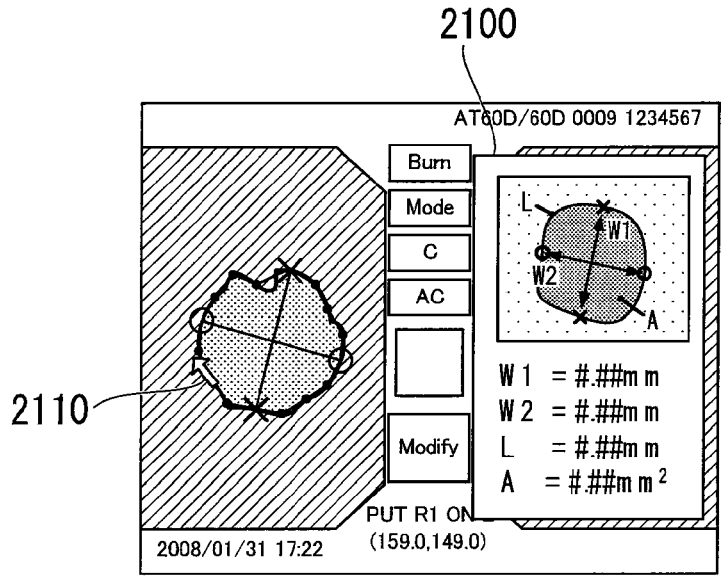
FIG. 21 is a reference diagram showing a measurement screen (on completion of measurement) in the first embodiment of the present invention.

Next is a description of a display method of a measurement result in the present embodiment. FIG. 21 shows a measurement screen when a measurement result is displayed. A result window 2100 for displaying a measurement result is displayed over a picked-up image of the object and the various pieces of information. Therefore, the picked-up image, textual information, and the like on the right screen are hidden behind the result window 2100. This state (a first display state) is suitable for securing a space necessary for the display of a measurement result to make the visibility of the measurement result better.

Figure 22:
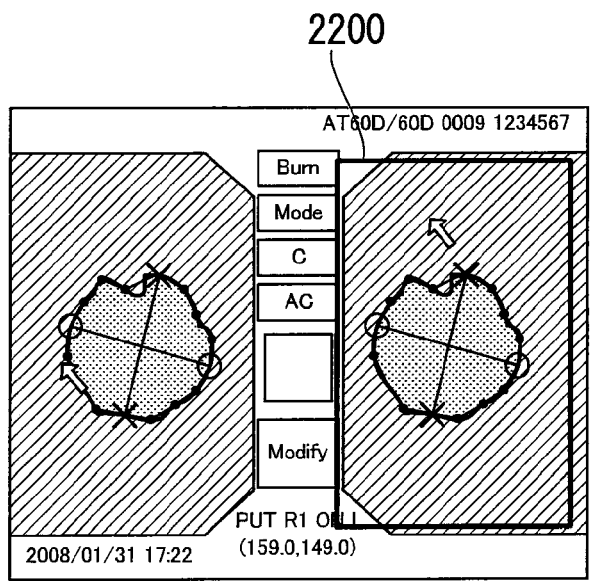
FIG. 22 is a reference diagram showing a measurement screen (on completion of measurement) in the first embodiment of the present invention.

When the user operates the remote controller 4 or the PC 31 to move a cursor 2110 onto the result window 2100 and performs an operation such as a click, the measurement screen is switched to a measurement screen shown in FIG. 22 through the control by the control portion 18a. In FIG. 22, the picked-up image, textual information, and the like on the right screen, which have been hidden by the result window 2100 in FIG. 21, are made visible because a result window 2200 is made transparent to cease the display of the measurement result. The result window 2200 has only its border shown.

This state (a second display state) is suitable for securing a space necessary for the display of measurement information such as a picked-up image to make the visibility of the measurement information better. As a result, it is possible to check, for example, a matching state of the burning composing points in the left and right screens. When the user operates the remote controller 4 or the PC 31 in the state of FIG. 22 and performs an operation such as a click, the measurement screen is switched again to the measurement screen shown in FIG. 21 through the control by the control portion 18a.

Figure 23:
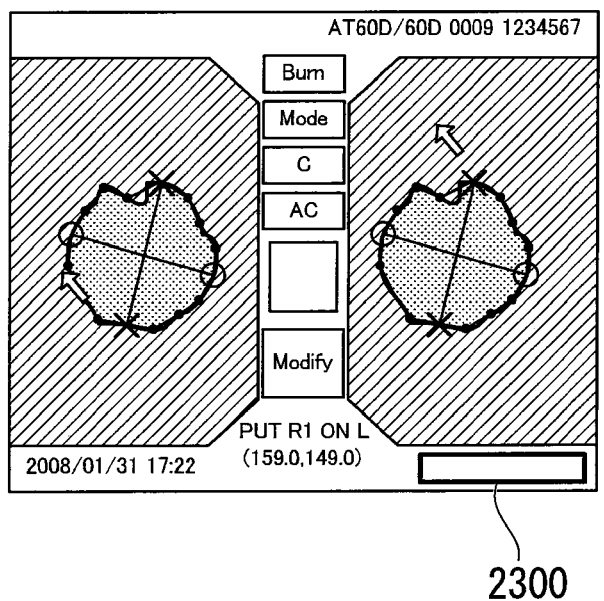
FIG. 23 is a reference diagram showing a measurement screen (on completion of measurement) in the first embodiment of the present invention.

The measurement screen may be switched to a measurement screen shown in FIG. 23 if an instruction to switch the measurement screens is given by the user in the display state shown in FIG. 21. A result window 2300 shown in FIG. 23 is a minimized result window whose display position is moved to a location that does not interrupt the display of other information. The display state shown in FIG. 23 is also suitable for securing a space necessary for the display of measurement information of a picked-up image and the like to make the visibility of the measurement information better. So long as the display of other information is not interrupted, both of the size and display position of the result window may not be changed, but only one of them may be changed.

Figure 24A:
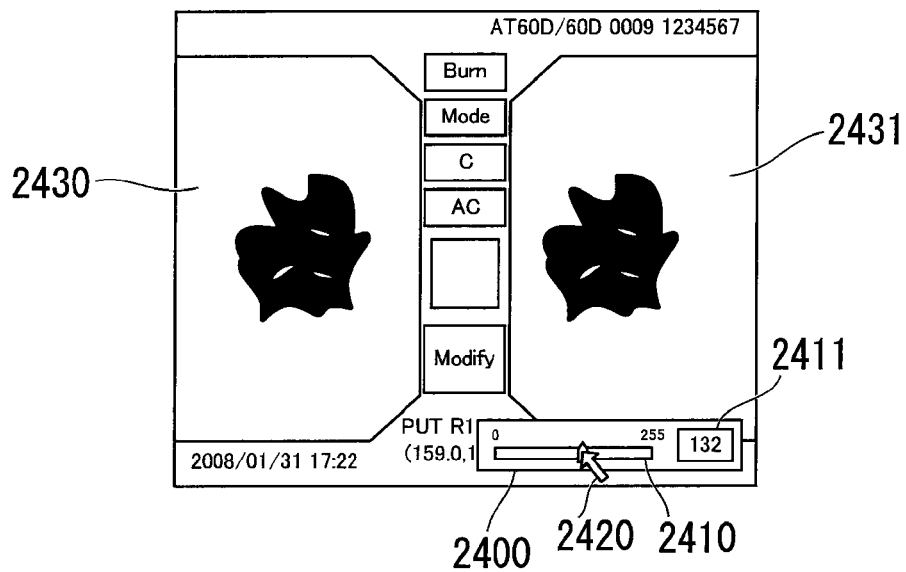
FIG. 24A is a reference diagram for explaining a first modification in the first embodiment of the present invention.

Next is a description of modifications of the present embodiment. First, a first modification will be described. In the present modification, it is possible for the user to manually specify the binarization threshold value for use in the edge extraction (Step SC44) of the burning composing point calculation processing (Step SC4). For example, when, before the specification of the base points, the user operates the remote controller 4 or the PC 31 to input an instruction for specifying a threshold value, a threshold value box 2400 is displayed on the measurement screen as shown in FIG. 24A.

In the threshold value box 2400, a slider bar 2410 for specifying a threshold value and a current threshold value 2411 are displayed. Furthermore, a cursor 2420 is moved onto the slider bar 2410. In addition, based on the current threshold value 2411, images 2430, 2431 in which measurement images respectively on the left screen and the right screen are binarized (hereinafter, each referred to as a binary image), are displayed.

While looking at the binary images, the user operates the remote controller 4 or the PC 31 to move the cursor 2420 left and right, to thereby adjust the threshold value. Based on the signal that is input from the remote controller 4 or the PC 31, the control portion 18a detects the position of the cursor 2420, and recognizes the threshold value specified by the user. Furthermore, the control portion 18a generates a graphic image signal for displaying the recognized threshold value as the current threshold value 2411 and output the graphic image signal to the video signal processing circuit 12.

Furthermore, the control portion 18a performs binarization processing, using the above-recognized threshold value, on the video signal obtained from the video signal processing circuit 12, and outputs the video signal after the binarization processing to the video signal processing circuit 12. The video signal processing circuit 12 generates a display signal for displaying a binary image based on the video signal after the binarization processing. Therefore, when the user moves the cursor 2420, the binarization processing is performed in a real-time manner according to the position of the cursor 2420 to display a binary image.

Figure 24B:
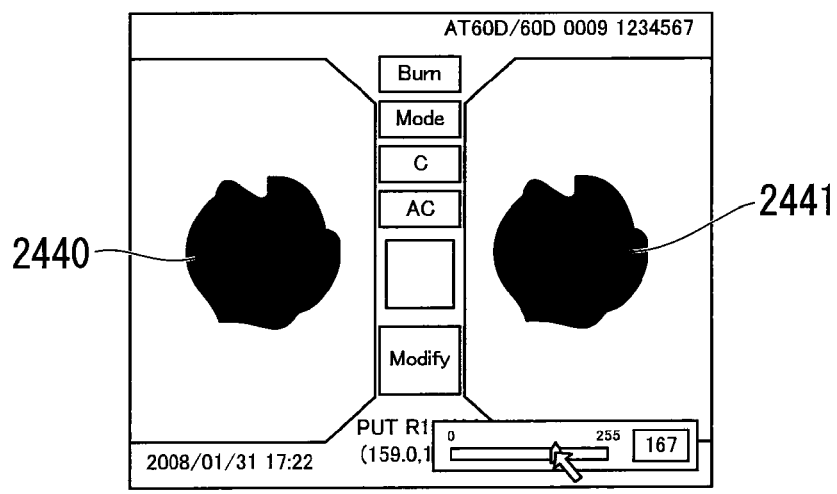
FIG. 24B is a reference diagram for explaining the first modification in the first embodiment of the present invention.

It is desirable that the user select such a threshold value as to make the outlines of burnings 2440, 2441 most outstanding as shown in FIG. 24B. At this time, it is more desirable that the user switch the display between the measurement image based on the video signal before the binarization processing and the measurement image based on the video signal after the binarization processing, and select such a threshold value as to make the outlines of the burnings most outstanding while looking at both of the measurement images. As a result, the user can set and check a threshold value that securely allows an edge extraction for every measurement image. The threshold value that is selected as described above may be used as a fixed value at the time of edge extraction or may be used as a base value for setting a range of a threshold value found by the discriminant threshold scheme.

Figure 25A:
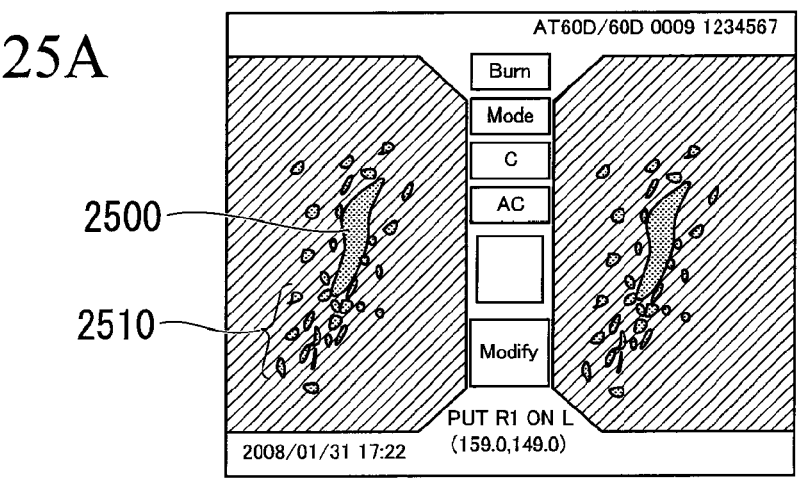
FIG. 25A is a reference diagram for explaining a second modification in the first embodiment of the present invention.
Figure 25B:
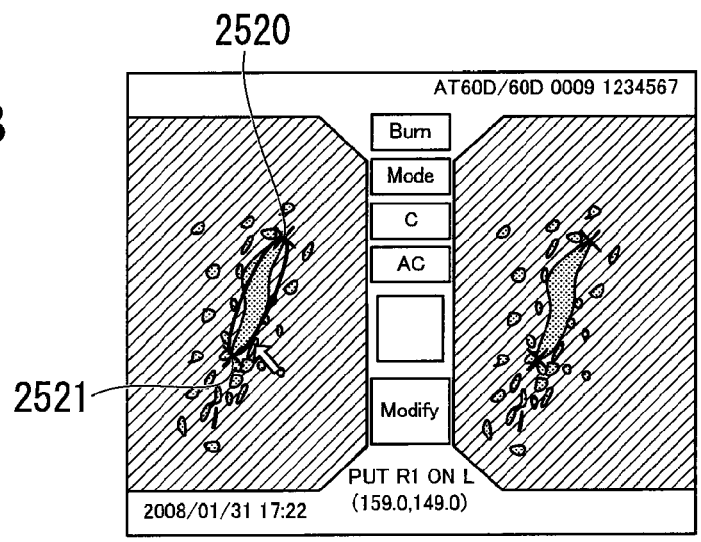
FIG. 25B is a reference diagram for explaining the second modification in the first embodiment of the present invention.
Figure 25C:
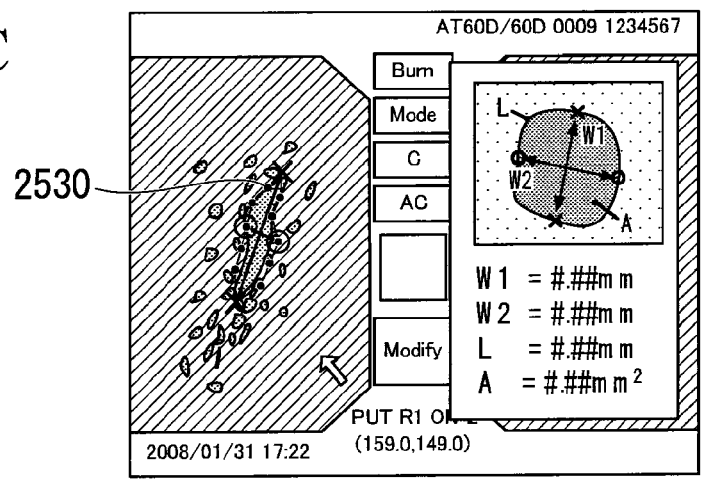
FIG. 25C is a reference diagram for explaining the second modification in the first embodiment of the present invention.

Next is a description of a second modification of the present embodiment. In the present modification, the aforementioned function of inputting a threshold value is used for determining a region of a burning to be extracted. For example, when a plurality of small burnings 2510 are adjacent around a burning 2500 on a measurement image as shown in FIG. 25A, there are cases where the region of the burning 2500 to be extracted is not made clear until an actual measurement of the burning is performed. For example, when base points 2520, 2521 are specified as shown in FIG. 25B, a region formed by detected burning composing points 2530 fails to match a region of the burning to be extracted as shown in FIG. 25C.

Figure 26A:
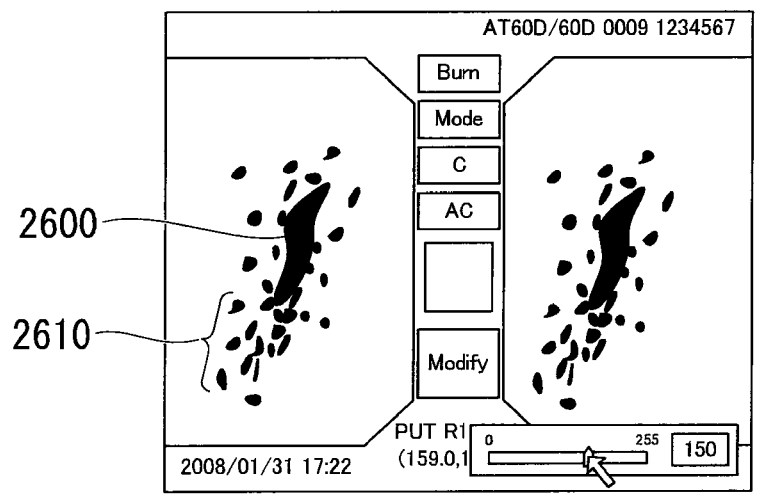
FIG. 26A is a reference diagram for explaining the second modification in the first embodiment of the present invention.
Figure 26B:
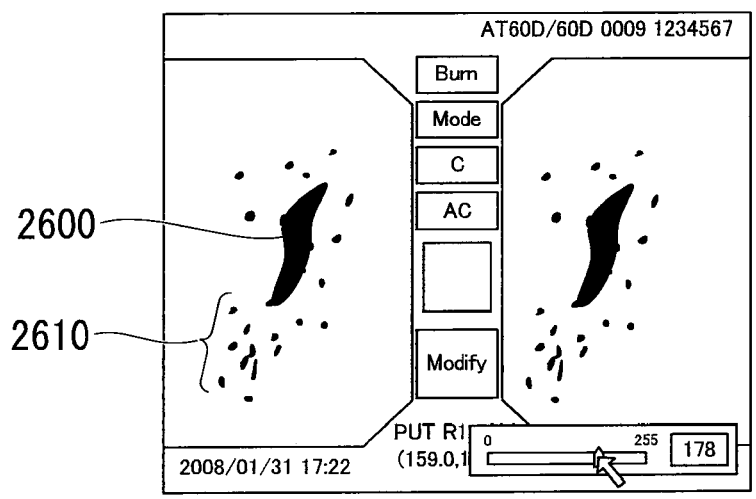
FIG. 26B is a reference diagram for explaining the second modification in the first embodiment of the present invention.
Figure 27A:
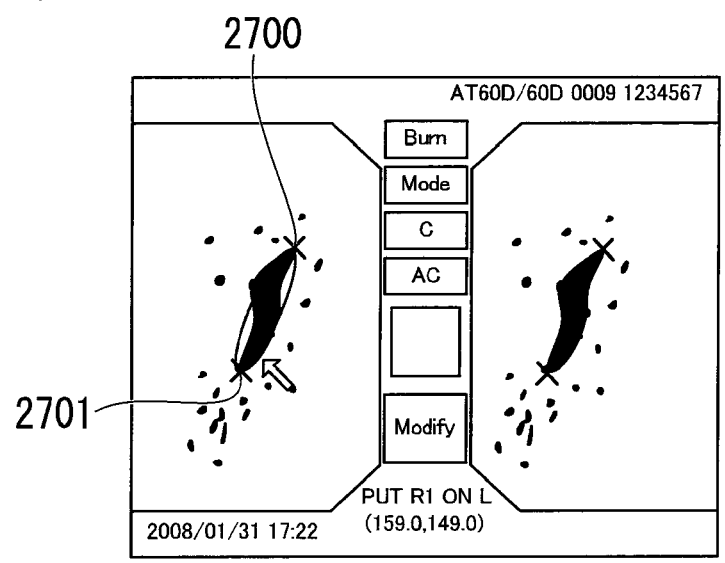
FIG. 27A is a reference diagram for explaining the second modification in the first embodiment of the present invention.
Figure 27B:
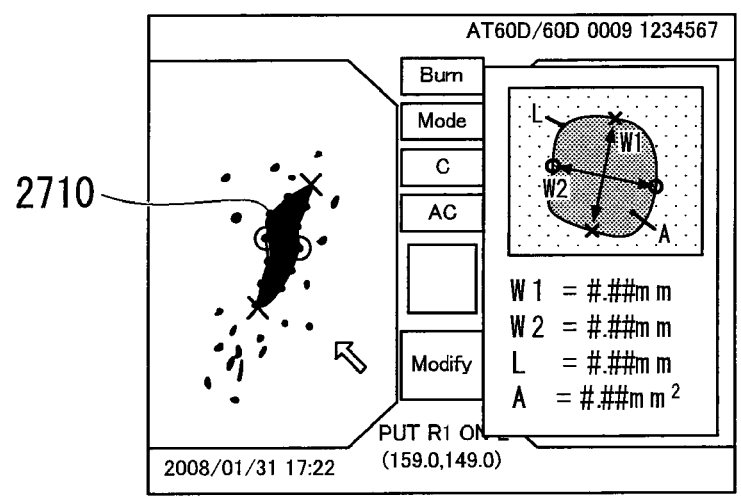
FIG. 27B is a reference diagram for explaining the second modification in the first embodiment of the present invention.

In this case, with the adjustment of a threshold value similar to that of the first modification being enabled as shown in FIG. 26A, it is possible to separate a burning 2600 from its adjacent small burnings 2610 in a binary image as shown in FIG. 26B. In the present modification, it is possible to specify base points on the binary image. Furthermore, an edge extraction is performed based on a video signal after binarization processing using a threshold value that has been set. As shown in FIG. 27A, when base points 2700, 2701 are specified on the binary image, the region formed by detected burning composing points 2710 matches the region of a burning to be extracted as shown in FIG. 27B.

With the function capable of manually specifying a threshold value in this manner, the user is not only capable of setting an optimal threshold value for every measurement image, but also capable of determining a region of a burning to be extracted.

Figure 28:
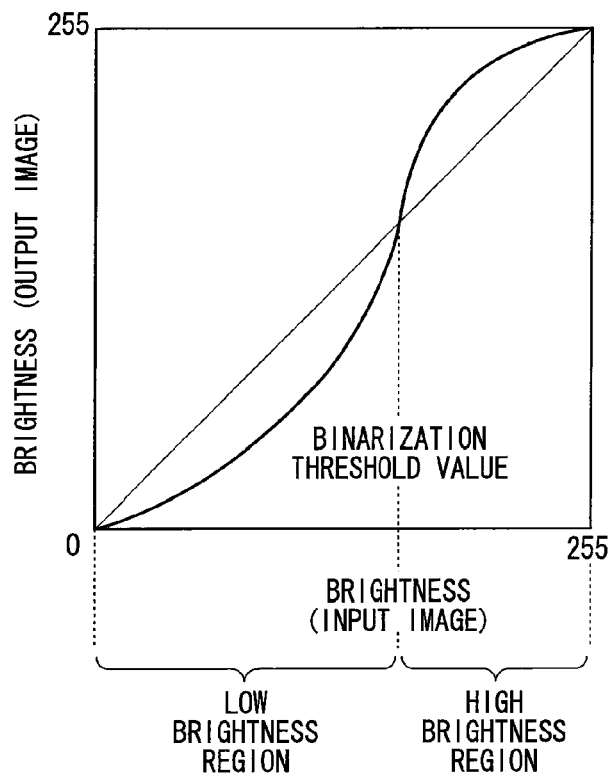
FIG. 28 is a reference diagram for explaining a third modification in the first embodiment of the present invention.

Next is a description of a third modification of the present embodiment. In the present modification, a gray scale image is subjected to dynamic range (DR) conversion processing before the gray scale image is binarized. FIG. 28 shows what is indicated by a table for dynamic range conversion used in the present modification. Its horizontal axis represents brightness (0 to 255) of an image before conversion (an input image), and its vertical axis represents brightness (0 to 255) of an image after conversion (an output image). A brightness region of the input image is divided into a low brightness region and a high brightness region with a binarization threshold value as their boundary. Through the dynamic range conversion processing, the brightness in the low brightness region is turned down, and the brightness in the high brightness region is turned up.

Figure 29:
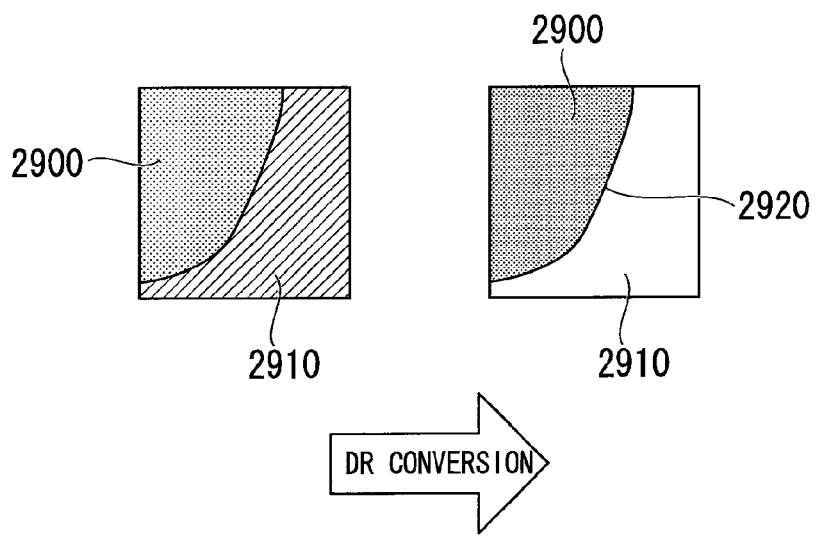
FIG. 29 is a reference diagram for explaining the third modification in the first embodiment of the present invention.

When the dynamic range of the gray scale image is converted in accordance with the conversion properties shown in FIG. 28, brightness of a low brightness region 2900 shown in FIG. 29 is turned down, and brightness of a high brightness region 2910 is turned up. As a result, an edge line 2920 between the burning region (which is equivalent to the low brightness region 2900) and its surroundings is made clear. This allows a more secure edge extraction to be performed.

Figure 30:
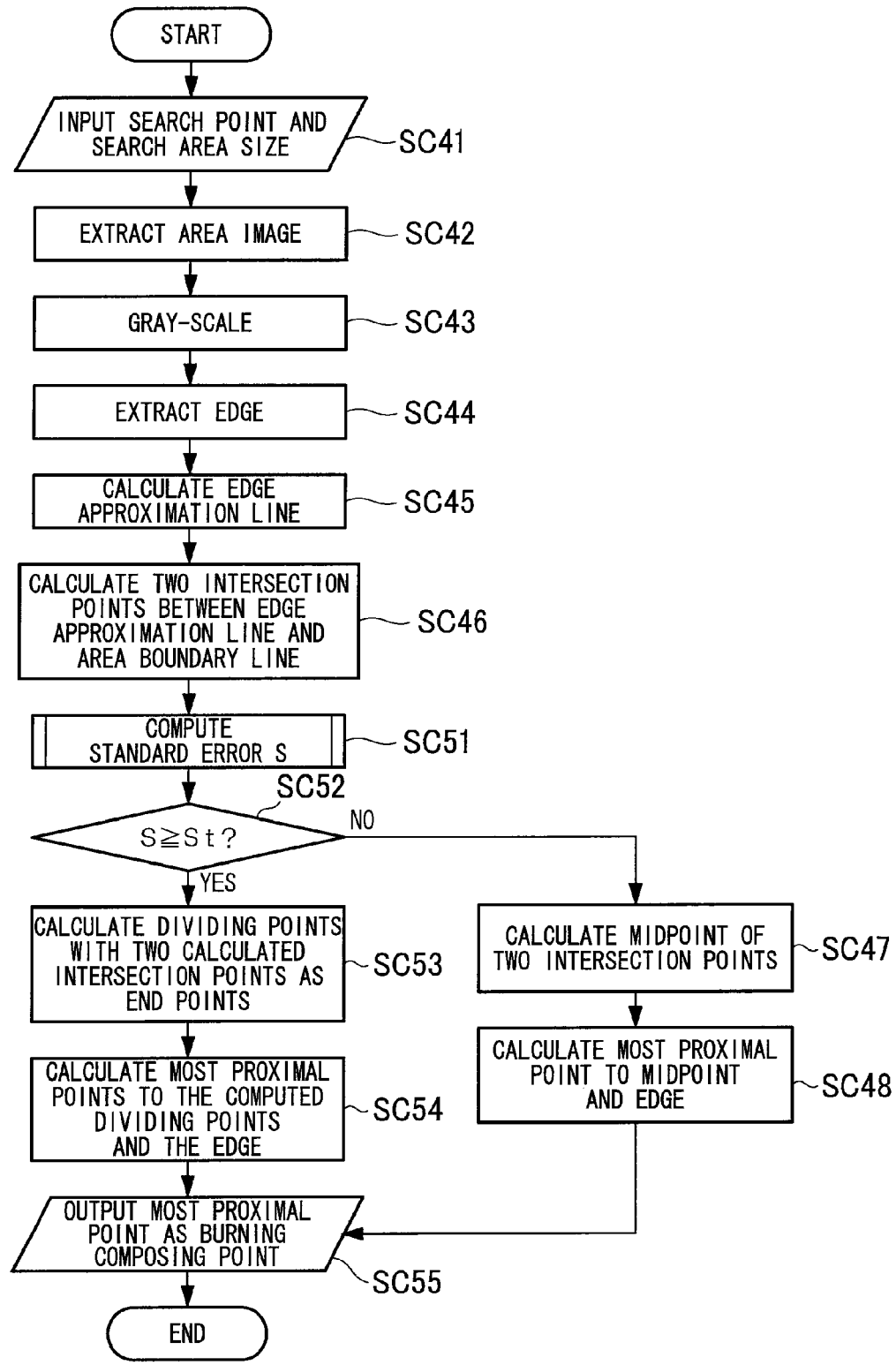
FIG. 30 is a flow chart for explaining a fourth modification in the first embodiment of the present invention.
Figure 31:
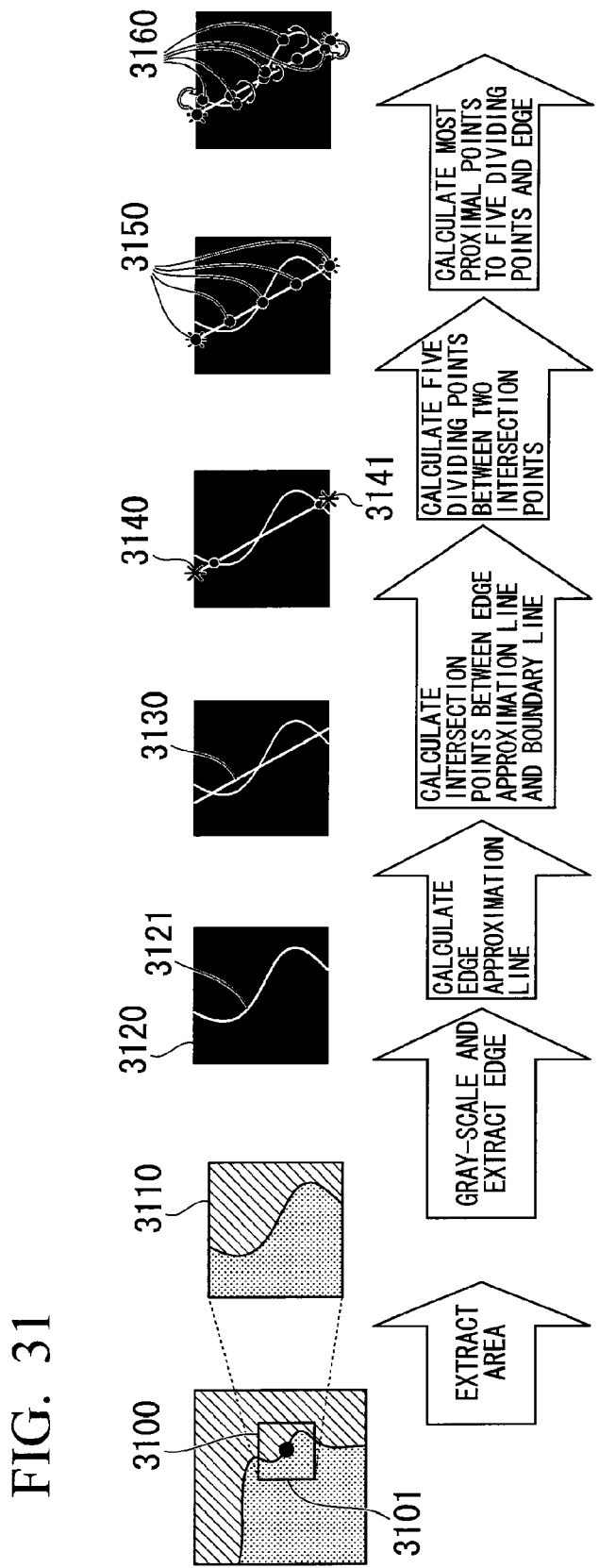
FIG. 31 is a reference diagram for explaining the fourth modification in the first embodiment of the present invention.

Next is a description of a fourth modification of the present embodiment. In the present modification, the burning composing points are calculated with smaller spacing between them in the case where the shape of the edge extracted in the edge extraction (Step SC44) of the burning composing point calculation processing (Step SC4) is complex, and hence the edge does not well match its approximation line. Below, a procedure of the burning composing point calculation processing (Step SC4) in the present modification will be described with reference to FIG. 30. Furthermore, FIG. 31 schematically shows a procedure of the burning composing point calculation processing. Therefore, appropriate reference is made to FIG. 31.

Figure 18:
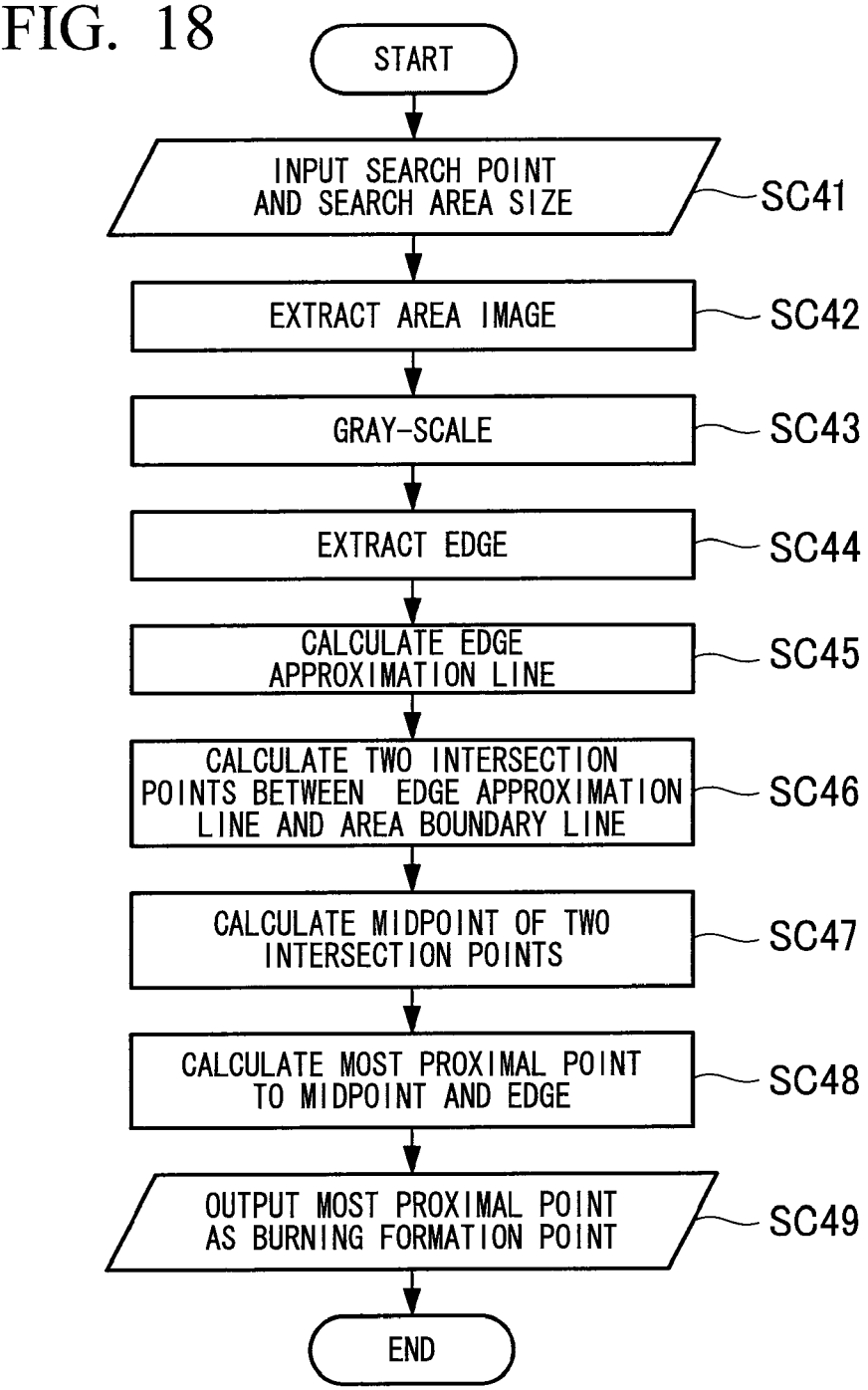
FIG. 18 is a flow chart showing a procedure of burning composing point calculation processing in the first embodiment of the present invention.
Figure 19:
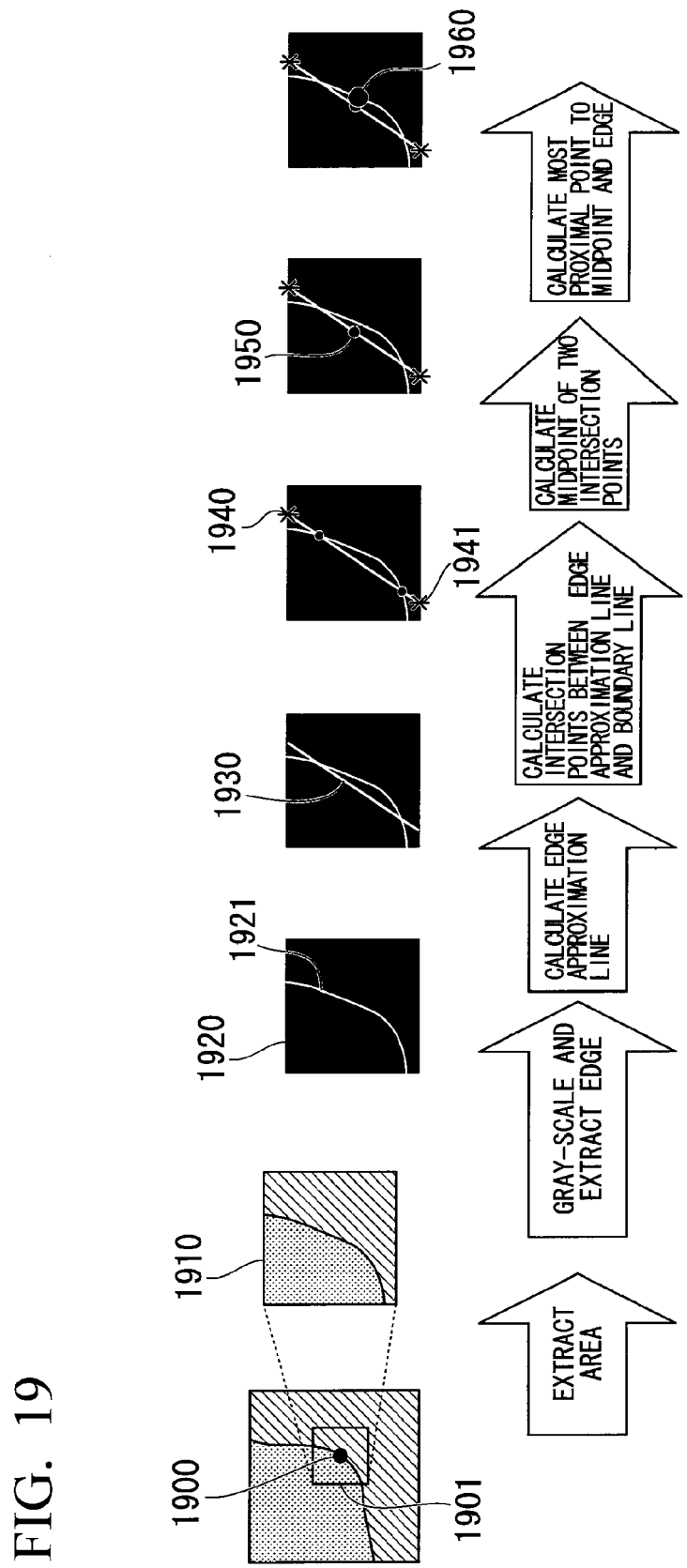
FIG. 19 is a reference diagram showing a procedure of burning composing point calculation processing in the first embodiment of the present invention.

Steps SC41 to SC46 are similar to Steps SC41 to SC46 of FIG. 18. Through the process of Step SC42, an area image 3110 in each search area 3101 including a search point 3100 is extracted. Subsequently, through the processes of Steps SC43 to SC44, an edge 3121 is extracted from each image 3120 that is a gray-scaled version of each area image 3110. Subsequently, through the processes of Steps SC45 to SC46, an edge approximation line 3130 is calculated, and also intersection points 3140, 3141 between the edge approximation line 3130 and the boundary line of the search area are calculated.

Subsequently to Step SC46, the burning composing point calculation portion 18d calculates a standard error S between the edge and the approximation line (Step SC51). If the positions of the pixels that constitute an edge in a search area are used to express the edge as a data row $x_i$, $y_i$ with n pieces of data, then the standard error S of the data row is expressed as the following formula (2).

$$S = \sqrt{\frac{1}{n(n-2)} \left\{ n\Sigma y_i^2 - (\Sigma y_i)^2 - \frac{(n\Sigma x_i y_i - \Sigma x_i \Sigma y_i)^2}{n\Sigma x_i^2 - (\Sigma x_i)^2} \right\}} \quad (2)$$

The standard error S is an error between the approximation line obtained from a data row and its original data row. The larger this value is, the larger the variation of the data row is from the approximation line. By use of the standard error S, it is possible to check the degree to which the edge matches the approximation line.

If the standard error S is not less than a threshold value St (if YES in Step SC52), then the burning composing point calculation portion 18d calculates dividing points with two intersection points calculated in Step SC46 as their end points (Step SC53). In the present modification, the number of the dividing points is five. As a result, five dividing points 3150 on the edge approximation line 3130 are calculated. Subsequently, the burning composing point calculation portion 18d calculates most proximal points to the calculated dividing points and the edge (Step SC54). As a result, most proximal points 3160 corresponding to the five dividing points 3150 calculated in Step SC53 are calculated. Lastly, the burning composing point calculation portion 18d regards the calculated most proximal points as burning composing points, and outputs their image coordinates to the control portion 18a (Step SC55).

On the other hand, if the standard error S is less than the threshold value St (if NO in Step SC52), then the processes of Steps SC47 to SC48 are performed. Steps SC47 to SC48 are similar to Steps SC47 to SC48 of FIG. 18. Therefore, a description thereof will be omitted. Lastly, the burning composing point calculation portion 18d regards the calculated most proximal points as burning composing points, and outputs their image coordinates to the control portion 18a (Step SC55).

According to the present modification, even if the edge shape in a search area is complex, and hence an edge approximation line does not well match the edge, it is possible to calculate burning composing points with smaller spacing therebetween, allowing for more detailed measurement. In the present modification, the number of dividing points may be changed in accordance with the standard deviation S. For example, the larger the standard deviation S is, the larger the number of the dividing points may be.

As described above, according to the present embodiment, specification of three base points enables measurement of a burning size. Therefore, it is possible to reduce more burden of operation, improving operability compared with the conventional case where a multitude of (for example, not less than 10) base points are specified.

Furthermore, as described in the first modification, the user is capable of specify a binarization threshold value while looking at the binary image. Thereby, it is possible to improve the accuracy of edge extraction. Furthermore, as described in the second modification, the user is capable of specifying a binarization threshold value and base points while looking at the binary image. Thereby, it is also possible to improve the accuracy of edge extraction.

Furthermore, as described in the third modification, the dynamic range of the gray scale image is converted, and then the gray scale image after the dynamic range conversion is subjected to binarization processing. Thereby, it is also possible to improve the accuracy of edge extraction. Moreover, as described in the fourth modification, the number of dividing points, that is, the number of burning composing points is controlled according to the degree to which the edge matches the edge approximation line. Thereby, it is also possible to improve the accuracy of edge extraction.

Furthermore, with at least two parameters being calculated as parameters indicating a burning size, it is possible to learn details of the burning size.

Furthermore, according to the present embodiment, it is possible to obtain the following advantage. In the conventional endoscope apparatus for measurement, the size of the display apparatus is limited for easiness of movement of the endoscope apparatus at sites where measurement is performed, and hence, the size of the screen of the display apparatus is also limited. Therefore, in the conventional endoscope apparatus for measurement, there is a possibility that visibility becomes worse because sufficient display space for displaying a picked-up image of an object and its measurement results is not secured.

In contrast to this, as in the present embodiment, the display state is switched between the first display state, in which measurement results are displayed in a manner superimposed on at least a part of measurement information including a picked-up image of an object, and the second display state, in which the measurement information superimposed with the measurement results in the first display state is made visible. This makes it possible to secure necessary display space both for the measurement information and the measurement results. As a result, visibility of the measurement information and the measurement results can be improved. Furthermore, on the screen of the display apparatus, there are displayed, other than the picked-up image of the object, textual information indicating measurement conditions, textual information indicating an operational instruction for the user, an operation menu used for the input of what to be operated, and the like. It is possible to improve visibility while securing display space for these as well.

Second Embodiment

Figure 32:
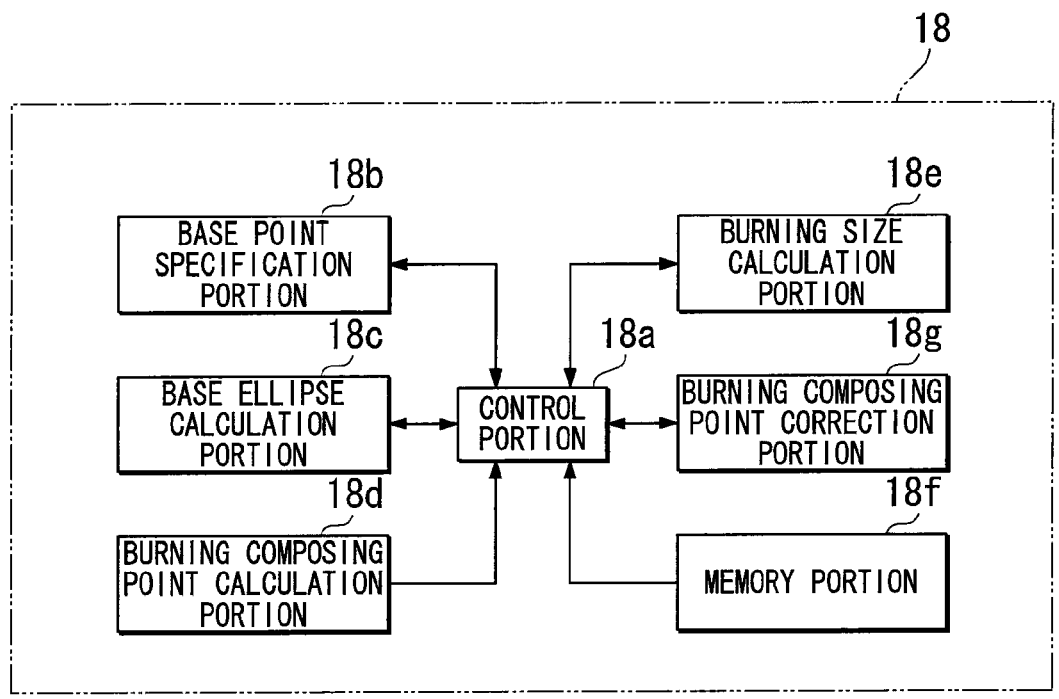
FIG. 32 is a block diagram showing a configuration of a measurement processing portion provided in an endoscope apparatus for measurement according to a second embodiment of the present invention.

Next is a description of a second embodiment of the present invention. FIG. 32 shows a configuration of a measurement processing portion 18 according to the present embodiment. Constituent elements the same as those shown in FIG. 2 are denoted by the same reference symbols, and description thereof is omitted. In the present embodiment, there is provided a burning composing point correction portion 18g for correcting a burning composing point that has been calculated by a burning composing point calculation portion 18d.

Figure 33A:
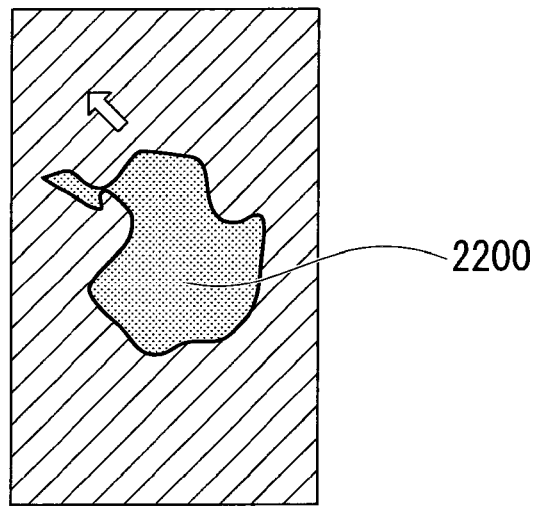
FIG. 33A is a reference diagram for explaining a problem as a precondition for the second embodiment of the present invention.
Figure 33B:
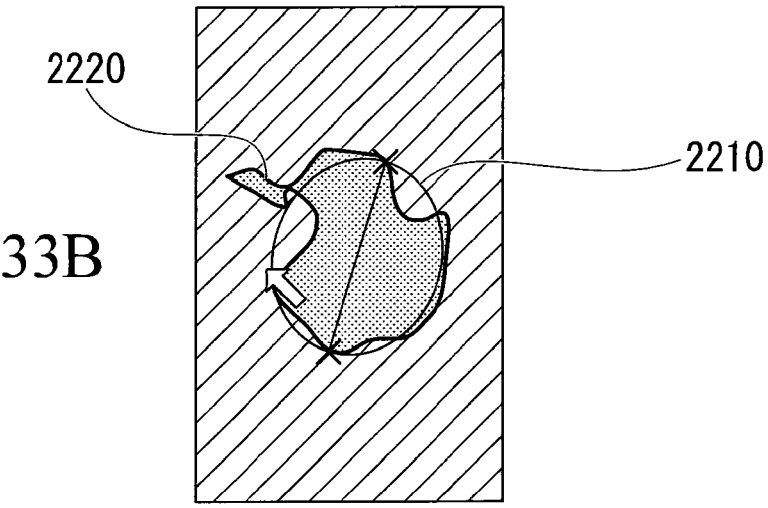
FIG. 33B is a reference diagram for explaining the problem as a precondition for the second embodiment of the present invention.

In the first embodiment, if a burning 2200 as an object has a shape far from a circle, an ellipse, or a rectangle as shown in FIG. 33A, then it is not possible to match a base ellipse 2210 well with an outline 2220 of the burning as shown in FIG. 33B.

Figure 33C:
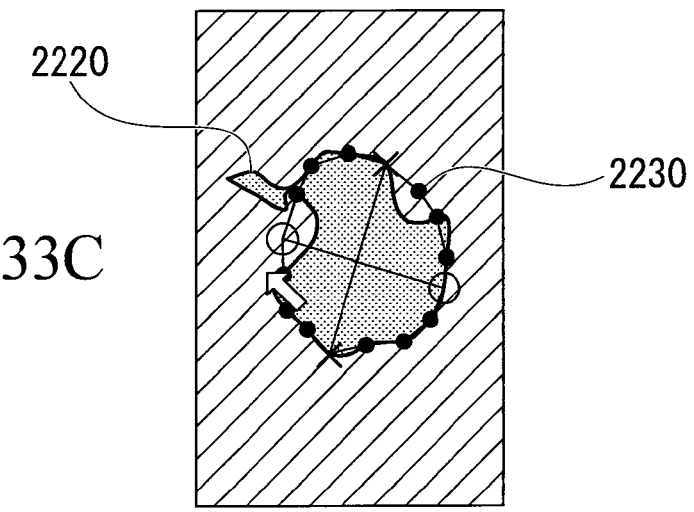
FIG. 33C is a reference diagram for explaining the problem as a precondition for the second embodiment of the present invention.

If a burning calculation is performed in this condition, it is difficult to match the outline 2220 of the burning with burning composing points 2230 as shown in FIG. 33C, resulting in a lowered calculational accuracy of a burning size. In contrast to this, in the present embodiment, it is possible to correct (modify) burning composing points.

Figure 34:
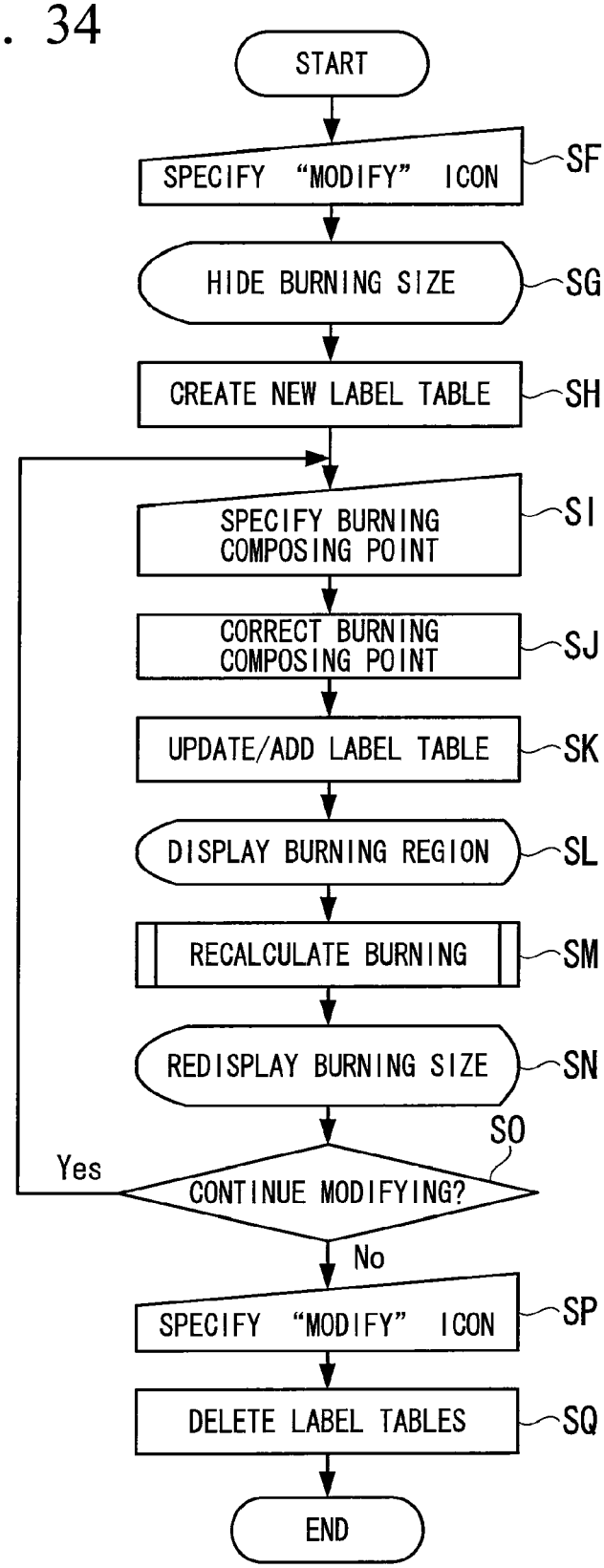
FIG. 34 is a flow chart showing a correction procedure of a burning composing point in the second embodiment of the present invention.

Hereunder is a description of a procedure of modifying a burning composing point with reference to FIGS. 34 to 36B and FIG. 39A to 39B. FIG. 34 shows a procedure of modifying. FIG. 35A to FIG. 36B show a measurement screen at the time of modifying. FIG. 39 shows a label table created at the time of modifying. Label tables will be described later. Modifying a burning composing point is started when a burning region including burning composing points 2405 and a result window 2415 including a burning size are displayed on a measurement screen as shown in FIG. 35A after completion of measurement.

Figure 35A:
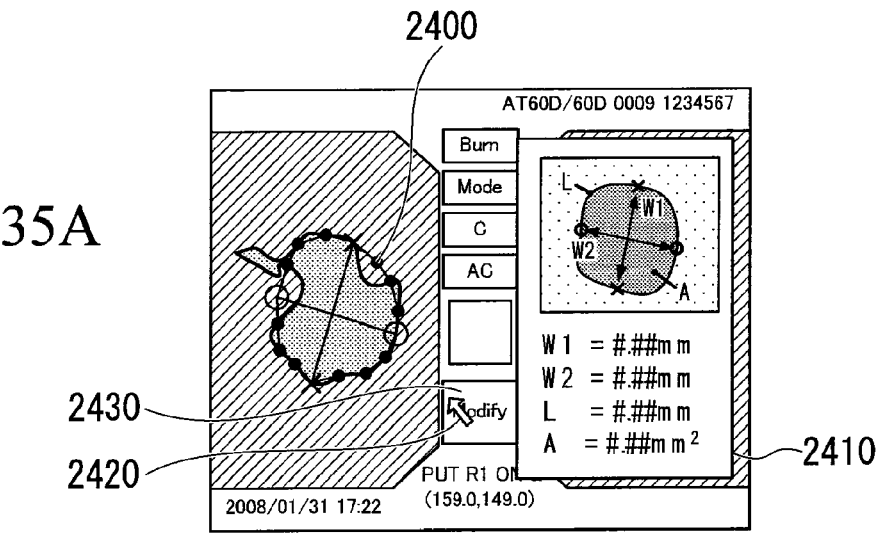
FIG. 35A is a reference diagram showing a measurement screen (at the time of modifying) in the second embodiment of the present invention.
Figure 35B:
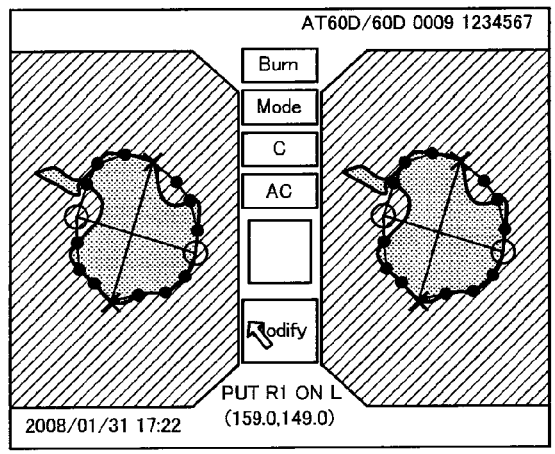
FIG. 35B is a reference diagram showing a measurement screen (at the time of modifying) in the second embodiment of the present invention.

When, through the operation on the remote controller 4 or the PC 31, the user moves a cursor 2420 onto a "Modify" icon 2430 as shown in FIG. 35A and performs an operation such as a click (Step SF), the operation mode of the endoscope apparatus for measurement 1 shifts to modify mode. This hides the result window as shown in FIG. 35B (Step SG).

Subsequently, the burning composing point correction portion 18g newly creates a label table (FIG. 39A) that shows a logical relationship between the burning composing points (a relationship indicating which burning composing point is adjacent to which burning composing points), and stores the label table in the memory portion 18f (Step SH).
In the label table, there are listed label numbers indicating an extraction order of the burning composing points, image coordinates of burning composing points, and adjacent label numbers 1, 2 that show the label number of the burning composing point adjacent to the respective burning composing points.

Figure 35C:
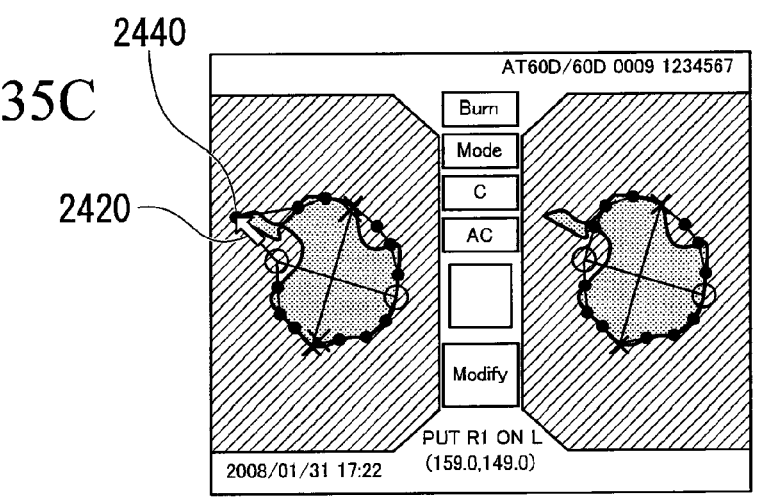
FIG. 35C is a reference diagram showing a measurement screen (at the time of modifying) in the second embodiment of the present invention.

Subsequently, when the user moves the cursor 2420 onto the left screen, points it to a position to which he or she wants the burning composing point to be corrected as shown in FIG. 35C, and then performs an operation such as a click (Step SI), one of the burning composing points is selected, and the image coordinates of the selected burning composing point 2445 are corrected to the image coordinates of the cursor 2420 (Step SJ). Subsequently, the label table that is updated based on the image coordinates of the corrected burning composing point is added to the memory portion 18f (Step SK).

Figure 36A:
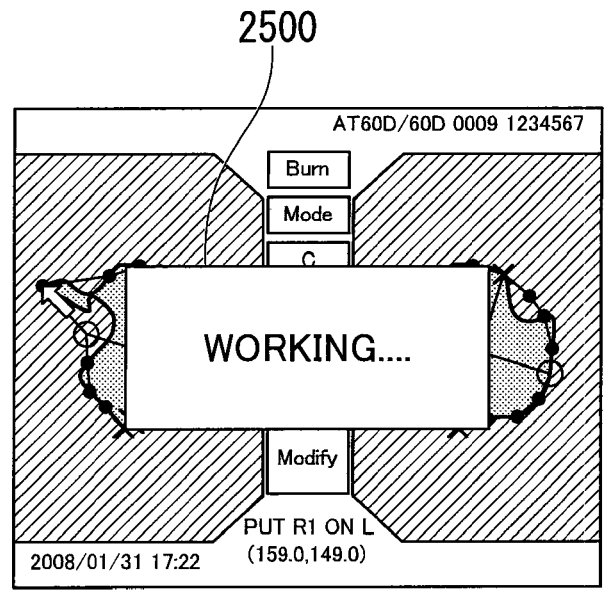
FIG. 36A is a reference diagram showing a measurement screen (at the time of modifying) in the second embodiment of the present invention.
Figure 36B:
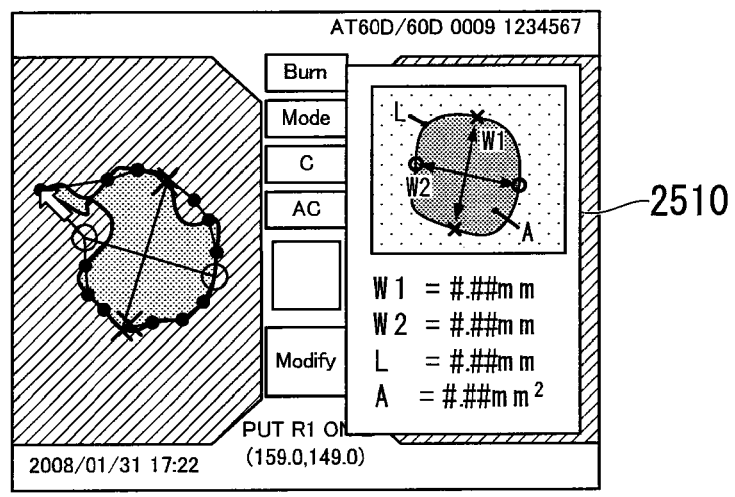
FIG. 36B is a reference diagram showing a measurement screen (at the time of modifying) in the second embodiment of the present invention.

Subsequently, the burning region including the corrected burning composing point is displayed on the measurement screen (Step SL). Subsequently, a burning recalculation is performed in which the burning size is calculated again based on the image coordinates of the corrected burning composing point (Step SM). Details of the burning recalculation will be described later. As shown in FIG. 36A, during execution of the burning recalculation, a window 2500 that indicates that calculation is in progress is displayed. On completion of the burning recalculation, a result window 2510 is redisplayed, as shown in FIG. 36B (Step SN). In the result window 2510, a recalculated burning size is displayed.

After the result of the burning recalculation is displayed, if the user continues modifying (if Yes in Step SO), then the process returns to Step SI. If the user finishes modifying, (if No in Step SO), then the process moves to Step SP. When the user moves the cursor onto the "Modify" icon and performs an operation such as a click (Step SP), the burning composing point correction portion 18g removes (deletes) the label table (s) in the memory portion 18f (Step SQ). Subsequently, the endoscope apparatus for measurement 1 finishes the modify mode, and returns to normal measurement.

Next is a detailed description of a procedure of correcting the image coordinates of burning composing points (which corresponds to the above Steps SI, SJ, SK, and SL) with reference to, FIG. 37A to 37E, FIG. 39, and FIG. 40. Burning composing points shown in FIG. 37A to 37E are denoted by label numbers (1 to 16) listed in the label tables. The label numbers are shown in FIG. 37A to 37E for convenience of description. However, on the actual measurement screen, label numbers are not displayed. If burning composing points 2600 calculated by the burning composing point calculation portion 18d do not well match an outline 2610 of the burning as shown in FIG. 37A, then the user moves a cursor 2620 to a position to which he or she wants a burning composing point to be corrected as shown in FIG. 37B. At this time, the position of the cursor 2620 instructed by the user is a position of the burning composing point after correction.

When the user performs an operation such as a click after moving the cursor 2620 to a desired position, the position information on the cursor 2620 is input to the measurement processing portion 18. The control portion 18a calculates image coordinates of the correction position instructed by the user, and outputs the image coordinates to the burning composing point correction portion 18g. The burning composing point correction portion 18g calculates two-dimensional distances between the correction position and the respective burning composing points based on the image coordinates of the correction position and on the image coordinates of the respective burning composing points, and selects a burning composing point at which the two-dimensional distance is minimum (a burning composing point most proximal to the correction position).

In FIG. 37B, a burning composing point 2600a is selected.
FIG. 39B shows a label table that is updated at this time. It is seen that the image coordinates of the burning composing point with label number 4 is updated from (X4, Y4) to (X4', Y4'). The burning composing point correction portion 18g stores the label table in the memory portion 18f. Subsequently, the burning composing point correction portion 18g performs drawing processing of the burning composing points after correction based on the updated label table. As a result, as shown in FIG. 37C, the burning composing point 2600a is moved to the position of the cursor 2620.

Through repeated instruction for a correction position as described above, the user corrects the burning composing points so that the outline of the burning well matches the burning composing points. For example, after correcting the burning composing point 2600a as shown in FIG. 37C, the user corrects a burning composing point 2600b as shown in FIG. 37D through the procedure similar to the above. Furthermore, the user corrects a burning composing point 2600c as shown in FIG. 37E through a procedure similar to the procedure above.

At this time, the burning composing point correction portion 18g updates the label table as shown in FIG. 40A and FIG. 40B. FIG. 40A shows a label table after correction of the burning composing point 2600b. The image coordinates of the burning composing point with label number 5 are updated from (X5, Y5) to (X5', Y5'). FIG. 40B shows a label table after correction of the burning composing point 2600c. The image coordinates of the burning composing point with label number 16 are updates from (X16, Y16) to (X16', Y16').

When the user specifies a position after correction of a burning composing point in the above procedure, a burning composing point closest to the position is automatically selected, and the burning composing point moves to the specified position. It may be configured such that, when the user specifies a correction-target burning composing point and then specifies a position after correction, the specified burning composing point moves to the specified position.

Figure 38:
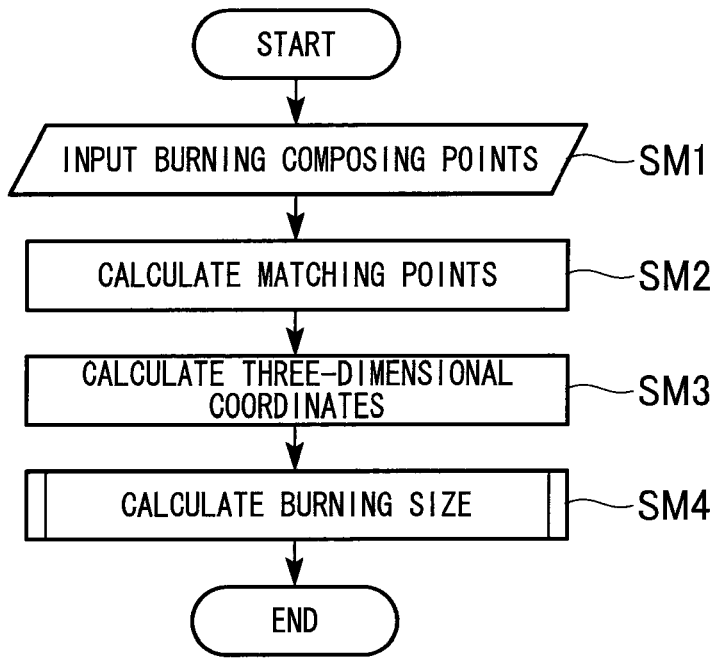
FIG. 38 is a flow chart showing a procedure of a burning recalculation in the second embodiment of the present invention.

Next is a detailed description of the burning recalculation (Step SM) with reference to FIG. 38. When the burning composing point after correction that is calculated by the burning composing point correction portion 18g is input (Step SM1), the burning composing point calculation portion 18d calculates image coordinates of matching points on the right screen that correspond to the respective burning composing points on the left screen (Step SM2). Subsequently, the burning composing point calculation portion 18d calculates spatial coordinates (three-dimensional coordinates in the actual space) of the respective burning composing points based on the image coordinates of the burning composing points and their matching points (Step SM3). Finally, the burning size calculation portion 18e calculates a burning size based on the space coordinates of the calculated burning composing points (Step SM4).

Figure 42A:
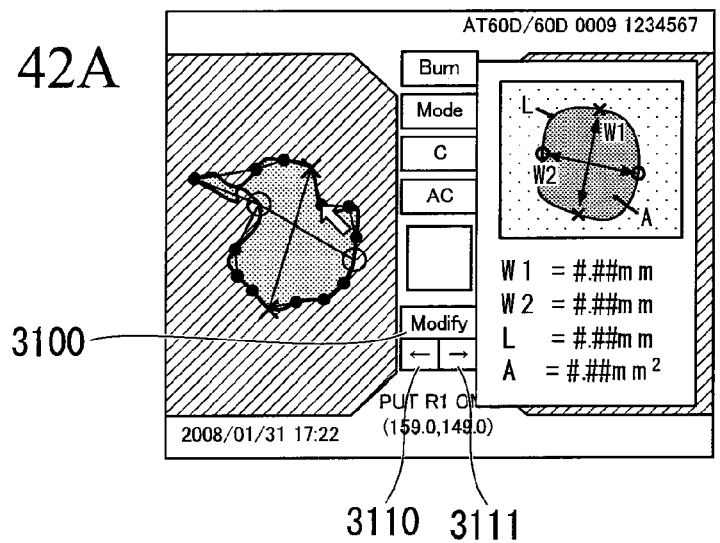
FIG. 42A is a reference diagram showing a measurement screen (at the time of modifying) in the second embodiment of the present invention.

Next is a description of a modification of the present embodiment. In the present modification, preview icons ("←" icon 3110 and "→" icon 3111) are provided under a "Modify" icon 3100 on the measurement screen as shown in FIG. 42A. Through operation on the preview icons, the user is capable of returning or advancing the state of the corrected burning composing points after shift to the modify mode.

Figure 41:
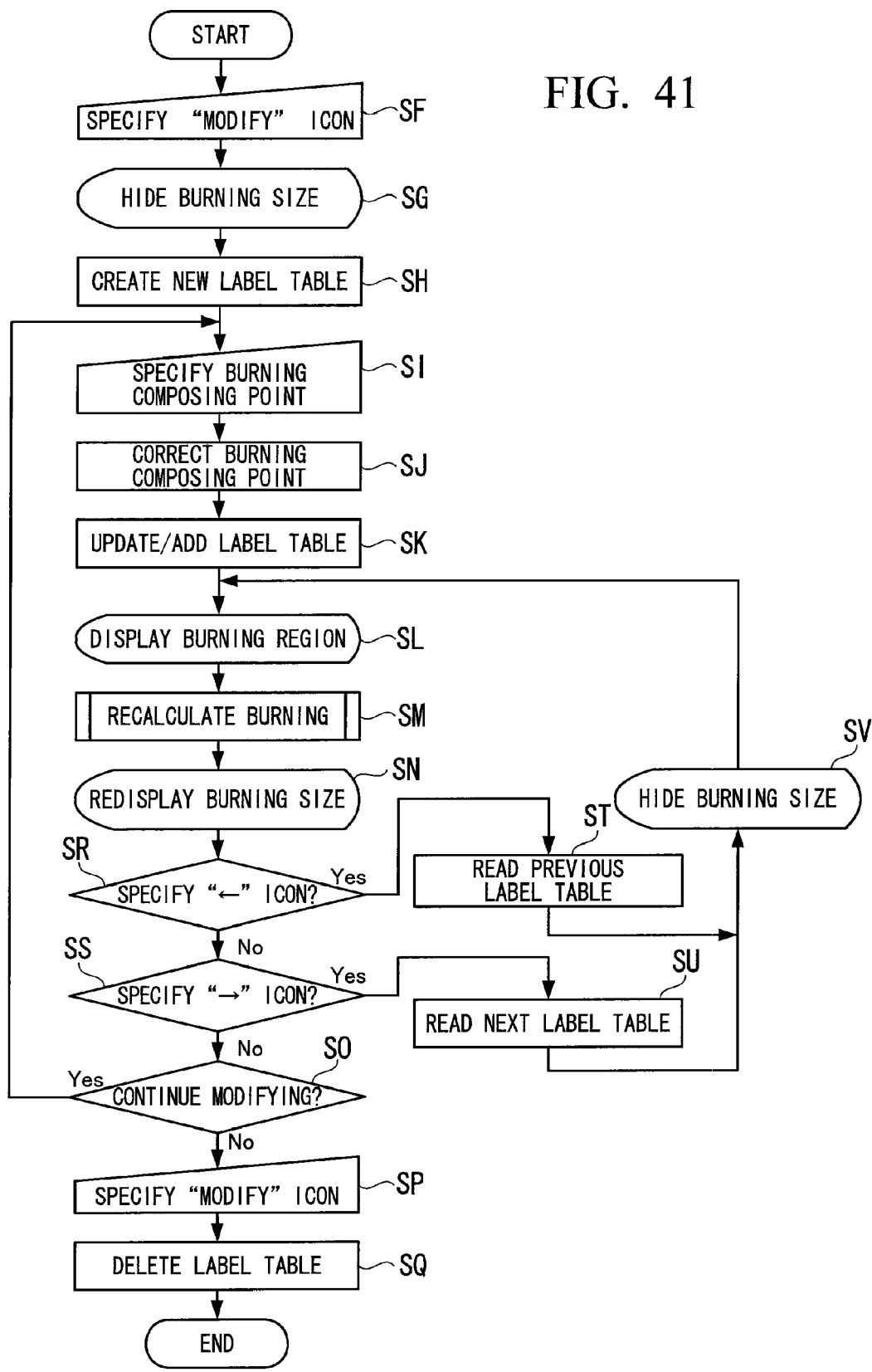
FIG. 41 is a flow chart showing a correction procedure of a burning composing point in the second embodiment of the present invention.

Furthermore, a procedure of modifying burning composing points in the present modification is as shown in FIG. 41. Steps SR to SV are added between the procedure of modifying in Step SN (redisplay of the burning size) and Step SO (determination whether to continue modifying) shown in FIG. 34. Hereunder is a detailed description of these processes. In Step SK, a label table (correction result information), which is an update based on the result of correction in Step SJ, is created and stored in the memory portion 18f in a state distinguishable from the label table prior to update. That is, every time a burning composing point is corrected, an updated label table is created and added to the memory portion 18f.

At the time of modifying, a label table is read from the memory portion 18f in accordance with the result of the user operating on the preview icons, and the burning region on the measurement screen is updated. The label tables are distinguished by, for example, the sequence number. Suppose that the sequence number is increased by 1 every time a label table is added. If "←" icon 3110 is operated, then the target of process is shifted to the label table with the sequence number smaller than the sequence number of the current label table by 1. If "→" icon 3111 is operated, then the target of process is shifted to the label table with the sequence number larger than the sequence number of the current label table by 1.

Figure 42B:
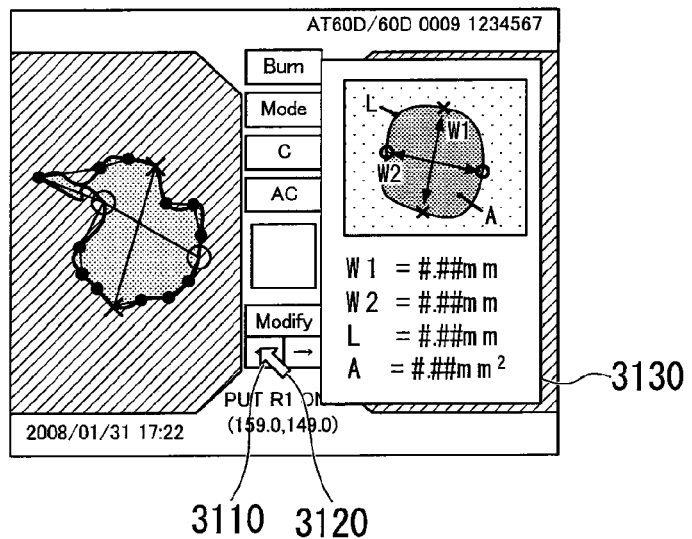
FIG. 42B is a reference diagram showing a measurement screen (at the time of modifying) in the second embodiment of the present invention.

FIG. 42A shows a measurement screen after correction of burning composing points. When the user moves a cursor 3120 onto "←" icon 3110 as shown in FIG. 42B and performs an operation such as a click (if Yes in Step SR), the process moves to Step ST, and the label table created when the previous correction of a burning composing point was made is read from the memory portion 18f. Subsequently, the result window 3130 is hidden (Step SV), and the process returns to Step SL.

Figure 42C:
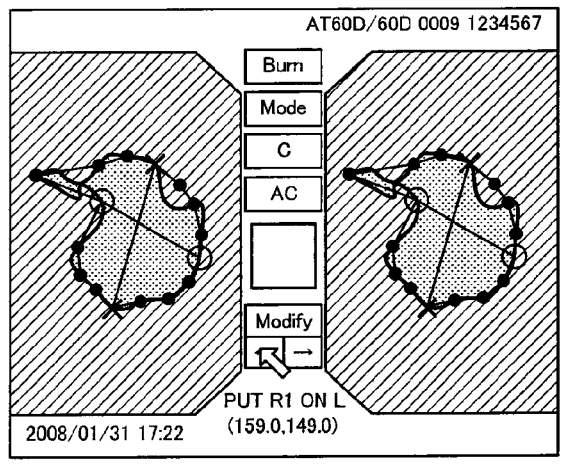
FIG. 42C is a reference diagram showing a measurement screen (at the time of modifying) in the second embodiment of the present invention.
Figure 43A:
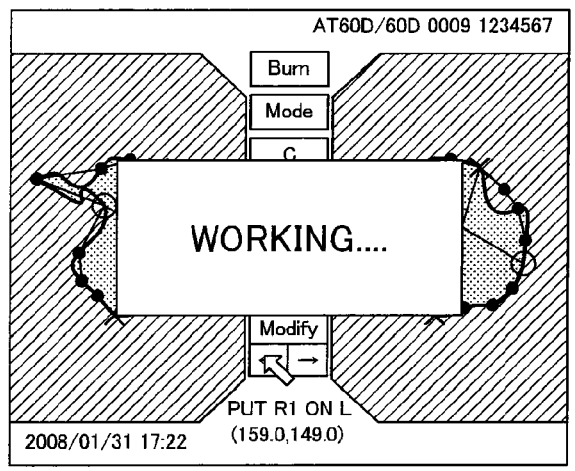
FIG. 43A is a reference diagram showing a measurement screen (at the time of modifying) in the second embodiment of the present invention.
Figure 43B:
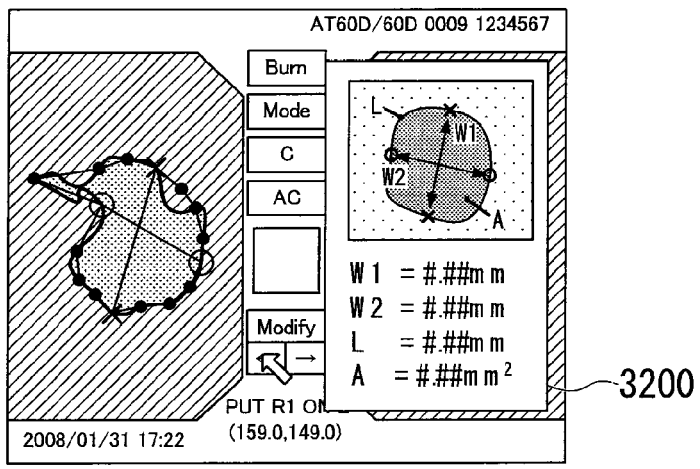
FIG. 43B is a reference diagram showing a measurement screen (at the time of modifying) in the second embodiment of the present invention.

Subsequently, the burning region including the previously corrected burning composing point is displayed on the measurement screen based on the label table read from the memory portion 18f (Step SL). FIG. 42C shows the state of a measurement screen at this time. Furthermore, the measurement screen is turned to the state as shown in FIG. 43A, and a burning recalculation is performed (Step SM). After completion of the burning recalculation, a result window 3200 is redisplayed as shown in FIG. 43B (Step SN).

Figure 43C:
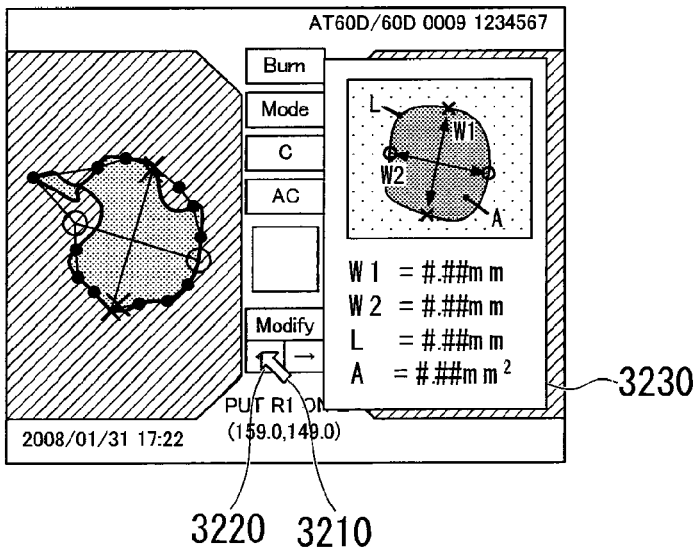
FIG. 43C is a reference diagram showing a measurement screen (at the time of modifying) in the second embodiment of the present invention.

When the user moves a cursor 3210 onto "←" icon 3220 again as shown in FIG. 43C and performs an operation such as a click (if Yes in Step SR), the process proceeds similarly to the above. Then, the burning region when the previous but one correction of a burning composing point was made and a result window 3230 are redisplayed.

Figure 44A:
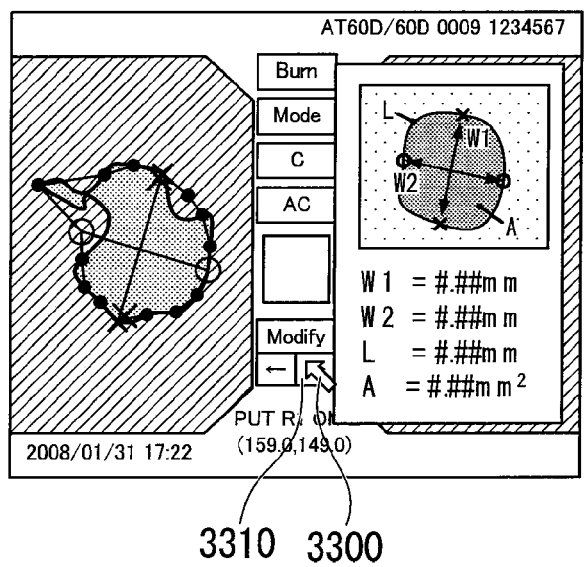
FIG. 44A is a reference diagram showing a measurement screen (at the time of modifying) in the second embodiment of the present invention.

Furthermore, when, in the state of FIG. 43C, the user moves a cursor 3300 onto "→" icon 3310 as shown in FIG. 44A and performs an operation such as a click (if Yes in Step SS), the process moves to Step SU, and the label table created when the next correction of a burning composing point was made is read from the memory portion 18f. Subsequently, the result window is hidden (Step SV), and the process returns to Step SL.

Figure 44B:
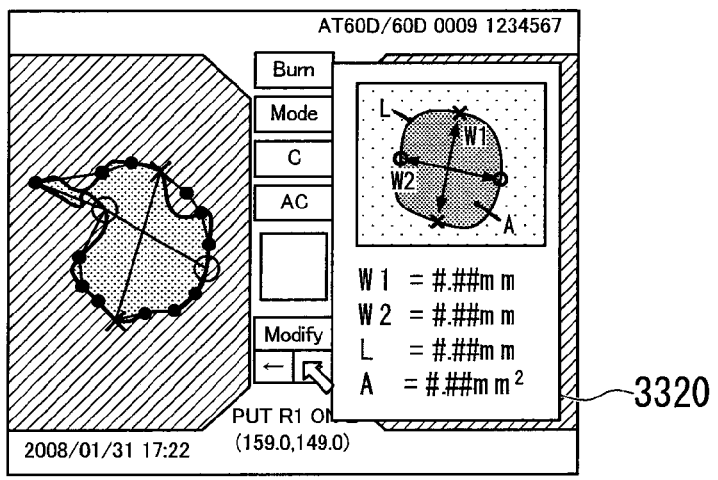
FIG. 44B is a reference diagram showing a measurement screen (at the time of modifying) in the second embodiment of the present invention.

Subsequently, the burning region including the burning composing point corrected next time based on the label table read from the memory portion 18f is displayed on the measurement screen (Step SL), and furthermore, a burning recalculation is performed (Step SM). On completion of the burning recalculation, a result window 3320 is redisplayed as shown in FIG. 44B (Step SN).

Figure 44C:
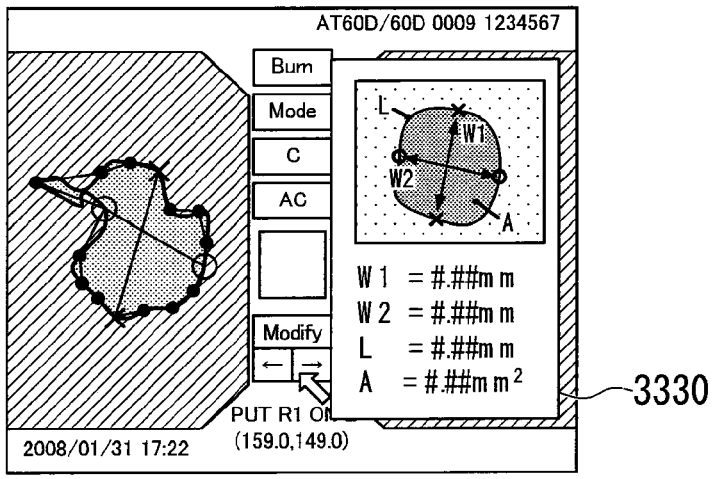
FIG. 44C is a reference diagram showing a measurement screen (at the time of modifying) in the second embodiment of the present invention.

When the user moves the cursor 3300 on to "→" icon 3310 again and performs an operation such as a click (if Yes in Step SR), the process proceeds similarly to the above. Then, as shown in FIG. 44C, the burning region when the previous but one correction of a burning composing point was made and a result window 3330 are redisplayed.

Although not specifically shown in the figures, when the user moves the cursor onto one of the preview icons and performs an operation such as a click (Steps SR, SS), the user is put into a state of being incapable of specifying a preview icon if the label table related to the previous or next correction is not present in the memory portion 18f.

As described above, according to the present embodiment, it is possible to make a correction of a burning composing point after the calculation of the burning composing points. This makes it possible to improve the calculational accuracy of a burning size. Furthermore, the user only specifies a position of a burning composing point after correction on the measurement screen. Thereby, a burning composing point most proximal to the position of the specified burning composing point is automatically selected, and the position of the most proximal burning composing point is automatically corrected to the position specified by the user. Therefore, it is possible to reduce the burden of operation, and improve operability.

Furthermore, after correction of a burning composing point, the state of the corrected burning composing point can be returned or advanced. Therefore, the correction process of the burning composing points can be checked, and the calculational accuracy of a burning size can be improved. In addition, it is possible to make a correction over again with ease. Therefore, it is possible to reduce the burden of operation, and improve operability.

Third Embodiment

Next is a description of a third embodiment of the present invention. In the second embodiment, the position of an already calculated burning composing point is corrected. However, in the present embodiment, it is possible to newly add a burning composing point.

In the correction method of a burning composing point in the second embodiment, there are cases where some shapes of the burning allow an edge line made of line segments connecting the burning composing points with one another to roughly match an outline of the burning. For example, if a calculation of burning composing points similar to that of the first embodiment is performed for a burning 3400 with a shape shown in FIG. 45A, then burning composing points 3410 are calculated as shown in FIG. 45B.

In such cases, it is possible for the user to correct a burning composing point 3410a as shown in FIG. 45C and further correct a burning composing point 3410b as shown in FIG. 45D similarly to the case of the second embodiment. However, even if the burning composing points 3410a, 3410b are corrected, an edge line 3430 that connects the burning composing points with each other do not so much match an outline of the burning 3400 in regions 3420, 3421 shown in FIG. 45D. Therefore, in the present embodiment, the position of the already calculated burning composing point is not corrected. Instead, a new burning composing point is added, to thereby make it possible to correct (Modify) the burning composing point more precisely.

A measurement processing portion 18 according to the present embodiment has a configuration similar to that of the second embodiment. Furthermore, a correction procedure of a burning composing point in the present embodiment is substantially the same as the procedure shown in FIG. 34, the difference lying only in the correction of the burning composing point in Step SJ and the update/addition of a label table in Step SK. Hereunder is a detailed description of a procedure (Steps SI, SJ, SK, and SL) of correcting a burning composing point in the present embodiment with reference to FIG. 46 to FIG. 50.

Figure 46C:
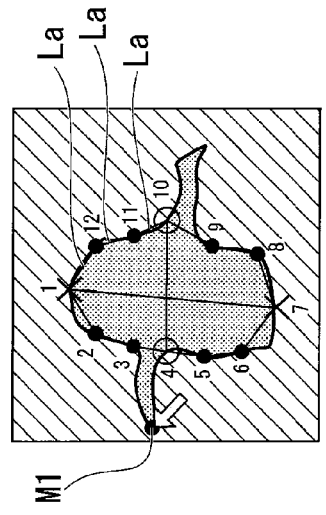
FIG. 46C is a reference diagram showing the correction procedure of burning composing points in the third embodiment of the present invention.
Figure 46B:
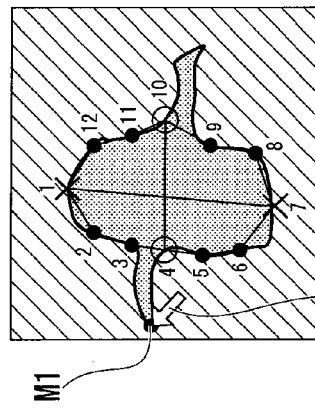
FIG. 46B is a reference diagram showing the correction procedure of burning composing points in the third embodiment of the present invention.
Figure 46A:
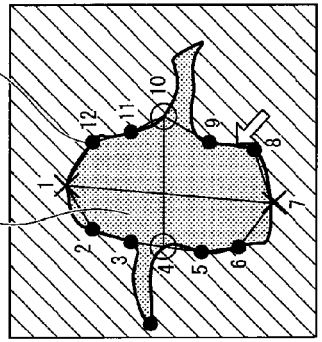
FIG. 46A is a reference diagram showing a correction procedure of burning composing points in a third embodiment of the present invention.

Burning composing points shown in FIG. 46A and so on are denoted by label numbers (1 to 12) listed in the label tables. The label numbers are shown in FIG. 46A and so on for convenience of description. However, on the actual measurement screen, label numbers are not displayed. FIG. 49A shows a label table before correction of a burning composing point, which is created in Step SH in FIG. 34.

If an edge line that connects burning composing points 3500 calculated by the burning composing point calculation portion 18*d* does not well match an outline of a burning 3510 as shown in FIG. 46A, then the user moves a cursor 3520 to point it to a position to which he or she wants a burning composing point to be corrected (a position of a correction point M1) as shown in FIG. 46B and performs an operation such as a click. At this time, the burning composing point correction portion 18*g* calculates line segments La that connect adjacent burning composing points as shown in FIG. 46C. Each line segment La is calculated based on image coordinates of two adjacent burning composing points listed in a label table shown in FIG. 49A.

Figure 46E:
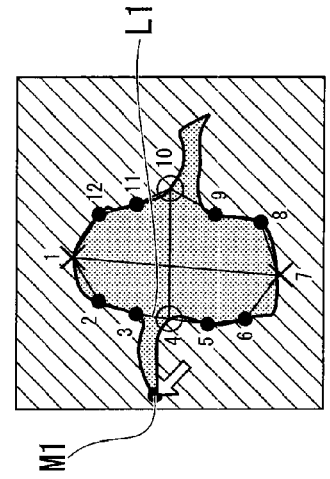
FIG. 46E is a reference diagram showing the correction procedure of burning composing points in the third embodiment of the present invention.
Figure 46D:
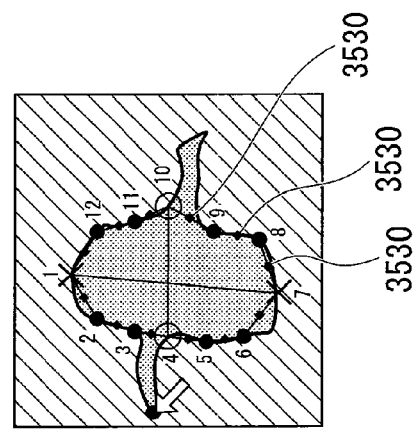
FIG. 46D is a reference diagram showing the correction procedure of burning composing points in the third embodiment of the present invention.

The burning composing point correction portion 18*g* searches for a line segment most proximal to the correction point M1 from among the calculated line segments La. At this time, the burning composing point correction portion 18*g* calculates midpoints 3530 each of which is between the respective two burning composing points (midpoints of the respective line segments) as shown in FIG. 46D. The midpoint of each line segment is calculated as middle coordinates between two adjacent burning composing points listed in a label table. A line segment with a midpoint most proximal to the correction point M1 becomes the most proximal line segment. As shown in FIG. 46E, the line segment most proximal to the correction point M1 is a line segment L1 that connects the burning composing points with label numbers 3, 4.

After finding the line segment L1, which is most proximal to the correction point M1, the burning composing point correction portion 18*g* adds the correction point M1 as a new burning composing point, and updates the edge line based on the positions of the burning composing points as shown in FIG. 47A. At this time, the burning composing point correction portion 18*g* updates a logical positional relationship among the burning composing points. Therefore, before the addition of the correction point M1, the burning composing point with label numbers 3, 4 located at both ends of the line segment L1 are adjacent to each other. However, after the addition of the correction point M1, the burning composing point with label number 3 and the correction point M1 are adjacent to each other, and also the correction point M1 and the burning composing point with label number 4 are adjacent to each other.

At this time, the label table is as shown in FIG. 49B. Compared with the label table in its default state (FIG. 49A), the correction point M1 is added as a new burning composing point between the burning composing points with label numbers 3, 4. The image coordinates of the burning composing point with label number M1 is (Xm1, Ym1), and its adjacent label numbers 1, 2 are 3, 4, respectively. Furthermore, adjacent label number 2 for the burning composing point with label number 3 and adjacent label number 1 for the burning composing point with label number 4 are changed to M1.

Even after the addition of the correction point M1 as a new burning composing point, it is possible to correct a burning composing point through repetition of the above procedure. When the user moves a cursor 3600 to point it to a position to which he or she wants a burning composing point to be corrected (a position of a correction point M2) as shown in FIG. 47B and performs an operation such as a click, the burning composing point correction portion 18*g* calculates line segments Lb that connect the adjacent burning composing points as shown in FIG. 47C. Each line segment Lb is calculated based on the image coordinates of two adjacent burning composing points listed in a label table shown in FIG. 49B.

Subsequently, the burning composing point correction portion 18*g* searches for a line segment most proximal to the correction point M2 from among the calculated line segments Lb. At this time, in a manner similar to the above, the burning composing point correction portion 18*g* calculates midpoints each of which is between the respective two burning composing points connecting adjacent burning composing points (midpoints of the respective line segments). A line segment with a midpoint most proximal to the correction point M2 becomes the most proximal line segment. As shown in FIG. 47D, the line segment most proximal to the correction point M2 is a line segment L2 that connects the burning composing points with label numbers 9, 10.

After finding the line segment L2, which is most proximal to the correction point M2, the burning composing point correction portion 18*g* adds the correction point M2 as a new burning composing point, and updates the edge line based on the positions of the burning composing points as shown in FIG. 47E. At this time, the burning composing point correction portion 18*g* updates a logical positional relationship among the burning composing points. Therefore, before the addition of the correction point M2, the burning composing point with label numbers 9, 10 located at both ends of the line segment L2 are adjacent to each other. However, after the addition of the correction point M2, the burning composing point with label number 9 and the correction point M2 are adjacent to each other, and also the correction point M2 and the burning composing point with label number 10 are adjacent to each other.

At this time, the label table is as shown in FIG. 50A. Compared with the label table in its previous state (FIG. 49B), the correction point M2 is added as a new burning composing point between the burning composing points with label numbers 9, 10. The image coordinates of the burning composing point with label number M2 is (Xm2, Ym2), and its adjacent label numbers 1, 2 are 9, 10, respectively. Furthermore, adjacent label number 2 for the burning composing point with label number 9 and adjacent label number 1 for the burning composing point with label number 10 are changed to M2.

Figure 48A:
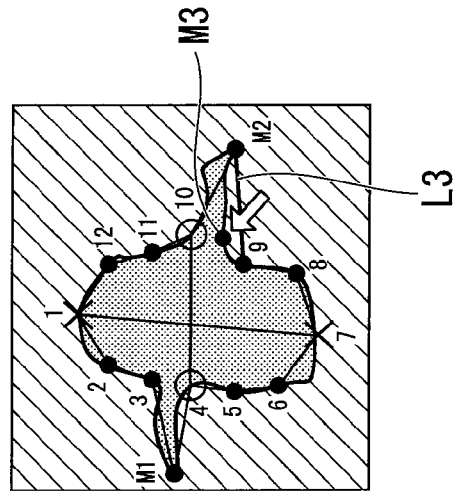
FIG. 48A is a reference diagram showing the correction procedure of burning composing points in the third embodiment of the present invention.
Figure 48B:
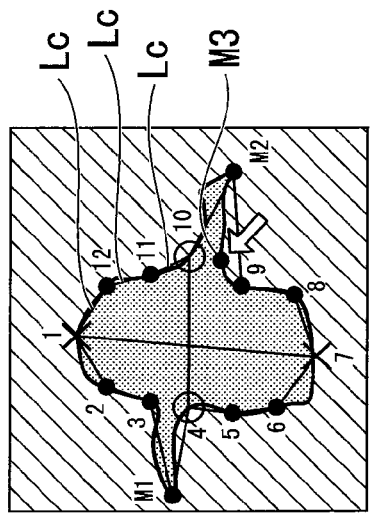
FIG. 48B is a reference diagram showing the correction procedure of burning composing points in the third embodiment of the present invention.

Furthermore, when the user moves a cursor 3700 to point it to a position to which he or she wants a burning composing point to be corrected (a position of a correction point M3) as shown in FIG. 48A and performs an operation such as a click, the burning composing point correction portion 18g calculates line segments Lc that connect the adjacent burning composing points as shown in FIG. 48B. Each line segment Lc is calculated based on the image coordinates of two adjacent burning composing points listed in a label table shown in FIG. 50A.

Figure 48C:
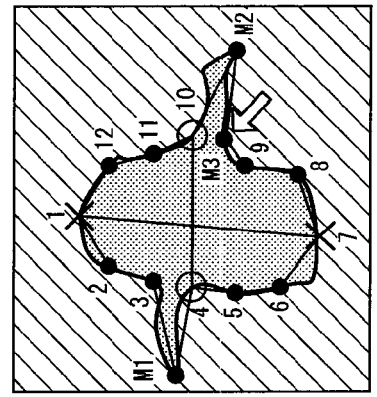
FIG. 48C is a reference diagram showing the correction procedure of burning composing points in the third embodiment of the present invention.

Subsequently, the burning composing point correction portion 18g searches for a line segment most proximal to the correction point M3 from among the calculated line segments Lc. At this time, in a manner similar to the above, the burning composing point correction portion 18g calculates midpoints each of which is between the respective two burning composing points connecting adjacent burning composing points (midpoints of the respective line segments). A line segment with a midpoint most proximal to the correction point M3 becomes the most proximal line segment. As shown in FIG. 48C, the line segment most proximal to the correction point M3 is a line segment L3 that connects the burning composing points with label numbers 9, M2.

Figure 48D:
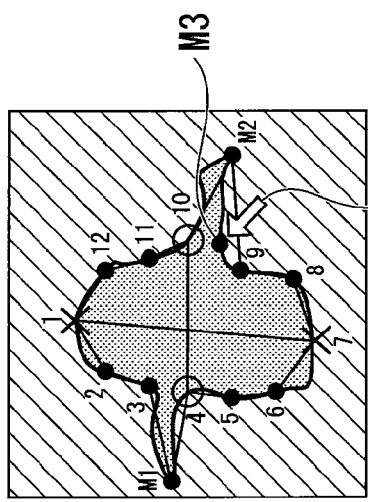
FIG. 48D is a reference diagram showing the correction procedure of burning composing points in the third embodiment of the present invention.
Figure 48E:
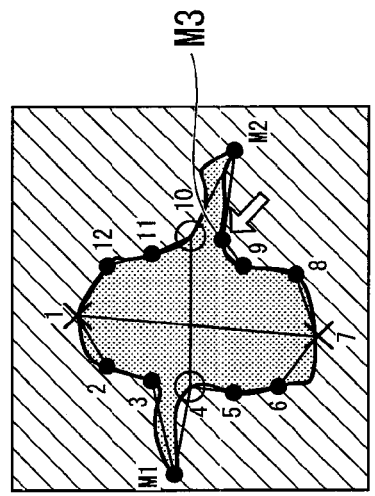
FIG. 48E is a reference diagram showing the correction procedure of burning composing points in the third embodiment of the present invention.

After finding the line segment L3, which is most proximal to the correction point M3, the burning composing point correction portion 18g adds the correction point M3 as a new burning composing point, and updates the edge line based on the positions of the burning composing points as shown in FIG. 48D. At this time, the burning composing point correction portion 18g updates a logical positional relationship among the burning composing points. Therefore, before the addition of the correction point M3, the burning composing point with label numbers 9, M2 located at both ends of the line segment L3 are adjacent to each other. However, after the addition of the correction point M3, the burning composing point with label number 9 and the correction point M3 are adjacent to each other, and also the correction point M3 and the burning composing point with label number M2 are adjacent to each other.

At this time, the label table is as shown in FIG. 50B. Compared with the label table in its previous state (FIG. 50A), the correction point M3 is added as a new burning composing point between the burning composing points with label numbers 9, M2. The image coordinates of the burning composing point with label number M3 is (Xm3, Ym3), and its adjacent label numbers 1, 2 are 9, M2, respectively. Furthermore, adjacent label number 2 for the burning composing point with label number 9 and adjacent label number 1 for the burning composing point with label number M2 are changed to M3.

As a result, the shape of the edge line obtained by the correction method of burning composing points in the present embodiment (FIG. 48E) matches the outline of the burning more accurately than the shape of the edge line obtained by the correction method of a burning composing point in the second embodiment (FIG. 45D).

In the above, all the processes of correcting the burning composing points are displayed on the measurement screen as shown in FIG. 46A to FIG. 48E. In addition, each label number affixed to each burning composing point is not displayed. However, the configuration is not limited to this. Some of the processes of correcting the burning composing point may be hidden. In addition, the label numbers may be displayed. Although not specifically shown in the figures, preview icons may be provided on the measurement screen so as to return the state of the corrected burning composing points to their previous state and advance their state, similarly to the modifications of the second embodiment.

As described above, according to the present embodiment, with the addition of a new burning composing point, it is possible to correct the burning composing point more accurately and also to improve the calculational accuracy of a burning size.

Fourth Embodiment

Next is a description of a fourth embodiment of the present invention. In the correction method of a burning composing point in the third embodiment, when adding a new burning composing point, the user is not capable of selecting a burning composing point which he or she wants to be adjacent to the correction point. In contrast to this, in the present embodiment, when adding a new burning composing point, the user is capable of selecting a burning composing point to be adjacent to the correction point.

Figure 51A:
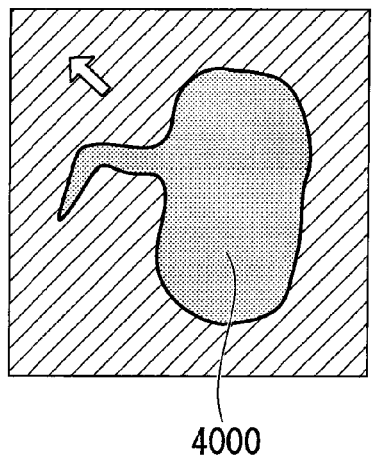
FIG. 51A is a reference diagram showing how a burning composing point is corrected in the third embodiment of the present invention.
Figure 51B:
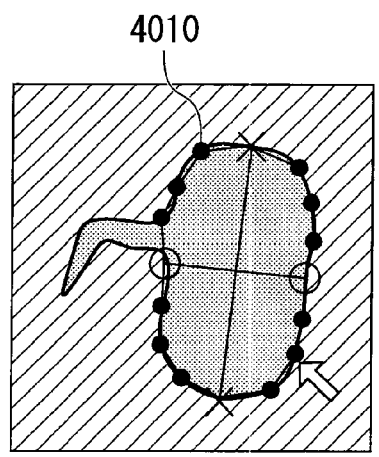
FIG. 51B is a reference diagram how a burning composing point is corrected in the third embodiment of the present invention.

In the correction method of a burning composing points in the third embodiment, there are cases where some shapes of the burning allow an edge line made of line segments connecting the burning composing points with one another to roughly match an outline of the burning. For example, if a calculation of burning composing points similar to that of the first embodiment is performed for a burning 4000 with a shape shown in FIG. 51A, then burning composing points 4010 are calculated as shown in FIG. 51B.

Figure 51C:
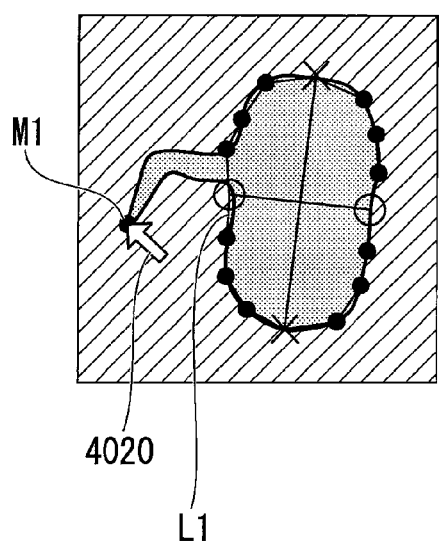
FIG. 51C is a reference diagram how a burning composing point is corrected in the third embodiment of the present invention.
Figure 51D:
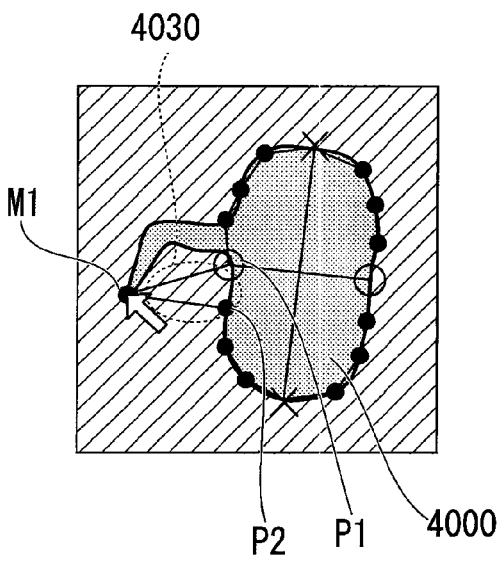
FIG. 51D is a reference diagram how a burning composing point is corrected in the third embodiment of the present invention.

In the third embodiment, when the user moves a cursor 4020 to point to a position to which he or she wants a burning composing point to be corrected (a position of a correction point M1) as shown in FIG. 51C and performs an operation such as a click, a line segment L1, which is most proximal to the correction point M1, is selected. Subsequently, as shown in FIG. 51D, a logical positional relationship among the burning composing points is updated so that burning composing points P1, P2 located at both ends of the line segment L1 are adjacent to the correction point M1. Based on the updated positional relationship, the edge line that connects the adjacent burning composing points is updated. However, an edge line in a region 4030 hardly matches the outline of the burning 4000. Therefore, in the present embodiment, when a new burning composing point is added, the user is allowed to select a burning composing point which he or she wants to be adjacent to a correction point in a simple manner, and to correct (Modify) the burning composing point more accurately.

A measurement processing portion 18 according to the present embodiment has a configuration similar to that of the second embodiment. Furthermore, a correction procedure of a burning composing point in the present embodiment is substantially the same as the procedure shown in FIG. 34, the difference lying only in the correction of the burning composing point in Step SJ and the update/addition of a label table in Step SK. Hereunder is a detailed description of a procedure (Steps SI, SJ, SK, and SL) of correcting a burning composing points in the present embodiment with reference to FIG. 52A to FIG. 60B.

Burning composing points shown in FIG. 52A and so on are denoted by label numbers (1 to 16) listed in the label tables. The label numbers are shown in FIG. 52A and so on for convenience of description. However, on the actual measurement screen, label numbers are not displayed. FIG. 56A shows a label table created in Step SH in FIG. 34 before correction of a burning composing point.

If an edge line that connects burning composing points 4100 calculated by the burning composing point calculation portion 18d does not well match an outline of a burning 4110 as shown in FIG. 52A, then the user moves a cursor 4120 to point it to a position to which he or she wants a burning composing point to be corrected (a position of a correction point M1) as shown in FIG. 52B and performs an operation such as a click. At this time, the burning composing point correction portion 18g calculates line segments La that connect adjacent burning composing points as shown in FIG. 52C. The calculational method of the line segments La is similar to that described in the third embodiment.

The burning composing point correction portion 18g searches for a line segment most proximal to the correction point M1 from among the calculated line segments La. At this time, the burning composing point correction portion 18g calculates midpoints 4130 each of which is between the respective two burning composing points (midpoints of the respective line segments) as shown in FIG. 52D. A line segment with a midpoint most proximal to the correction point M1 becomes the most proximal line segment. As shown in FIG. 52E, the line segment most proximal to the correction point M1 is a line segment L1 that connects the burning composing points with label numbers 5, 6.

After finding the line segment L1, which is most proximal to the correction point M1, the burning composing point correction portion 18g adds the correction point M1 as a new burning composing point, and updates the edge line based on the positions of the burning composing points as shown in FIG. 52F. At this time, the burning composing point correction portion 18g updates a logical positional relationship among the burning composing points. Therefore, before the addition of the correction point M1, the burning composing point with label numbers 5, 6 located at both ends of the line segment L1 are adjacent to each other. However, after the addition of the correction point M1, the burning composing point with label number 5 and the correction point M1 are adjacent to each other, and also the correction point M1 and the burning composing point with label number 6 are adjacent to each other.

At this time, the label table is as shown in FIG. 56B. Compared with the label table in its default state (FIG. 56A), the correction point M1 is added as a new burning composing point between the burning composing points with label numbers 5, 6. The image coordinates of the burning composing point with label number M1 is (Xm1, Ym1), and its adjacent label numbers 1, 2 are 5, 6, respectively. Furthermore, adjacent label number 2 for the burning composing point with label number 5 and adjacent label number 1 for the burning composing point with label number 6 are changed to M1.

However, as shown in FIG. 52F, an edge line in a region 4140 hardly matches the outline of the burning 4110. In such a case, it is possible to correct a burning composing point in the present embodiment in a manner described below. Especially in the present embodiment, if the user specifies the same correction point again without moving the cursor, then the burning composing points adjacent to the correction point are modified.

Figure 53A:
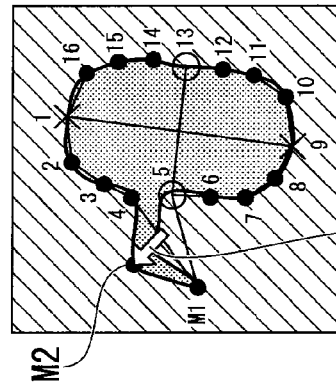

When the user performs an operation such as a click again at the position of the correction point M1 without moving a cursor 4200 as shown in FIG. 53A, the burning composing point correction portion 18g deletes the information on the correction point M1, and returns the logical positional relationship among the burning composing points to the state prior to the update. Thereby, as shown in FIG. 57A, the label table returns to the same state as that of FIG. 56A. The burning composing point correction portion 18g searches for a line segment second proximate to the correction point M1 (second least distant from the correction point M1) from among the already calculated line segments La. In this case, the line segment second proximate to the correction point M1 is a line segment L2, as shown in FIG. 53A.

Figure 53B:
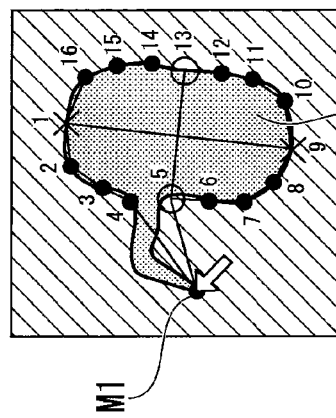

After finding the line segment L2, which is second proximal to the correction point M1, the burning composing point correction portion 18g adds the correction point M1 as a new burning composing point, and updates the edge line based on the positions of the burning composing points as shown in FIG. 53B. At this time, the burning composing point correction portion 18g updates a logical positional relationship among the burning composing points. Therefore, before the addition of the correction point M1, the burning composing point with label numbers 4, 5 located at both ends of the line segment L2 are adjacent to each other. However, after the addition of the correction point M1, the burning composing point with label number 4 and the correction point M1 are adjacent to each other, and also the correction point M1 and the burning composing point with label number 5 are adjacent to each other.

At this time, the label table is as shown in FIG. 57B. Compared with the label table shown in FIG. 57A, the correction point M1 is added as a new burning composing point between the burning composing points with label numbers 4, 5. The image coordinates of the burning composing point with label number M1 is (Xm1, Ym1), and its adjacent label numbers 1, 2 are 4, 5, respectively. Furthermore, adjacent label number 2 for the burning composing point with label number 4 and adjacent label number 1 for the burning composing point with label number 5 are changed to M1.

Figure 53C:
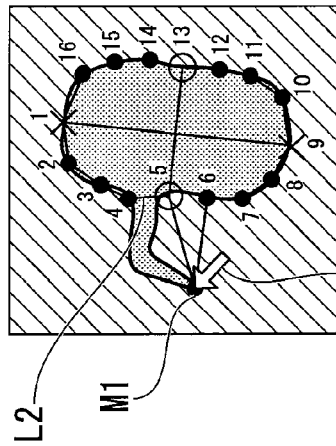
Figure 53D:
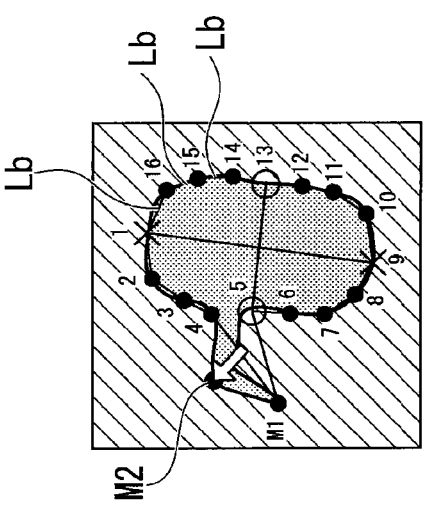
Figure 53E:
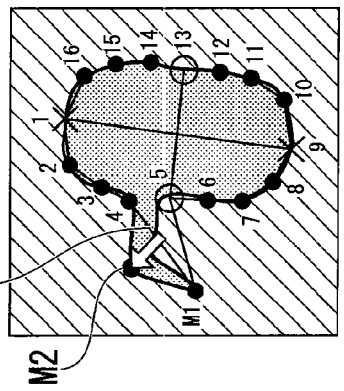

Furthermore, when the user moves a cursor 4220 to point it to a position to which he or she wants a burning composing point to be corrected (a position of a correction point M2) as shown in FIG. 53C and performs an operation such as a click, the burning composing point correction portion 18g calculates line segments Lb that connect the adjacent burning composing points as shown in FIG. 53D. Subsequently, the burning composing point correction portion 18g searches for a line segment most proximal to the correction point M2 from among the calculated line segments Lb. As shown in FIG. 53E, the line segment most proximal to the correction point M2 is a line segment L3 that connects the burning composing points with label numbers 4, M1.

After finding the line segment L3, which is most proximal to the correction point M2, the burning composing point correction portion 18g adds the correction point M2 as a new burning composing point. The burning composing point correction portion 18g then updates the edge line based on the positions of the burning composing points as shown in FIG. 54A. At this time, the burning composing point correction portion 18g updates a logical positional relationship among the burning composing points. Therefore, before the addition of the correction point M2, the burning composing point with label numbers 4, M1 located at both ends of the line segment L3 are adjacent to each other. However, after the addition of the correction point M2, the burning composing point with label number 4 and the correction point M2 are adjacent to each other, and also the correction point M2 and the burning composing point with label number M1 are adjacent to each other.

At this time, the label table is as shown in FIG. 58A. Compared with the label table shown in FIG. 57B, the correction point M2 is added as a new burning composing point between the burning composing points with label numbers 4, M1. The image coordinates of the burning composing point with label number M2 is (Xm2, Ym2), and its adjacent label numbers 1, 2 are 4, M1, respectively. Furthermore, adjacent label number 2 for the burning composing point with label number 4 and adjacent label number 1 for the burning composing point with label number M1 are changed to M2.

Furthermore, when the user moves a cursor 4300 to point it to a position to which he or she wants a burning composing point to be corrected (a position of a correction point M3) as shown in FIG. 54B and performs an operation such as a click, the burning composing point correction portion 18g calculates line segments Lc that connect the adjacent burning composing points as shown in FIG. 54C. Subsequently, the burning composing point correction portion 18g searches for a line segment most proximal to the correction point M3 from among the calculated line segments Lc. As shown in FIG. 54D, the line segment most proximal to the correction point M3 is a line segment L4 that connects the burning composing points with label numbers 4, M2.

After finding the line segment L4, which is most proximal to the correction point M3, the burning composing point correction portion 18g adds the correction point M3 as a new burning composing point, and updates the edge line based on the positions of the burning composing points as shown in FIG. 54E. At this time, the burning composing point correction portion 18g updates a logical positional relationship among the burning composing points. Therefore, before the addition of the correction point M3, the burning composing point with label numbers 4, M2 located at both ends of the line segment L4 are adjacent to each other. However, after the addition of the correction point M3, the burning composing point with label number 4 and the correction point M3 are adjacent to each other, and also the correction point M3 and the burning composing point with label number M2 are adjacent to each other.

At this time, the label table is as shown in FIG. 58B. Compared with the label table shown in FIG. 58A, the correction point M3 is added as a new burning composing point between the burning composing points with label numbers 4, M2. The image coordinates of the burning composing point with label number M3 is (Xm3, Ym3), and its adjacent label numbers 1, 2 are 4, M2, respectively. Furthermore, adjacent label number 2 for the burning composing point with label number 4 and adjacent label number 1 for the burning composing point with label number M2 are changed to M3.

However, as shown in FIG. 54E, an edge line in a region 4310 does not so much match an outline of a burning 4320. Therefore, similarly to the aforementioned procedure, the burning composing points adjacent to the correction point M3 are modified.

When the user performs an operation such as a click again at the position of the correction point M3 without moving a cursor 4400 as shown in FIG. 55A, the burning composing point correction portion 18g deletes the information on the correction point M3, and returns the logical positional relationship among the burning composing points to the state prior to the update. Thereby, as shown in FIG. 59A, the label table returns to the same state as that of FIG. 58A. The burning composing point correction portion 18g searches for a line segment second proximate to the correction point M3 (second least distant from the correction point M3) from among the already calculated line segments Lc. In this case, the line segment second proximate to the correction point M3 is a line segment L5, as shown in FIG. 55A.

After finding the line segment L5, which is second proximal to the correction point M3, the burning composing point correction portion 18g adds the correction point M3 as a new burning composing point, and updates the edge line based on the positions of the burning composing points as shown in FIG. 55B. At this time, the burning composing point correction portion 18g updates a logical positional relationship among the burning composing points. Therefore, before the addition of the correction point M3, the burning composing point with label numbers M2, M1 located at both ends of the line segment L5 are adjacent to each other. However, after the addition of the correction point M3, the burning composing point with label number M2 and the correction point M3 are adjacent to each other, and also the correction point M3 and the burning composing point with label number M1 are adjacent to each other.

At this time, the label table is as shown in FIG. 59B. Compared with the label table shown in FIG. 59A, the correction point M3 is added as a new burning composing point between the burning composing points with label numbers M2, M1. The image coordinates of the burning composing point with label number M3 is (Xm3, Ym3), and its adjacent label numbers 1, 2 are M2, M1, respectively. Furthermore, adjacent label number 2 for the burning composing point with label number M2 and adjacent label number 1 for the burning composing point with label number M1 are changed to M3.

However, as shown in FIG. 55B, an edge line in a region 4410 does not match so much with an outline of a burning 4420. Therefore, similarly to the aforementioned procedure, the burning composing points adjacent to the correction point M3 are modified.

When the user performs an operation such as a click again at the position of the correction point M3 without moving the cursor 4400 as shown in FIG. 55C, the burning composing point correction portion 18g deletes the information on the correction point M3, and returns the logical positional relationship among the burning composing points to the state prior to the update. Thereby, as shown in FIG. 60A, the label table returns to the same state as that of FIG. 59A. The burning composing point correction portion 18g searches for a line segment third proximate to the correction point M3 (third least distant from the correction point M3) from among the already calculated line segments Lc. In this case, the line segment third proximate to the correction point M3 is a line segment L6, as shown in FIG. 55C.

After finding the line segment L6 third proximal to the correction point M3, the burning composing point correction portion 18g adds the correction point M3 as a new burning composing point, and updates the edge line based on the positions of the burning composing points as shown in FIG. 55D. At this time, the burning composing point correction portion 18g updates a logical positional relationship among the burning composing points. Therefore, before the addition of the correction point M1, the burning composing point with label numbers M1, 5 located at both ends of the line segment L6 are adjacent to each other. However, after the addition of the correction point M3, the burning composing point with label number M1 and the correction point M3 are adjacent to each other, and also the correction point M3 and the burning composing point with label number 5 are adjacent to each other.

At this time, the label table is as shown in FIG. 60B. Compared with the label table shown in FIG. 59A, the correction point M3 is added as a new burning composing point between the burning composing points with label numbers M1, 5. The image coordinates of the burning composing point with label number M3 is (Xm3, Ym3), and its adjacent label numbers 1, 2 are M1, 5, respectively. Furthermore, adjacent label number 2 for the burning composing point with label number M1 and adjacent label number 1 for the burning composing point with label number 5 are changed to M3.

As a result, the shape of the edge line obtained by the correction method of a burning composing point in the present embodiment (FIG. 55E) matches the outline of the burning more accurately than the shape of the edge line obtained by the correction method of a burning composing point in the third embodiment (FIG. 51D).

In the above, all the processes of correcting the burning composing point are displayed on the measurement screen as shown in FIG. 52A to FIG. 55E. In addition, each label number affixed to each burning composing point is not displayed. However, the configuration is not limited to this. Some of the processes of correcting the burning composing point may be hidden. In addition, the label numbers may be displayed. Although not specifically shown in the figures, preview icons may be provided on the measurement screen so as to return the state of the corrected burning composing points to their previous state and advance their state, similarly to the modifications of the second embodiment.

As described above, according to the present embodiment, a logical positional relationship among a newly added burning composing point and burning composing points selected based on the instruction from the user is corrected so that all the burning composing points are adjacent to each other (in other words, an edge line is corrected so that a newly added burning composing point and burning composing points selected based on the instruction from the user are connected by line segments). Thereby, it is possible to correct the burning composing points more accurately and also to improve the calculational accuracy of a burning size.

Fifth Embodiment

Next is a description of a fifth embodiment of the present invention. In the correction method of a burning composing point in the second embodiment, there are cases where some shapes of the burning have a twisted edge line made of line segments connecting burning composing points with each other. For example, if a calculation of burning composing points is performed for a burning 5000 with a shape as shown in FIG. 61A in a manner similar to that of the first embodiment, burning composing points 5010 as shown in FIG. 61B are calculated.

In the second embodiment, if the user, with a view to correct a burning composing point P1, moves a cursor 5020 as shown in FIG. 61C and performs an operation such as a click at a position shown in FIG. 61C, then a burning composing point P2, which is most proximal to the cursor 5020, is corrected. However, as shown in FIG. 61D, the correction brings about a twist in which parts of the edge line cross each other. This prevents the calculation of an area (spatial area) of the burning. Therefore, in the present embodiment, a burning composing point to be corrected is automatically selected so that the edge line is not twisted when the user corrects a burning composing point, to thereby make it possible to correct (Modify) a burning composing point more accurately.

A measurement processing portion 18 according to the present embodiment has a configuration similar to that of the second embodiment. Furthermore, a correction procedure of a burning composing point in the present embodiment is substantially the same as the procedure shown in FIG. 34, the difference lying only in the correction of the burning composing point in Step SJ and the update/addition of a label table in Step SK. Hereunder is a detailed description of a procedure (Steps SI, SJ, SK, and SL) of correcting a burning composing points in the present embodiment with reference to FIG. 62 to FIG. 65.

Burning composing points shown in FIG. 62A and so on are denoted by label numbers (1 to 16) listed in the label tables. The label numbers are shown in FIG. 62A and so on for convenience of description. However, on the actual measurement screen, label numbers are not displayed. FIG. 63A shows a label table before correction of burning composing points, which is created in Step SH in FIG. 34.

If an edge line that connects burning composing points 5100 calculated by the burning composing point calculation portion 18d does not well match an outline of a burning 5110 as shown in FIG. 62A, then the user moves a cursor 5120 to point it to a position to which he or she wants a burning composing point to be corrected (a position of a correction point M) as shown in FIG. 62B and performs an operation such as a click. At this time, similarly to the second embodiment, the burning composing point correction portion 18g corrects the position of the burning composing point with label number 16 most proximal to the correction point M to the position of the correction point M as shown in FIG. 62C. The label table at this time is as shown in FIG. 63B. The image coordinates of the burning composing point with label number 16 are changed to the coordinates (Xm, Ym) of the correction point M.

Furthermore, the burning composing point correction portion 18g calculates line segments L1, L2 that connect the corrected burning composing point with label number 16 with its adjacent burning composing points. From a label table shown in FIG. 64A, the line segment L1 is a line segment connecting the burning composing points with label numbers 1, 16. The line segment L2 is a line segment connecting the burning composing points with label numbers 15, 16. To be more specific, the line segment L1 is a line segment connecting the coordinates (X1, Y1) with the coordinates (Xm, Ym). The line segment L2 is a line segment connecting the coordinates (X15, Y15) with the coordinates (Xm, Ym).

The burning composing point correction portion 18g checks whether the calculated line segments L1, L2 have intersection points with line segments connecting their other adjacent burning composing points or not (in other words, whether the shape of the edge line has a twisted shape or not). As shown in FIG. 62C, a line segment L3 connecting the burning composing points with label numbers 2, 3 has intersection points with the line segments L1, L2. To be more specific, the line segment L3 is a line segment connecting the coordinates (X2, Y2) with the coordinates (X3, Y3).

If finding a line segment with intersection points with the line segments L1, L2, then the burning composing point correction portion 18g returns the corrected burning composing point with label number 16 to its original position (its position before correction) as shown in FIG. 62D. The label table at this time is as shown in FIG. 64B. The coordinates of the burning composing point with label number 16 are (X16, Y16), showing that the label table has returned to the same label table shown in FIG. 63A.

Because it has been found that movement of the burning composing point most proximal to the correction point M to the position of the correction point M produces a twist, the burning composing point correction portion 18g moves another burning composing point to the position of the correction point M. To be more specific, as shown in FIG. 62E, the burning composing point correction portion 18g corrects the position of the burning composing point with label number 3, which is second proximal to the correction point M, to the position of the correction point M. The label table at this time is as shown in FIG. 65A. The coordinates of the burning composing point with label number 3 are (Xm, Ym).

Furthermore, the burning composing point correction portion 18g calculates line segments L4, L5 that connect the corrected burning composing point with label number 3 with its adjacent burning composing points. From a label table shown in FIG. 65B, the line segment L4 is a line segment connecting the burning composing points with label numbers 2, 3. The line segment L5 is a line segment connecting the burning composing points with label numbers 3, 4. To be more specific, the line segment L4 is a line segment connecting the coordinates (X2, Y2) with the coordinates (Xm, Ym). The line segment L5 is a line segment connecting the coordinates (Xm, Ym) with the coordinates (X4, Y4).

The burning composing point correction portion 18g checks whether the calculated line segments L4, L5 have intersection points with line segments connecting their other adjacent burning composing points or not (in other words, whether the shape of the edge line has a twisted shape or not). As shown in FIG. 62E, there are no line segments that have intersection points with the line segments L4, L5. Therefore, the burning composing point correction portion 18g determines that the burning composing point to be corrected is the burning composing point with label number 3. As a result, it is possible to correct a burning composing point so that the shape of the edge line is not twisted, as shown in FIG. 62F.

In the example illustrated above, the burning composing point correction portion 18g has been able to determine the burning composing point to be corrected in the correction of the second burning composing point. If determination of the burning composing point to be corrected fails, then the check whether the shape of the edge line is twisted or not is further repeated. If repeated checks fails to determine the burning composing point to be corrected, then the correction of a burning composing point is not performed.

In the above, on the measurement screen, all the processes of canceling the twisted shape shown in FIG. 62A to 62F are not displayed, but the state in which the correction of the burning composing point is completed as shown in FIG. 62F is displayed as soon as the user specifies the correction point as shown in FIG. 62B. Furthermore, the label numbers affixed to the burning composing points are not displayed as well. However, the configuration is not limited to this. All the processes of correcting a burning composing point may be displayed. In addition, the label numbers may be displayed. Furthermore, although not specifically shown in the figures, preview icons may be provided on the measurement screen so as to return the state of the corrected burning composing points to their previous state and advance their state, similarly to the modifications of the second embodiment.

Next is a description of a modification of the present embodiment. If the shape of the edge line is twisted after correction of a burning composing point, then a warning message box 5500 which warns that the shape of the edge line is twisted may be displayed as shown in FIG. 66A. When the user moves a cursor 5510 onto a "Yes" icon 5520 in the message box 5500 and performs an operation such as a click, the burning composing point correction portion 18g returns the corrected burning composing point to its original position similarly to the above. Then, the user performs a correction again.

Furthermore, if the user uses the cursor 5510 to specify a "No" icon 5521, then the burning size calculation portion 18e performs a burning calculation in a state with the burning composing point being after correction. Then, as shown in FIG. 66B, a result window 5530 is shown on the measurement screen. However, if the shape of the edge line is twisted, it is not possible to calculate the area. Therefore, as for the area, "A=WRONG FIG" (FIG is an abbreviation of FIGURE) is displayed.

As described above, according to the present embodiment, a burning composing point is automatically selected so that the shape of the edge line after correction of the burning composing point is not twisted. Therefore, it is possible to avoid the situation in which a calculation of an area (spatial area) of a burning is not available. Furthermore, the correction method of a burning composing point is similar to that in the second embodiment. Therefore, it is possible to correct a burning composing point more accurately, and to improve the calculational accuracy of a burning size.

While the embodiments of the present invention has been described in detail with reference to the drawings, specific configurations are not limited to the above embodiments, but design modifications and the like without departing from the scope of the present invention are included therein.

According to the present invention, the specification of the three base points by the user enables measurement of the size of an object. Therefore, it is possible to obtain an advantage in that the burden of operation can be reduced to improve operability.

What is claimed is:

1. An endoscope apparatus comprising:
    an image pickup device that picks up an image of an object; and
    a controller configured to function as a measurement portion that measures the object based on the image of the object obtained by the image pickup device;
    wherein the measurement portion comprises:
        a specification portion that specifies three base points on the image;
        a base ellipse calculation portion that calculates a base ellipse based on the three base points specified by the specification portion and sets a plurality of search points on the base ellipse, a number of the search points and a distance between the search points being proportional to a perimeter length of the base ellipse;
        a composing point calculation portion that calculates composing points forming an object region of the object, based on an image region that is based on the plurality of search points that are set by the base ellipse calculation portion;
        a size calculation portion that calculates a size of the object based on the composing points; and
        an image processing portion that performs binarization processing to binarize the image;
        wherein the composing point calculation portion performs a differential filter processing for extracting an edge of the object region based on the image after the binarization processing, calculates an approximation line that approximates to the edge, and calculates the composing points on the edge based on the approximation line, wherein the differential filter processing uses a primary differential filter, a secondary differential filter, and a noise reduction filter.

2. The endoscope apparatus according to claim 1, wherein the composing point calculation portion controls a number of the composing points in accordance with a degree of correspondence between the edge and the approximation line.

3. The endoscope apparatus according to claim 1, wherein the specification portion specifies the three base points on the image after binarization processing.

4. The endoscope apparatus according to claim 1, wherein the image processing portion converts a dynamic range of the image, and binarizes the image after dynamic range conversion.

5. The endoscope apparatus according to claim 1, further comprising an input device which is operable to input a threshold value that is used in the binarization processing of the image.

6. The endoscope apparatus according to claim 1, further comprising:

a display that displays the image and a result of the measurement by the measurement portion;
wherein the controller is configured to switch, in accordance with a user instruction, a display state of the display between a first display state in which the result of the measurement is superimposed on at least a part of measurement information including the image of the object and a second display state in which the measurement information, on which the result of the measurement is superimposed in the first display state, is made visible.

7. The endoscope apparatus according to claim 1, wherein the measurement portion further comprises a composing point correction portion that corrects a given one of the composing points based on an instruction from a user.

8. The endoscope apparatus according to claim 7, wherein the composing point correction portion corrects a position of a composing point which is selected based on a position instructed by the user on the image and a position calculated by the composing point calculation portion, to the position instructed by the user.

9. The endoscope apparatus according to claim 8, wherein the composing point correction portion further determines whether a shape of an edge line made of line segments that connect the composing points including the corrected composing point is twisted.

10. The endoscope apparatus according to claim 7, wherein the composing point correction portion adds a new composing point at a point that is instructed by the user on the image.

11. The endoscope apparatus according to claim 10, wherein the composing point correction portion further determines, based on positions of the composing points calculated by the composing point calculation portion and a position of the newly added composing point, an edge line made of lines that connect all the composing points.

12. The endoscope apparatus according to claim 10, wherein the composing point correction portion further determines an edge line so that the newly added composing point and a composing point selected based on the instruction from the user are connected by a line.

13. The endoscope apparatus according to claim 7, further comprising a memory that stores correction result information for showing a result of a correction made by the composing point correction portion, wherein the composing point correction portion corrects, based on an instruction from the user, a composing point after correction that is indicated by the correction result information, the composing point after correction being selected based on an instruction from the user.

14. A method of measuring an object, the method comprising:
obtaining an image of an object picked up by an image pickup device provided in an endoscope apparatus; and
measuring the object based on the image, wherein the measuring comprises:
specifying three base points on the image;
calculating a base ellipse based on the three base points specified in the specifying;
setting a plurality of search points on the base ellipse, a number of the search points and a distance between the search points being proportional to a perimeter length of the base ellipse;
calculating composing points that form an object region of the object, based on an image region that is based on the plurality of search points that are set on the base ellipse; and
calculating a size of the object based on the composing points; and
binarizing the image;
wherein calculating the composing points comprises performing a differential filter processing for extracting an edge of the object region based on the image after the binarization, calculating an approximation line that approximates to the edge, and calculating the composing points on the edge based on the approximation line, wherein the differential filter processing uses a primary differential filter, a secondary differential filter, and a noise reduction filter.

* * * * *